US009794568B2

(12) United States Patent
Puri et al.

(10) Patent No.: US 9,794,568 B2
(45) Date of Patent: Oct. 17, 2017

(54) CONTENT ADAPTIVE ENTROPY CODING OF CODED/NOT-CODED DATA FOR NEXT GENERATION VIDEO

(71) Applicant: Intel Corporation, Santa Clara, CA (US)

(72) Inventors: Atul Puri, Redmond, WA (US); Daniel Socek, Miami, FL (US)

(73) Assignee: Intel Corporation, Santa Clara, CA (US)

( * ) Notice: Subject to any disclaimer, the term of this patent is extended or adjusted under 35 U.S.C. 154(b) by 459 days.

(21) Appl. No.: 14/375,690

(22) PCT Filed: Dec. 27, 2013

(86) PCT No.: PCT/US2013/077967
§ 371 (c)(1),
(2) Date: Jul. 30, 2014

(87) PCT Pub. No.: WO2014/120373
PCT Pub. Date: Aug. 7, 2014

(65) Prior Publication Data
US 2016/0277738 A1    Sep. 22, 2016

Related U.S. Application Data

(60) Provisional application No. 61/758,314, filed on Jan. 30, 2013.

(51) Int. Cl.
*H04N 19/00*    (2014.01)
*H04N 19/13*    (2014.01)
(Continued)

(52) U.S. Cl.
CPC .......... *H04N 19/13* (2014.11); *H04N 19/105* (2014.11); *H04N 19/117* (2014.11); *H04N 19/119* (2014.11); *H04N 19/12* (2014.11); *H04N 19/122* (2014.11); *H04N 19/124* (2014.11); *H04N 19/126* (2014.11); *H04N 19/136* (2014.11); *H04N 19/139* (2014.11);
(Continued)

(58) Field of Classification Search
CPC ............................ H04N 19/13; H04N 19/105
USPC ....................................................... 385/240.02
See application file for complete search history.

(56) References Cited

U.S. PATENT DOCUMENTS 5,675,386 A    10/1997 Lee et al.
6,055,272 A *    4/2000 Kim ...................... H04N 19/93
                                                     375/240.23
(Continued)

FOREIGN PATENT DOCUMENTS

EP    2 271 102 A1    1/2011
JP    2011-223068 A    11/2011
(Continued)

OTHER PUBLICATIONS

International Search Report and Written Opinion received for Patent Application No. PCT/US2013/067182, dated Jan. 29, 2014, 10 pages.
(Continued)

*Primary Examiner* — Jeffery Williams
(74) *Attorney, Agent, or Firm* — Green, Howard & Mughal, LLP

(57)    ABSTRACT

Techniques related to content adaptive entropy coding of coded/not-coded data are described.

21 Claims, 27 Drawing Sheets

(51) Int. Cl.

| | |
|---|---|
| *H04N 19/105* | (2014.01) |
| *H04N 19/124* | (2014.01) |
| *H04N 19/182* | (2014.01) |
| *H04N 19/513* | (2014.01) |
| *H04N 19/167* | (2014.01) |
| *H04N 19/169* | (2014.01) |
| *H04N 19/17* | (2014.01) |
| *H04N 19/186* | (2014.01) |
| *H04N 19/122* | (2014.01) |
| *H04N 19/176* | (2014.01) |
| *H04N 19/61* | (2014.01) |
| *H04N 19/91* | (2014.01) |
| *H04N 19/63* | (2014.01) |
| *H04N 19/119* | (2014.01) |
| *H04N 19/96* | (2014.01) |
| *H04N 19/12* | (2014.01) |
| *H04N 19/136* | (2014.01) |
| *H04N 19/139* | (2014.01) |
| *H04N 19/159* | (2014.01) |
| *H04N 19/184* | (2014.01) |
| *H04N 19/192* | (2014.01) |
| *H04N 19/573* | (2014.01) |
| *H04N 19/59* | (2014.01) |
| *H04N 19/117* | (2014.01) |
| *H04N 19/82* | (2014.01) |
| *H04N 19/517* | (2014.01) |
| *H04N 19/523* | (2014.01) |
| *H04N 19/53* | (2014.01) |
| *H04N 19/577* | (2014.01) |
| *H04N 19/196* | (2014.01) |
| *H04N 19/126* | (2014.01) |
| *H04N 19/31* | (2014.01) |
| *H04N 19/40* | (2014.01) |
| *H04N 19/14* | (2014.01) |
| *H04N 19/172* | (2014.01) |
| *H04N 19/593* | (2014.01) |
| *H04N 19/44* | (2014.01) |

(52) U.S. Cl.
CPC .......... *H04N 19/14* (2014.11); *H04N 19/159* (2014.11); *H04N 19/167* (2014.11); *H04N 19/17* (2014.11); *H04N 19/172* (2014.11); *H04N 19/176* (2014.11); *H04N 19/182* (2014.11); *H04N 19/184* (2014.11); *H04N 19/186* (2014.11); *H04N 19/1887* (2014.11); *H04N 19/192* (2014.11); *H04N 19/196* (2014.11); *H04N 19/31* (2014.11); *H04N 19/40* (2014.11); *H04N 19/513* (2014.11); *H04N 19/517* (2014.11); *H04N 19/523* (2014.11); *H04N 19/53* (2014.11); *H04N 19/573* (2014.11); *H04N 19/577* (2014.11); *H04N 19/59* (2014.11); *H04N 19/593* (2014.11); *H04N 19/61* (2014.11); *H04N 19/63* (2014.11); *H04N 19/82* (2014.11); *H04N 19/91* (2014.11); *H04N 19/96* (2014.11); *H04N 19/44* (2014.11)

(56) References Cited

U.S. PATENT DOCUMENTS

| | | | |
|---|---|---|---|
| 8,009,965 | B2 | 8/2011 | Takao |
| 2003/0113026 | A1 | 6/2003 | Srinivasan et al. |
| 2003/0133515 | A1* | 7/2003 | Kondo .................. G06F 1/1616 375/295 |
| 2006/0133479 | A1 | 6/2006 | Chen et al. |
| 2006/0251330 | A1 | 11/2006 | Toth et al. |
| 2006/0274833 | A1* | 12/2006 | Kojokaro ............. H04N 19/139 375/240.16 |
| 2007/0036222 | A1 | 2/2007 | Srinivasan et al. |
| 2007/0291849 | A1 | 12/2007 | Lainema |
| 2008/0013633 | A1 | 1/2008 | Ye et al. |
| 2008/0112489 | A1* | 5/2008 | Malladi ................ H04N 19/176 375/240.22 |
| 2009/0046937 | A1 | 2/2009 | Fenney et al. |
| 2009/0175333 | A1 | 7/2009 | Hsiang |
| 2009/0219991 | A1 | 9/2009 | Po et al. |
| 2009/0279615 | A1 | 11/2009 | Au et al. |
| 2010/0002775 | A1 | 1/2010 | Huang et al. |
| 2010/0040146 | A1 | 2/2010 | Wang et al. |
| 2010/0046845 | A1 | 2/2010 | Wedi et al. |
| 2010/0269009 | A1 | 10/2010 | Okamura et al. |
| 2011/0051811 | A1 | 3/2011 | Wang et al. |
| 2011/0080947 | A1 | 4/2011 | Chen et al. |
| 2011/0109721 | A1 | 5/2011 | Hong et al. |
| 2011/0206131 | A1 | 8/2011 | Vafin et al. |
| 2011/0255610 | A1 | 10/2011 | Kameyama et al. |
| 2012/0128070 | A1 | 5/2012 | Kim et al. |
| 2012/0134412 | A1 | 5/2012 | Shibahara et al. |
| 2012/0155532 | A1 | 6/2012 | Puri et al. |
| 2012/0207213 | A1 | 8/2012 | Amon |
| 2012/0207222 | A1 | 8/2012 | Lou et al. |
| 2012/0262545 | A1* | 10/2012 | Kerbiriou .......... H04N 13/0048 348/43 |
| 2013/0003837 | A1 | 1/2013 | Yu et al. |
| 2014/0328387 | A1 | 11/2014 | Puri et al. |
| 2014/0328400 | A1 | 11/2014 | Puri et al. |
| 2014/0328414 | A1 | 11/2014 | Puri et al. |

FOREIGN PATENT DOCUMENTS

| | | |
|---|---|---|
| JP | 2012-080213 A | 4/2012 |
| KR | 10-2011-0112171 A | 10/2011 |
| KR | 10-2011-0112180 A | 10/2011 |
| KR | 10-2011-0129493 A | 12/2011 |
| KR | 10-2012-0086232 A | 8/2012 |
| KR | 10-2013-0010124 A | 1/2013 |
| KR | 10-2013-0045425 A | 5/2013 |
| WO | 2006/109974 A1 | 10/2006 |
| WO | 2012/045037 A2 | 4/2012 |
| WO | 2013/003726 A1 | 1/2013 |
| WO | 2014/078068 | 5/2014 |
| WO | 2014/109826 A1 | 7/2014 |
| WO | 2014/120367 A1 | 8/2014 |
| WO | 2014/120368 A1 | 8/2014 |
| WO | 2014/120373 | 8/2014 |
| WO | 2014/120575 A1 | 8/2014 |
| WO | 2014/120656 A1 | 8/2014 |

OTHER PUBLICATIONS

International Search Report and Written Opinion received for PCT Patent Application No. PCT/US2013/077692, dated Apr. 11, 2014, 15 pages.

International Search Report and Written Opinion received for PCT Patent Application No. PCT/US2013/077967, dated Apr. 10, 2014, 16 pages.

International Search Report and Written Opinion received for PCT Patent Application No. PCT/US2014/013027, dated May 20, 2014, 12 pages.

International Search Report and Written Opinion received for PCT Patent Application No. PCT/US2014/013333, dated May 20, 2014, 11 pages.

International Search Report and Written Opinion received for PCT Patent Application No. PCT/US2013/069960, dated Mar. 14, 2014, 11 pages.

International Search Report and Written Opinion received for PCT Patent Application No. PCT/US2013/077698, dated Apr. 11, 2014, 12 pages.

Volder, Jack, "The Cordic Computing Technique", 1959 Proceedings of the Western Joint Computer Conference 1959, pp. 257-261.

Minasyan et al., "On a Class of Parametric Transforms and Its Application to Image Compression", EURASIP Journal on Advances in Signal Processing, vol. 27, 2007, 14 pages.

(56) References Cited

OTHER PUBLICATIONS

Minasyan et al., "On unified architectures for synthesizing and implementation of fast parametric transforms", Fifth International Conference on Information, Communications and Signal Processing, 2005, pp. 710-714.(1 page of abstract only).
Schrack et al., "A Fast Distance Approximation Algorithm for Encoded Quadtree Locations", Canadian Conference on Electrical and Computer Engineering, Sep. 14-17, 1993, 1 page of Abstract only.
Office Action, dated Oct. 21, 2016, for Korean Patent Application No. 2015-7016934.
Extended European Search Report, dated Aug. 18, 2016, for EP Patent Application No. 13873217.7
Examination Report dated Jun. 2, 2017 for European Patent Application No. 13873217.7.
Office Action dated Jun. 26, 2017 for Korean Patent Application No. 2015-7016934.

* cited by examiner

800

Obtain First and Second Video Data of Different Types for Entropy Encoding
802

Determine an Entropy Encoding Technique for the First Video Data
804

Entropy Encode the First Video Data using the First Entropy Encoding Technique and Entropy Encode the Second Video Data to Generate First and Second Compressed Video Data
806

Assemble the First and Second Compressed Video Data to Generate an Output Bitstream
808

FIG. 8

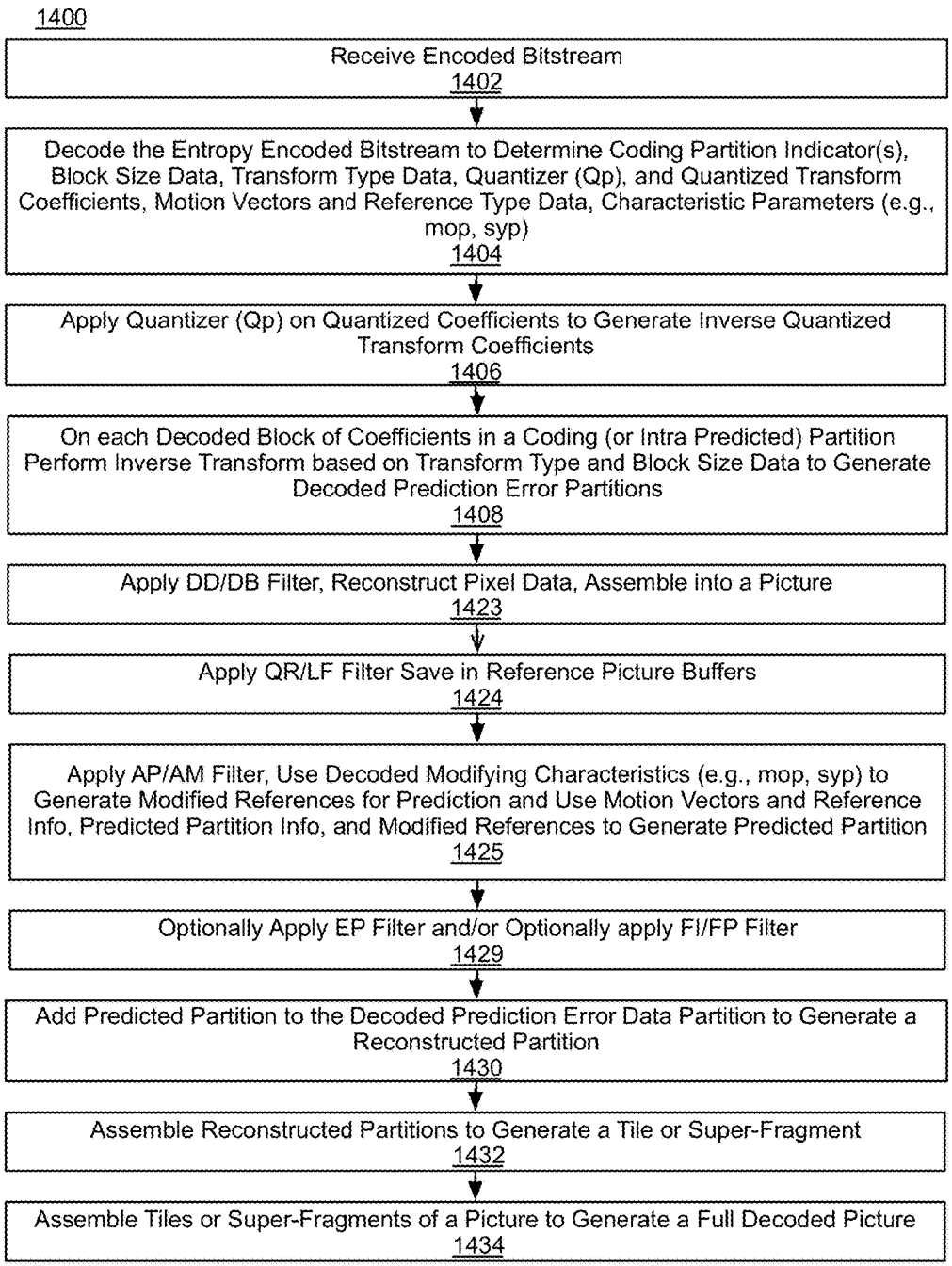

2200

┌─────────────────────────────────────────────────┐
│ Determine a Selected Entropy Coding Technique for Coded/Not-
│ Coded Video Data
│ 2202
└─────────────────────────────────────────────────┘
                        │
                        ▼
┌─────────────────────────────────────────────────┐
│ Entropy Encode a Processed Bitstream Associated with the
│ Coded/Not-Coded Video Data Using the Selected Entropy Coding
│ Technique
│ 2204
└─────────────────────────────────────────────────┘
                        │
                        ▼
┌─────────────────────────────────────────────────┐
│ Assemble the Encoded Coded/Not-Coded Video into an Output
│ Bitstream
│ 2206
└─────────────────────────────────────────────────┘

Receive an Entropy Encoded Bitstream
2302

Disassemble the Entropy Encoded Bitstream to Determine a Coded/Not-Coded Video Data Header and an Encoded Coded/Not-Coded Video Data Bitstream
2304

Determine a Selected Entropy Coding Technique Based on the Coded/Not-Coded Video Data Header
2306

Entropy Decode the Encoded Coded/Not-Coded Video Data Bitstream Using the Selected Entropy Coding Technique to Determine Coded/Not-Coded Video Data
2308

Generate a Video Frame Based on the Coded/Not-Coded Video Data
2310

FIG. 23

CONTENT ADAPTIVE ENTROPY CODING OF CODED/NOT-CODED DATA FOR NEXT GENERATION VIDEO

RELATED APPLICATIONS

This application claims the benefit of International PCT Application No. PCT/US2013/077967 filed on Dec. 27, 2013 titled "CONTENT ADAPTIVE ENTROPY CODING OF CODED/NOT-CODED DATA FOR NEXT GENERATION VIDEO" and further claims benefit of U.S. Provisional Application No. 61/758,314 filed on Jan. 30, 2013 and titled "NEXT GENERATION VIDEO CODER", the contents of which are hereby incorporated in their entirety.

BACKGROUND

A video encoder compresses video information so that more information can be sent over a given bandwidth. The compressed signal may then be transmitted to a receiver having a decoder that decodes or decompresses the signal prior to display.

High Efficient Video Coding (HEVC) is the latest video compression standard, which is being developed by the Joint Collaborative Team on Video Coding (JCT-VC) formed by ISO/IEC Moving Picture Experts Group (MPEG) and ITU-T Video Coding Experts Group (VCEG). HEVC is being developed in response to the previous H.264/AVC (Advanced Video Coding) standard not providing enough compression for evolving higher resolution video applications. Similar to previous video coding standards, HEVC includes basic functional modules such as intra/inter prediction, transform, quantization, in-loop filtering, and entropy coding.

The ongoing HEVC standard may attempt to improve on limitations of the H.264/AVC standard such as limited choices for allowed prediction partitions and coding partitions, limited allowed multiple references and prediction generation, limited transform block sizes and actual transforms, limited mechanisms for reducing coding artifacts, and inefficient entropy encoding techniques. However, the ongoing HEVC standard may use iterative approaches to solving such problems.

For instance, with ever increasing resolution of video to be compressed and expectation of high video quality, the corresponding bitrate/bandwidth required for coding using existing video coding standards such as H.264 or even evolving standards such as H.265/HEVC, is relatively high. The aforementioned standards use expanded forms of traditional approaches to implicitly address the insufficient compression/quality problem, but often the results are limited.

The present description, developed within the context of a Next Generation Video (NGV) codec project, addresses the general problem of designing an advanced video codec that maximizes the achievable compression efficiency while remaining sufficiently practical for implementation on devices. For instance, with ever increasing resolution of video and expectation of high video quality due to availability of good displays, the corresponding bitrate/bandwidth required using existing video coding standards such as earlier MPEG standards and even the more recent H.264/AVC standard, is relatively high. H.264/AVC was not perceived to be providing high enough compression for evolving higher resolution video applications.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 8 is a flow diagram illustrating an example process;

FIG. 13 illustrates an example bitstream;

FIG. 14 is a flow diagram illustrating an example decoding process;

FIG. 22 is a flow diagram illustrating an example process;

FIG. 23 is a flow diagram illustrating an example process;

DETAILED DESCRIPTION

Figure 1:
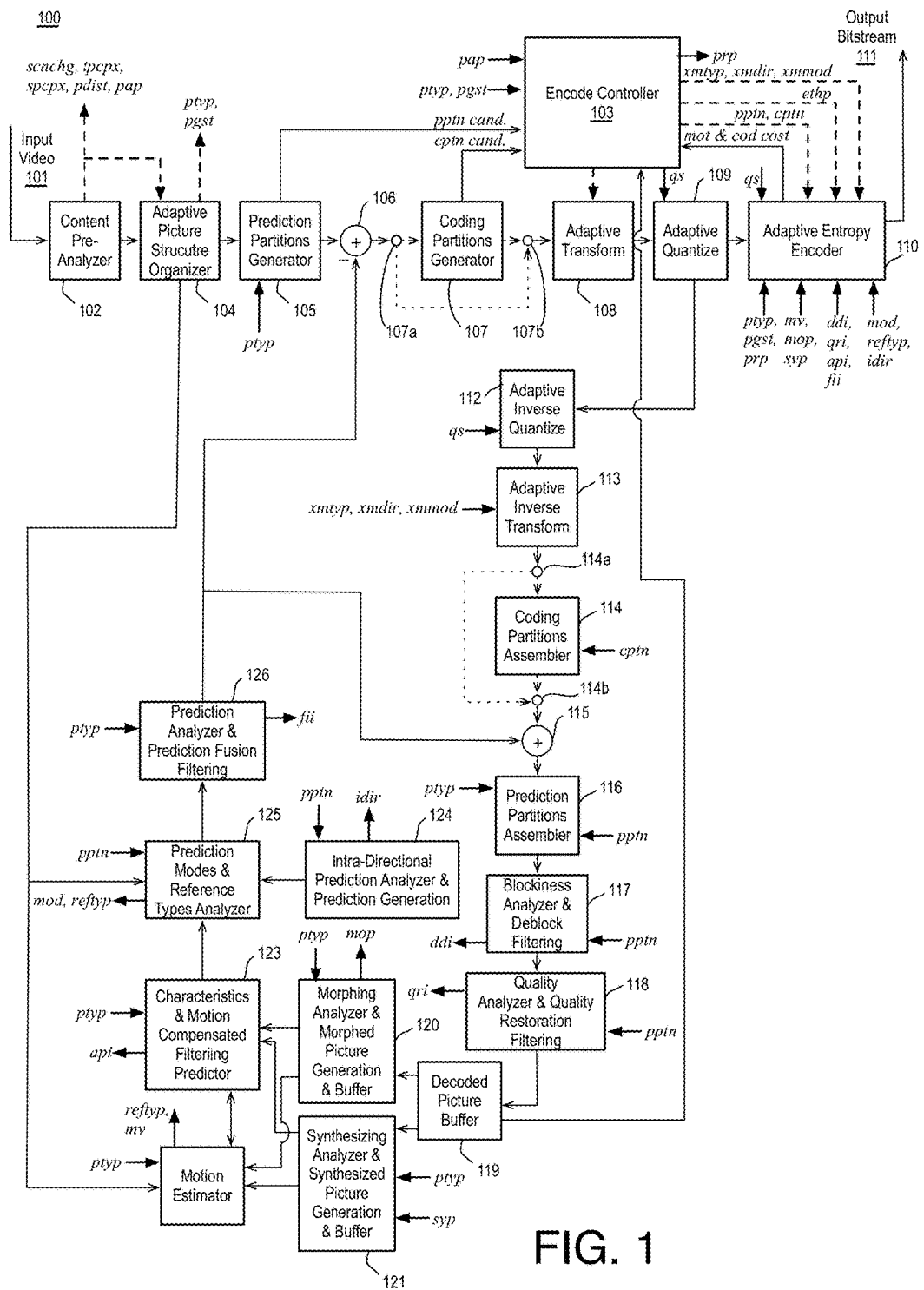
FIG. 1 is an illustrative diagram of an example next generation video encoder.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Systems, apparatus, articles, and methods are described below related to content adaptive entropy coding for video systems.

Next generation video (NGV) systems, apparatus, articles, and methods are described below. NGV video coding may incorporate significant content based adaptivity in the video coding process to achieve higher compression. As discussed above, the H.264/AVC standard may have a variety of limitations and ongoing attempts to improve on the standard, such as, for example, the HEVC standard may use iterative approaches to address such limitations. Herein, an NGV system including an encoder and a decoder will be described.

For example, the H.264 standard may support two modes of entropy coding. In the first mode, Adaptive VLC (Variable Length Coding), transform coefficients may be coded using Context Adaptive VLC (CAVLC) and all other syntax elements (e.g., overhead data, modes, motion vectors, and so on) may be coded using Exponential Golomb coding. The CAVLC coded data and the Exponential Golomb coded data may be multiplexed to generate an encoded bitstream. In the second mode, all data may be encoded using Context Adaptive Binary Arithmetic Coding (CABAC). The corresponding decoder may also operate in two modes, disassembling and decoding the multiplexed bit stream in the first mode and decoding the CABAC encoded bitstream in the second mode. Such techniques may have limitations. For example, CABAC coding may be efficient but may be complex such that throughput in higher resolution contexts may be limited. Further, by grouping data types together for coding, efficiency and complexity of the entropy coding may not be optimized.

In some video codec implementations, entropy coding and decoding of various data such as overhead data, modes, motion vectors, and/or transform coefficients may be a significant contributor to the coding efficiency and complexity of the system. In some examples, the techniques discussed herein may balance coding efficiency and system complexity.

In some examples, first video data and second video data may be received for entropy encoding at an entropy encoder module. The first video data and the second video data may be different data types (e.g., header data, morphing parameters, synthesizing parameters, or global maps data or motion vectors or intra-prediction partition data or so on, as is discussed further herein). A first entropy encoding technique may be determined for the first video data based on a parameter associated with the first video data such as, for example, a number of compressed bits of the first video data, a predetermined indicator or flag associated with the first video data, a predetermined threshold, or a heuristically determined threshold or the like. In some examples, the first entropy encoding technique may be chosen from one of an adaptive symbol-run variable length coding technique or an adaptive proxy variable length coding technique. The first video data may be entropy encoded using the first entropy encoding technique and the second video data may be entropy encoded using the first entropy encoding technique. In some examples, the second entropy encoding technique may be determined for the second video data based on a parameter as discussed with respect to the first video data. In some examples, the second entropy encoding technique may be determined from options including an adaptive symbol-run variable length coding technique, an adaptive proxy variable length coding technique, an adaptive vector variable length coding, an adaptive 1-dimensional variable length coding technique, an adaptive 2-dimensional variable length coding technique, or other techniques as discussed herein. In some examples, the second entropy encoding technique may be predetermined for the data type of the second video data. Entropy encoding the first video data and the second video data may generate first compressed video data and second compressed video data. The first and second compressed video data may be assembled to generate an output bitstream.

The output bitstream may be transmitted from the encoder to a decoder, which may disassemble the bitstream to determine the first and second compressed video data. The compressed video data may be entropy decoded to generate entropy decoded video data, which may be further decoded to generate a video frame. The video frame may be transmitted to a display device for presentment to a user.

In some examples, additional video data types may be received for entropy encoding at the entropy encoder module. For example, third, fourth, fifth, sixth, seventh, or more video data may be entropy encoded to generate associated compressed video data, which may be assembled in the output bitstream, transmitted, and subsequently entropy decoded via a decoder. The various data types and encoding/decoding technique options and implementations are discussed further herein.

As used herein, the term "coder" may refer to an encoder and/or a decoder. Similarly, as used herein, the term "coding" may refer to performing video encoding via an encoder and/or performing video decoding via a decoder. For example a video encoder and video decoder may both be examples of coders capable of coding video data. In addition, as used herein, the term "codec" may refer to any process, program or set of operations, such as, for example, any combination of software, firmware, and/or hardware, that may implement an encoder and/or a decoder. Further, as used herein, the phrase "video data" may refer to any type of data associated with video coding such as, for example, video frames, image data, encoded bitstream data, or the like.

FIG. 1 is an illustrative diagram of an example next generation video encoder 100, arranged in accordance with at least some implementations of the present disclosure. As shown, encoder 100 may receive input video 101. Input video 101 may include any suitable input video for encoding such as, for example, input frames of a video sequence. As shown, input video 101 may be received via a content pre-analyzer module 102. Content pre-analyzer module 102 may be configured to perform analysis of the content of video frames of input video 101 to determine various types of parameters for improving video coding efficiency and speed performance. For example, content pre-analyzer module 102 may determine horizontal and vertical gradient information (e.g., Rs, Cs), variance, spatial complexity per picture, temporal complexity per picture, scene change detection, motion range estimation, gain detection, prediction distance estimation, number of objects estimation, region boundary detection, spatial complexity map computation, focus estimation, film grain estimation, or the like. The parameters generated by content pre-analyzer module 102 may be used by encoder 100 (e.g., via encode controller 103) and/or quantized and communicated to a decoder. As shown, video frames and/or other data may be transmitted from content pre-analyzer module 102 to adaptive picture organizer module 104, which may determine the picture type (e.g., I-, P-, or F/B-picture) of each video frame and reorder the video frames as needed. In some examples, adaptive picture organizer module 104 may include a frame portion generator configured to generate frame portions. In some examples, content pre-analyzer module 102 and adaptive picture organizer module 104 may together be considered a pre-analyzer subsystem of encoder 100.

As shown, video frames and/or other data may be transmitted from adaptive picture organizer module 104 to prediction partitions generator module 105. In some examples, prediction partitions generator module 105 may divide a frame or picture into tiles or super-fragments or the like. In some examples, an additional module (e.g., between modules 104 and 105) may be provided for dividing a frame or picture into tiles or super-fragments. Prediction partitions generator module 105 may divide each tile or super-fragment into potential prediction partitionings or partitions. In some examples, the potential prediction partitionings may be determined using a partitioning technique such as, for example, a k-d tree partitioning technique, a bi-tree partitioning technique, or the like, which may be determined based on the picture type (e.g., I-, P-, or F/B-picture) of individual video frames, a characteristic of the frame portion being partitioned, or the like. In some examples, the determined potential prediction partitionings may be partitions for prediction (e.g., inter- or intra-prediction) and may be described as prediction partitions or prediction blocks or the like.

In some examples, a selected prediction partitioning (e.g., prediction partitions) may be determined from the potential prediction partitionings. For example, the selected prediction partitioning may be based on determining, for each potential prediction partitioning, predictions using characteristics and motion based multi-reference predictions or intra-predictions, and determining prediction parameters. For each potential prediction partitioning, a potential prediction error may be determined by differencing original pixels with prediction pixels and the selected prediction partitioning may be the potential prediction partitioning with the minimum prediction error. In other examples, the selected prediction partitioning may be determined based on a rate distortion optimization including a weighted scoring based on number of bits for coding the partitioning and a prediction error associated with the prediction partitioning.

As shown, the original pixels of the selected prediction partitioning (e.g., prediction partitions of a current frame) may be differenced with predicted partitions (e.g., a prediction of the prediction partition of the current frame based on a reference frame or frames and other predictive data such as inter- or intra-prediction data) at differencer 106. The determination of the predicted partitions will be described further below and may include a decode loop as shown in FIG. 1. Any residuals or residual data (e.g., partition prediction error data) from the differencing may be transmitted to coding partitions generator module 107. In some examples, such as for intra-prediction of prediction partitions in any picture type (I-, F/B- or P-pictures), coding partitions generator module 107 may be bypassed via switches 107a and 107b. In such examples, only a single level of partitioning may be performed. Such partitioning may be described as prediction partitioning (as discussed) or coding partitioning or both. In various examples, such partitioning may be performed via prediction partitions generator module 105 (as discussed) or, as is discussed further herein, such partitioning may be performed via a k-d tree intra-prediction/coding partitioner module or a bi-tree intra-prediction/coding partitioner module implemented via coding partitions generator module 107.

In some examples, the partition prediction error data, if any, may not be significant enough to warrant encoding. In other examples, where it may be desirable to encode the partition prediction error data and the partition prediction error data is associated with inter-prediction or the like, coding partitions generator module 107 may determine coding partitions of the prediction partitions. In some examples, coding partitions generator module 107 may not be needed as the partition may be encoded without coding partitioning (e.g., as shown via the bypass path available via switches 107a and 107b). With or without coding partitioning, the partition prediction error data (which may subsequently be described as coding partitions in either event) may be transmitted to adaptive transform module 108 in the event the residuals or residual data require encoding. In some examples, prediction partitions generator module 105 and coding partitions generator module 107 may together be considered a partitioner subsystem of encoder 100. In various examples, coding partitions generator module 107 may operate on partition prediction error data, original pixel data, residual data, or wavelet data.

Coding partitions generator module 107 may generate potential coding partitionings (e.g., coding partitions) of, for example, partition prediction error data using bi-tree and/or k-d tree partitioning techniques or the like. In some examples, the potential coding partitions may be transformed using adaptive or fixed transforms with various block sizes via adaptive transform module 108 and a selected coding partitioning and selected transforms (e.g., adaptive or fixed) may be determined based on a rate distortion optimization or other basis. In some examples, the selected coding partitioning and/or the selected transform(s) may be determined based on a predetermined selection method based on coding partitions size or the like.

For example, adaptive transform module 108 may include a first portion or component for performing a parametric transform to allow locally optimal transform coding of small to medium size blocks and a second portion or component for performing globally stable, low overhead transform coding using a fixed transform, such as a discrete cosine transform (DCT) or a picture based transform from a variety of transforms, including parametric transforms, or any other configuration as is discussed further herein. In some examples, for locally optimal transform coding a Parametric Haar Transform (PHT) may be performed, as is discussed further herein. In some examples, transforms may be performed on 2D blocks of rectangular sizes between about 4×4 pixels and 64×64 pixels, with actual sizes depending on a number of factors such as whether the transformed data is luma or chroma, or inter or intra, or if the determined transform used is PHT or DCT or the like.

As shown, the resultant transform coefficients may be transmitted to adaptive quantize module 109. Adaptive quantize module 109 may quantize the resultant transform coefficients. Further, any data associated with a parametric transform, as needed, may be transmitted to either adaptive quantize module 109 (if quantization is desired) or adaptive entropy encoder module 110. Also as shown in FIG. 1, the quantized coefficients may be scanned and transmitted to adaptive entropy encoder module 110. Adaptive entropy encoder module 110 may entropy encode the quantized coefficients and include them in output bitstream 111. In some examples, adaptive transform module 108 and adaptive quantize module 109 may together be considered a transform encoder subsystem of encoder 100.

As also shown in FIG. 1, encoder 100 includes a local decode loop. The local decode loop may begin at adaptive inverse quantize module 112. Adaptive inverse quantize module 112 may be configured to perform the opposite operation(s) of adaptive quantize module 109 such that an inverse scan may be performed and quantized coefficients may be de-scaled to determine transform coefficients. Such an adaptive quantize operation may be lossy, for example. As shown, the transform coefficients may be transmitted to an adaptive inverse transform module 113. Adaptive inverse transform module 113 may perform the inverse transform as that performed by adaptive transform module 108, for example, to generate residuals or residual values or partition prediction error data (or original data or wavelet data, as discussed) associated with coding partitions. In some examples, adaptive inverse quantize module 112 and adaptive inverse transform module 113 may together be considered a transform decoder subsystem of encoder 100.

As shown, the partition prediction error data (or the like) may be transmitted to optional coding partitions assembler 114. Coding partitions assembler 114 may assemble coding partitions into decoded prediction partitions as needed (as shown, in some examples, coding partitions assembler 114 may be skipped via switches 114a and 114b such that decoded prediction partitions may have been generated at adaptive inverse transform module 113) to generate prediction partitions of prediction error data or decoded residual prediction partitions or the like.

As shown, the decoded residual prediction partitions may be added to predicted partitions (e.g., prediction pixel data) at adder 115 to generate reconstructed prediction partitions. The reconstructed prediction partitions may be transmitted to prediction partitions assembler 116. Prediction partitions assembler 116 may assemble the reconstructed prediction partitions to generate reconstructed tiles or super-fragments. In some examples, coding partitions assembler module 114 and prediction partitions assembler module 116 may together be considered an un-partitioner subsystem of encoder 100.

The reconstructed tiles or super-fragments may be transmitted to blockiness analyzer and deblock filtering module 117. Blockiness analyzer and deblock filtering module 117 may deblock and dither the reconstructed tiles or super-fragments (or prediction partitions of tiles or super-fragments). The generated deblock and dither filter parameters may be used for the current filter operation and/or coded in output bitstream 111 for use by a decoder, for example. The output of blockiness analyzer and deblock filtering module 117 may be transmitted to a quality analyzer and quality restoration filtering module 118. Quality analyzer and quality restoration filtering module 118 may determine QR filtering parameters (e.g., for a QR decomposition) and use the determined parameters for filtering. The QR filtering parameters may also be coded in output bitstream 111 for use by a decoder. As shown, the output of quality analyzer and quality restoration filtering module 118 may be transmitted to decoded picture buffer 119. In some examples, the output of quality analyzer and quality restoration filtering module 118 may be a final reconstructed frame that may be used for prediction for coding other frames (e.g., the final reconstructed frame may be a reference frame or the like). In some examples, blockiness analyzer and deblock filtering module 117 and quality analyzer and quality restoration filtering module 118 may together be considered a filtering subsystem of encoder 100.

In encoder 100, prediction operations may include inter- and/or intra-prediction. As shown in FIG. 1($a$), inter-prediction may be performed by one or more modules including morphing analyzer and morphed picture generation module 120, synthesizing analyzer and generation module 121, and characteristics and motion filtering predictor module 123. Morphing analyzer and morphed picture generation module 120 may analyze a current picture to determine parameters for changes in gain, changes in dominant motion, changes in registration, and changes in blur with respect to a reference frame or frames with which it may be to be coded. The determined morphing parameters may be quantized/de-quantized and used (e.g., by morphing analyzer and morphed picture generation module 120) to generate morphed reference frames that that may be used by motion estimator module 122 for computing motion vectors for efficient motion (and characteristics) compensated prediction of a current frame. Synthesizing analyzer and generation module 121 may generate super resolution (SR) pictures and projected interpolation (PI) pictures or the like for motion for determining motion vectors for efficient motion compensated prediction in these frames.

Motion estimator module 122 may generate motion vector data based on morphed reference frame(s) and/or super resolution (SR) pictures and projected interpolation (PI) pictures along with the current frame. In some examples, motion estimator module 122 may be considered an inter-prediction module. For example, the motion vector data may be used for inter-prediction. If inter-prediction is applied, characteristics and motion compensated filtering predictor module 123 may apply motion compensation as part of the local decode loop as discussed.

Intra-prediction may be performed by intra-directional prediction analyzer and prediction generation module 124. Intra-directional prediction analyzer and prediction generation module 124 may be configured to perform spatial directional prediction and may use decoded neighboring partitions. In some examples, both the determination of direction and generation of prediction may be performed by intra-directional prediction analyzer and prediction generation module 124. In some examples, intra-directional prediction analyzer and prediction generation module 124 may be considered an intra-prediction module.

As shown in FIG. 1, prediction modes and reference types analyzer module 125 may allow for selection of prediction modes from among, "skip", "auto", "inter", "split", "multi", and "intra", for each prediction partition of a tile (or super-fragment), all of which may apply to P- and F/B-pictures. In addition to prediction modes, it also allows for selection of reference types that can be different depending on "inter" or "multi" mode, as well as for P- and F/B-pictures. The prediction signal at the output of prediction modes and reference types analyzer module 125 may be filtered by prediction analyzer and prediction fusion filtering module 126. Prediction analyzer and prediction fusion filtering module 126 may determine parameters (e.g., filtering coefficients, frequency, overhead) to use for filtering and may perform the filtering. In some examples, filtering the prediction signal may fuse different types of signals representing different modes (e.g., intra, inter, multi, split, skip, and auto). In some examples, intra-prediction signals may be different than all other types of inter-prediction signal(s) such that proper filtering may greatly enhance coding efficiency. In some examples, the filtering parameters may be encoded in output bitstream 111 for use by a decoder. The filtered prediction signal may provide the second input (e.g., prediction partition(s)) to differencer 106, as discussed above, that may determine the prediction difference signal (e.g., partition prediction error) for coding discussed earlier. Further, the same filtered prediction signal may provide the second input to adder 115, also as discussed above. As discussed, output bitstream 111 may provide an efficiently encoded bitstream for use by a decoder for the presentment of video.

FIG. 1 illustrates example control signals associated with operation of video encoder 100, where the following abbreviations may represent the associated information:

| | |
|---|---|
| scnchg | Scene change information |
| spcpx | Spatial complexity information |
| tpcpx | Temporal complexity information |
| pdist | Temporal prediction distance information |
| pap | Pre Analysis parameters (placeholder for all other pre analysis parameters except scnchg, spcpx, tpcpx, pdist) |
| ptyp | Picture types information |
| pgst | Picture group structure information |
| pptn cand. | Prediction partitioning candidates |
| cptn cand. | Coding Partitioning Candidates |

-continued

| | |
|---|---|
| prp | Preprocessing |
| xmtyp | Transform type information |
| xmdir | Transform direction information |
| xmmod | Transform mode |
| ethp | One eighth (1/8th) pel motion prediction |
| pptn | Prediction Partitioning |
| cptn | Coding Partitioning |
| mot&cod cost | Motion and Coding Cost |
| qs | quantizer information set (includes Quantizer parameter (Qp), Quantizer matrix (QM) choice) |
| mv | Motion vectors |
| mop | Morphing Paramters |
| syp | Synthesizing Parameters |
| ddi | Deblock and dither information |
| qri | Quality Restoration filtering index/information |
| api | Adaptive Precision filtering index/information |
| fii | Fusion Filtering index/information |
| mod | Mode information |
| reftyp | Reference type information |
| idir | Intra Prediction Direction |

The various signals and data items that may need to be sent to the decoder, ie, pgst, ptyp, prp, pptn, cptn, modes, reftype, ethp, xmtyp, xmdir, xmmod, idir, mv, qs, mop, syp, ddi, qri, apt, fii, quant coefficients and others may then be entropy encoded by adaptive entropy encoder 110 that may include different entropy coders collectively referred to as an entropy encoder subsystem. While these control signals are illustrated as being associated with specific example functional modules of encoder 100 in FIG. 1, other implementations may include a different distribution of control signals among the functional modules of encoder 300. The present disclosure is not limited in this regard and, in various examples, implementation of the control signals herein may include the undertaking of only a subset of the specific example control signals shown, additional control signals, and/or in a different arrangement than illustrated.

Figure 2:
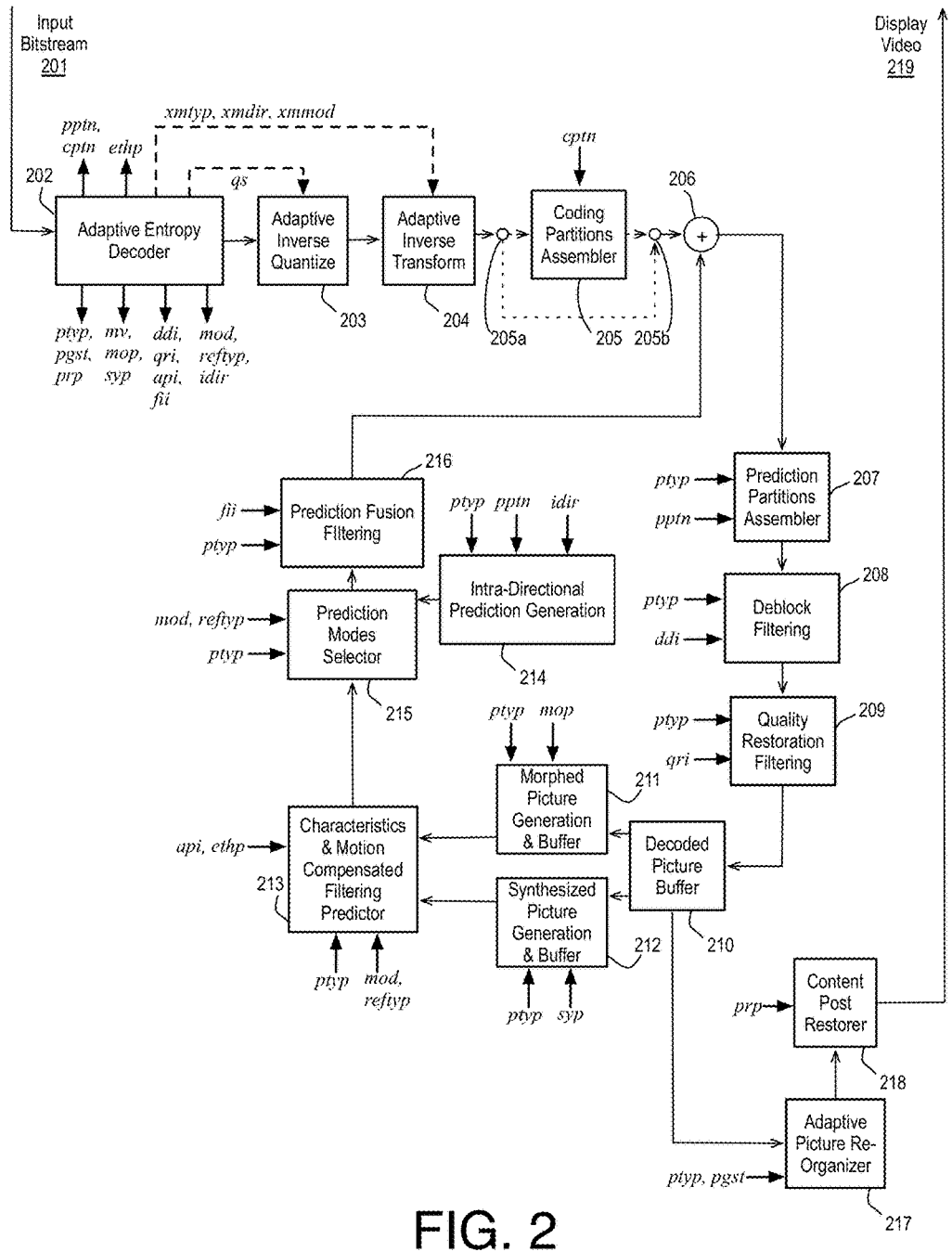
FIG. 2 is an illustrative diagram of an example next generation video decoder.

FIG. 2 is an illustrative diagram of an example next generation video decoder 200, arranged in accordance with at least some implementations of the present disclosure. As shown, decoder 200 may receive an input bitstream 201. In some examples, input bitstream 201 may be encoded via encoder 100 and/or via the encoding techniques discussed herein. As shown, input bitstream 201 may be received by an adaptive entropy decoder module 202. Adaptive entropy decoder module 202 may decode the various types of encoded data (e.g., overhead, motion vectors, transform coefficients, etc.). In some examples, adaptive entropy decoder 202 may use a variable length decoding technique. In some examples, adaptive entropy decoder 202 may perform the inverse operation(s) of adaptive entropy encoder module 110 discussed above.

The decoded data may be transmitted to adaptive inverse quantize module 203. Adaptive inverse quantize module 203 may be configured to inverse scan and de-scale quantized coefficients to determine transform coefficients. Such an adaptive quantize operation may be lossy, for example. In some examples, adaptive inverse quantize module 203 may be configured to perform the opposite operation of adaptive quantize module 109 (e.g., substantially the same operations as adaptive inverse quantize module 112). As shown, the transform coefficients (and, in some examples, transform data for use in a parametric transform) may be transmitted to an adaptive inverse transform module 204. Adaptive inverse transform module 204 may perform an inverse transform on the transform coefficients to generate residuals or residual values or partition prediction error data (or original data or wavelet data) associated with coding partitions. In some examples, adaptive inverse transform module 204 may be configured to perform the opposite operation of adaptive transform module 108 (e.g., substantially the same operations as adaptive inverse transform module 113). In some examples, adaptive inverse transform module 204 may perform an inverse transform based on other previously decoded data, such as, for example, decoded neighboring partitions. In some examples, adaptive inverse quantize module 203 and adaptive inverse transform module 204 may together be considered a transform decoder subsystem of decoder 200.

As shown, the residuals or residual values or partition prediction error data may be transmitted to coding partitions assembler 205. Coding partitions assembler 205 may assemble coding partitions into decoded prediction partitions as needed (as shown, in some examples, coding partitions assembler 205 may be skipped via switches 205a and 205b such that decoded prediction partitions may have been generated at adaptive inverse transform module 204). The decoded prediction partitions of prediction error data (e.g., prediction partition residuals) may be added to predicted partitions (e.g., prediction pixel data) at adder 206 to generate reconstructed prediction partitions. The reconstructed prediction partitions may be transmitted to prediction partitions assembler 207. Prediction partitions assembler 207 may assemble the reconstructed prediction partitions to generate reconstructed tiles or super-fragments. In some examples, coding partitions assembler module 205 and prediction partitions assembler module 207 may together be considered an un-partitioner subsystem of decoder 200.

The reconstructed tiles or super-fragments may be transmitted to deblock filtering module 208. Deblock filtering module 208 may deblock and dither the reconstructed tiles or super-fragments (or prediction partitions of tiles or super-fragments). The generated deblock and dither filter parameters may be determined from input bitstream 201, for example. The output of deblock filtering module 208 may be transmitted to a quality restoration filtering module 209. Quality restoration filtering module 209 may apply quality filtering based on QR parameters, which may be determined from input bitstream 201, for example. As shown in FIG. 2, the output of quality restoration filtering module 209 may be transmitted to decoded picture buffer 210. In some examples, the output of quality restoration filtering module 209 may be a final reconstructed frame that may be used for prediction for coding other frames (e.g., the final reconstructed frame may be a reference frame or the like). In some examples, deblock filtering module 208 and quality restoration filtering module 209 may together be considered a filtering subsystem of decoder 200.

As discussed, compensation due to prediction operations may include inter- and/or intra-prediction compensation. As shown, inter-prediction compensation may be performed by one or more modules including morphing generation module 211, synthesizing generation module 212, and characteristics and motion compensated filtering predictor module 213. Morphing generation module 211 may use de-quantized morphing parameters (e.g., determined from input bitstream 201) to generate morphed reference frames. Synthesizing generation module 212 may generate super resolution (SR) pictures and projected interpolation (PI) pictures or the like based on parameters determined from input bitstream 201. If inter-prediction is applied, characteristics and motion compensated filtering predictor module 213 may apply motion compensation based on the received frames and motion vector data or the like in input bitstream 201.

Intra-prediction compensation may be performed by intra-directional prediction generation module 214. Intra-directional prediction generation module 214 may be configured to perform spatial directional prediction and may use decoded neighboring partitions according to intra-prediction data in input bitstream 201.

As shown in FIG. 2, prediction modes selector module 215 may determine a prediction mode selection from among, "skip", "auto", "inter", "multi", and "intra", for each prediction partition of a tile, all of which may apply to P- and F/B-pictures, based on mode selection data in input bitstream 201. In addition to prediction modes, it also allows for selection of reference types that can be different depending on "inter" or "multi" mode, as well as for P- and F/B-pictures. The prediction signal at the output of prediction modes selector module 215 may be filtered by prediction fusion filtering module 216. Prediction fusion filtering module 216 may perform filtering based on parameters (e.g., filtering coefficients, frequency, overhead) determined via input bitstream 201. In some examples, filtering the prediction signal may fuse different types of signals representing different modes (e.g., intra, inter, multi, skip, and auto). In some examples, intra-prediction signals may be different than all other types of inter-prediction signal(s) such that proper filtering may greatly enhance coding efficiency. The filtered prediction signal may provide the second input (e.g., prediction partition(s)) to differencer 206, as discussed above.

As discussed, the output of quality restoration filtering module 209 may be a final reconstructed frame. Final reconstructed frames may be transmitted to an adaptive picture re-organizer 217, which may re-order or re-organize frames as needed based on ordering parameters in input bitstream 201. Re-ordered frames may be transmitted to content post-restorer module 218. Content post-restorer module 218 may be an optional module configured to perform further improvement of perceptual quality of the decoded video. The improvement processing may be performed in response to quality improvement parameters in input bitstream 201 or it may be performed as standalone operation. In some examples, content post-restorer module 218 may apply parameters to improve quality such as, for example, an estimation of film grain noise or residual blockiness reduction (e.g., even after the deblocking operations discussed with respect to deblock filtering module 208). As shown, decoder 200 may provide display video 219, which may be configured for display via a display device (not shown).

FIG. 2 illustrates example control signals associated with operation of video decoder 200, where the indicated abbreviations may represent similar information as discussed with respect to FIG. 1 above. While these control signals are illustrated as being associated with specific example functional modules of decoder 200 in FIG. 4, other implementations may include a different distribution of control signals among the functional modules of encoder 100. The present disclosure is not limited in this regard and, in various examples, implementation of the control signals herein may include the undertaking of only a subset of the specific example control signals shown, additional control signals, and/or in a different arrangement than illustrated.

While FIGS. 1 through 2 illustrate particular encoding and decoding modules, various other coding modules or components not depicted may also be utilized in accordance with the present disclosure. Further, the present disclosure is not limited to the particular components illustrated in FIGS. 1 and 2 and/or to the manner in which the various components are arranged. Various components of the systems described herein may be implemented in software, firmware, and/or hardware and/or any combination thereof. For example, various components of encoder 100 and/or decoder 200 may be provided, at least in part, by hardware of a computing System-on-a-Chip (SoC) such as may be found in a computing system such as, for example, a mobile phone.

Further, it may be recognized that encoder 100 may be associated with and/or provided by a content provider system including, for example, a video content server system, and that output bitstream 111 may be transmitted or conveyed to decoders such as, for example, decoder 200 by various communications components and/or systems such as transceivers, antennae, network systems, and the like not depicted in FIGS. 1 and 2. It may also be recognized that decoder 200 may be associated with a client system such as a computing device (e.g., a desktop computer, laptop computer, tablet computer, convertible laptop, mobile phone, or the like) that is remote to encoder 100 and that receives input bitstream 201 via various communications components and/or systems such as transceivers, antennae, network systems, and the like not depicted in FIGS. 1 and 2. Therefore, in various implementations, encoder 100 and decoder subsystem 200 may be implemented either together or independent of one another.

Figure 3A:
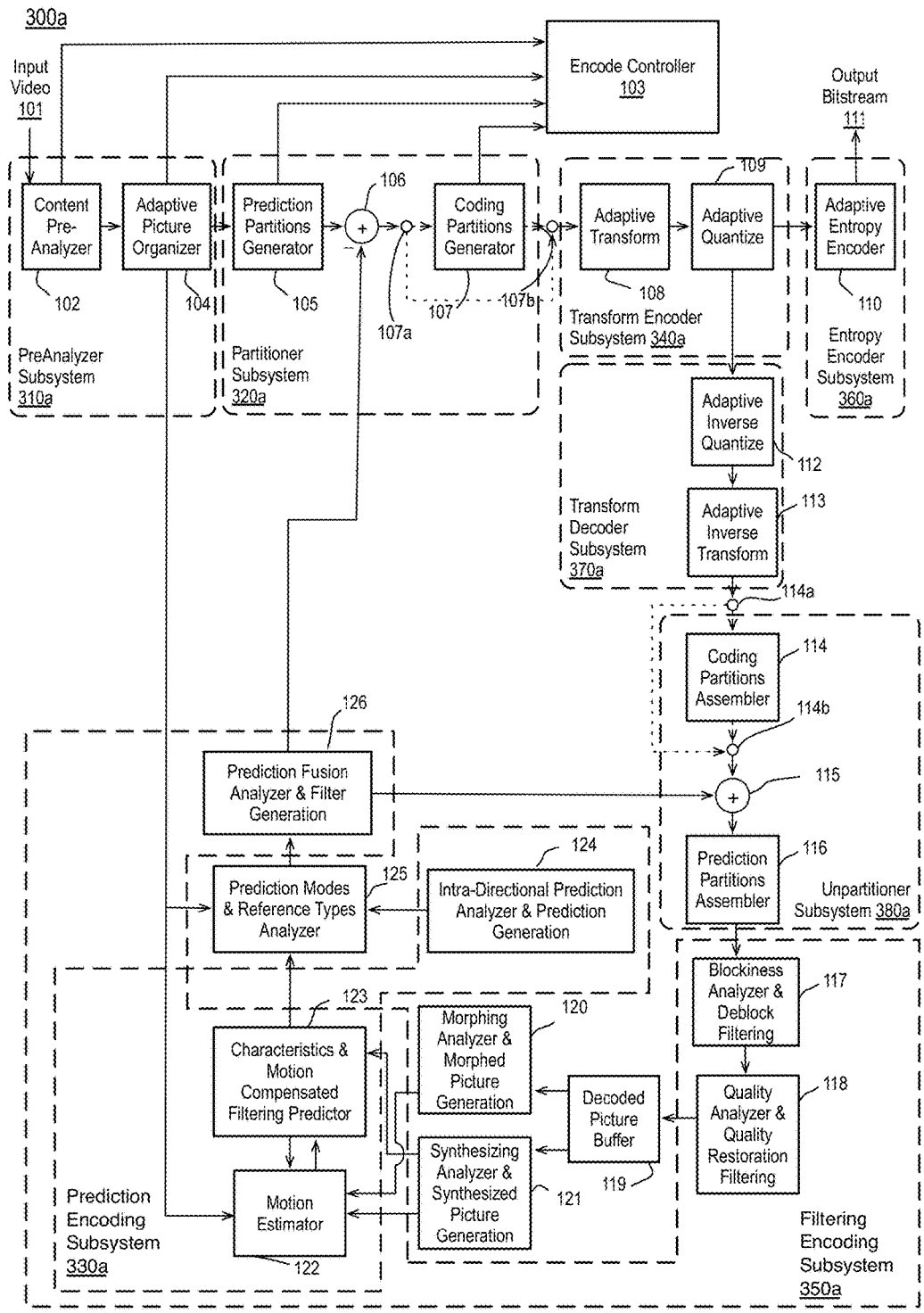
FIG. 3(a) is an illustrative diagram of an example next generation video encoder and subsystems.

FIG. 3(a) is an illustrative diagram of an example next generation video encoder 300a, arranged in accordance with at least some implementations of the present disclosure. FIG. 3(a) presents a similar encoder to that shown in FIGS. 1(a) and 1(b), and similar elements will not be repeated for the sake of brevity. As shown in FIG. 3(a), encoder 300a may include preanalyzer subsystem 310a, partitioner subsystem 320a, prediction encoding subsystem 330a, transform encoder subsystem 340a, filtering encoding subsystem 350a, entropy encoder system 360a, transform decoder subsystem 370a, and/or unpartioner subsystem 380a. Preanalyzer subsystem 310a may include content pre-analyzer module 102 and/or adaptive picture organizer module 104. Partitioner subsystem 320a may include prediction partitions generator module 105, and/or coding partitions generator 107. Prediction encoding subsystem 330a may include motion estimator module 122, characteristics and motion compensated filtering predictor module 123, and/or intra-directional prediction analyzer and prediction generation module 124. Transform encoder subsystem 340a may include adaptive transform module 108 and/or adaptive quantize module 109. Filtering encoding subsystem 350a may include blockiness analyzer and deblock filtering module 117, quality analyzer and quality restoration filtering module 118, motion estimator module 122, characteristics and motion compensated filtering predictor module 123, and/or prediction analyzer and prediction fusion filtering module 126. Entropy coding subsystem 360a may include adaptive entropy encoder module 110. Transform decoder subsystem 370a may include adaptive inverse quantize module 112 and/or adaptive inverse transform module 113. Unpartioner subsystem 380a may include coding partitions assembler 114 and/or prediction partitions assembler 116.

Partitioner subsystem 320a of encoder 300a may include two partitioning subsystems: prediction partitions generator module 105 that may perform analysis and partitioning for prediction, and coding partitions generator module 107 that may perform analysis and partitioning for coding. Another partitioning method may include adaptive picture organizer 104 which may segment pictures into regions or slices may also be optionally considered as being part of this partitioner.

Prediction encoder subsystem 330a of encoder 300a may include motion estimator 122 and characteristics and motion compensated filtering predictor 123 that may perform analysis and prediction of "inter" signal, and intra-directional prediction analyzer and prediction generation module 124 that may perform analysis and prediction of "intra" signal. Motion estimator 122 and characteristics and motion compensated filtering predictor 123 may allow for increasing predictability by first compensating for other sources of differences (such as gain, global motion, registration), followed by actual motion compensation. They may also allow for use of data modeling to create synthesized frames (super resolution, and projection) that may allow better predictions, followed by use of actual motion compensation in such frames.

Transform encoder subsystem 340a of encoder 300a may perform analysis to select the type and size of transform and may include two major types of components. The first type of component may allow for using parametric transform to allow locally optimal transform coding of small to medium size blocks; such coding however may require some overhead. The second type of component may allow globally stable, low overhead coding using a generic/fixed transform such as the DCT, or a picture based transform from a choice of small number of transforms including parametric transforms. For locally adaptive transform coding, PHT (Parametric Haar Transform) may be used. Transforms may be performed on 2D blocks of rectangular sizes between 4×4 and 64×64, with actual sizes that may depend on a number of factors such as if the transformed data is luma or chroma, inter or intra, and if the transform used is PHT or DCT. The resulting transform coefficients may be quantized, scanned and entropy coded.

Entropy encoder subsystem 360a of encoder 300a may include a number of efficient but low complexity components each with the goal of efficiently coding a specific type of data (various types of overhead, motion vectors, or transform coefficients). Components of this subsystem may belong to a generic class of low complexity variable length coding techniques, however, for efficient coding, each component may be custom optimized for highest efficiency. For instance, a custom solution may be designed for coding of "Coded/Not Coded" data, another for "Modes and Ref Types" data, yet another for "Motion Vector" data, and yet another one for "Prediction and Coding Partitions" data. Finally, because a very large portion of data to be entropy coded is "transform coefficient" data, multiple approaches for efficient handling of specific block sizes, as well as an algorithm that may adapt between multiple tables may be used.

Filtering encoder subsystem 350a of encoder 300a may perform analysis of parameters as well as multiple filtering of the reconstructed pictures based on these parameters, and may include several subsystems. For example, a first subsystem, blockiness analyzer and deblock filtering module 117 may deblock and dither to reduce or mask any potential block coding artifacts. A second example subsystem, quality analyzer and quality restoration filtering module 118, may perform general quality restoration to reduce the artifacts due to quantization operation in any video coding. A third example subsystem, which may include motion estimator 122 and characteristics and motion compensated filtering predictor module 123, may improve results from motion compensation by using a filter that adapts to the motion characteristics (motion speed/degree of blurriness) of the content. A fourth example subsystem, prediction fusion analyzer and filter generation module 126, may allow adaptive filtering of the prediction signal (which may reduce spurious artifacts in prediction, often from intra prediction) thereby reducing the prediction error which needs to be coded.

Encode controller module 103 of encoder 300a may be responsible for overall video quality under the constraints of given resources and desired encoding speed. For instance, in full RDO (Rate Distortion Optimization) based coding without using any shortcuts, the encoding speed for software encoding may be simply a consequence of computing resources (speed of processor, number of processors, hyper-threading, DDR3 memory etc.) availability. In such case, encode controller module 103 may be input every single combination of prediction partitions and coding partitions and by actual encoding, and the bitrate may be calculated along with reconstructed error for each case and, based on lagrangian optimization equations, the best set of prediction and coding partitions may be sent for each tile of each frame being coded. The full RDO based mode may result in best compression efficiency and may also be the slowest encoding mode. By using content analysis parameters from content preanalyzer module 102 and using them to make RDO simplification (not test all possible cases) or only pass a certain percentage of the blocks through full RDO, quality versus speed tradeoffs may be made allowing speedier encoding. Up to now we have described a variable bitrate (VBR) based encoder operation. Encode controller module 103 may also include a rate controller that can be invoked in case of constant bitrate (CBR) controlled coding.

Lastly, preanalyzer subsystem 310a of encoder 300a may perform analysis of content to compute various types of parameters useful for improving video coding efficiency and speed performance. For instance, it may compute horizontal and vertical gradient information (Rs, Cs), variance, spatial complexity per picture, temporal complexity per picture, scene change detection, motion range estimation, gain detection, prediction distance estimation, number of objects estimation, region boundary detection, spatial complexity map computation, focus estimation, film grain estimation etc. The parameters generated by preanalyzer subsystem 310a may either be consumed by the encoder or be quantized and communicated to decoder 200.

While subsystems 310a through 380a are illustrated as being associated with specific example functional modules of encoder 300a in FIG. 3(a), other implementations of encoder 300a herein may include a different distribution of the functional modules of encoder 300a among subsystems 310a through 380a. The present disclosure is not limited in this regard and, in various examples, implementation of the example subsystems 310a through 380a herein may include the undertaking of only a subset of the specific example functional modules of encoder 300a shown, additional functional modules, and/or in a different arrangement than illustrated.

Figure 3B:
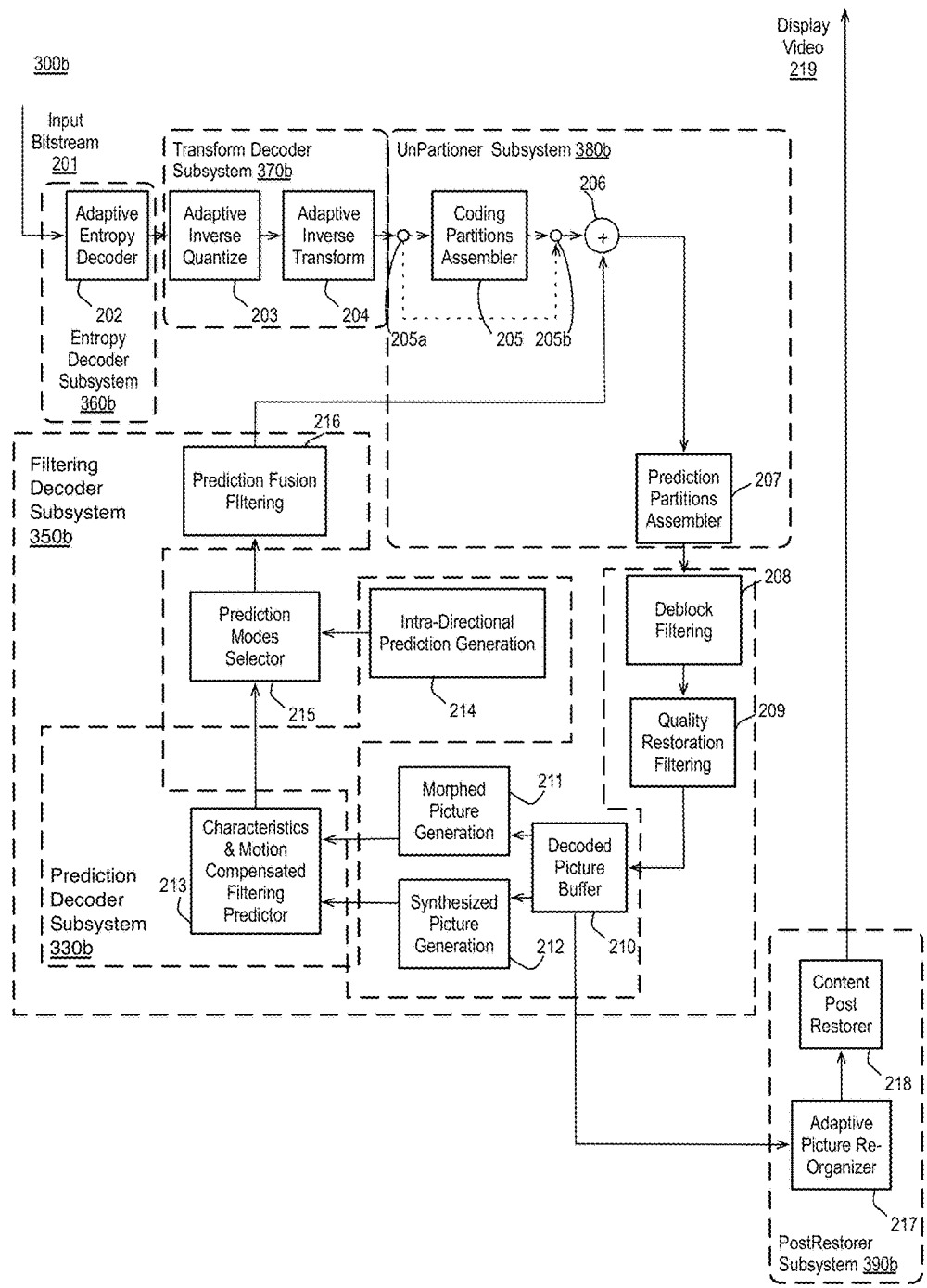
FIG. 3(b) is an illustrative diagram of an example next generation video decoder and subsystems.

FIG. 3(b) is an illustrative diagram of an example next generation video decoder 300b, arranged in accordance with at least some implementations of the present disclosure. FIG. 3(b) presents a similar decoder to that shown in FIG. 2, and similar elements will not be repeated for the sake of brevity. As shown in FIG. 3(b), decoder 300b may include prediction decoder subsystem 330b, filtering decoder subsystem 350b, entropy decoder subsystem 360b, transform decoder subsystem 370b, unpartitioner_2 subsystem 380b, unpartitioner_1 subsystem 351b, filtering decoder subsystem 350b, and/or postrestorer subsystem 390b. Prediction decoder subsystem 330b may include characteristics and motion compensated filtering predictor module 213 and/or intra-directional prediction generation module 214. Filtering decoder subsystem 350b may include deblock filtering module 208, quality restoration filtering module 209, characteristics and motion compensated filtering predictor module 213, and/or prediction fusion filtering module 216. Entropy decoder subsystem 360b may include adaptive entropy decoder module 202. Transform decoder subsystem 370b may include adaptive inverse quantize module 203 and/or adaptive inverse transform module 204. Unpartitioner_2 subsystem 380b may include coding partitions assembler 205. Unpartitioner_1 subsystem 351b may include prediction partitions assembler 207. Postrestorer subsystem 790 may include content post restorer module 218 and/or adaptive picture re-organizer 217.

Entropy decoding subsystem 360b of decoder 300b may perform the inverse operation of the entropy encoder subsystem 360a of encoder 300a, i.e., it may decode various data (types of overhead, motion vectors, transform coefficients) encoded by entropy encoder subsystem 360a using a class of techniques loosely referred to as variable length decoding. Specifically, various types of data to be decoded may include "Coded/Not Coded" data, "Modes and Ref Types" data, "Motion Vector" data, "Prediction and Coding Partitions" data, and "Transform Coefficient" data.

Transform decoder subsystem 370b of decoder 300b may perform inverse operation to that of transform encoder subsystem 340a of encoder 300a. Transform decoder subsystem 370b may include two types of components. The first type of example component may support use of the parametric inverse PHT transform of small to medium block sizes, while the other type of example component may support inverse DCT transform for all block sizes. The PHT transform used for a block may depend on analysis of decoded data of the neighboring blocks. Output bitstream 111 and/or input bitstream 201 may carry information about partition/block sizes for PHT transform as well as in which direction of the 2D block to be inverse transformed the PHT may be used (the other direction uses DCT). For blocks coded purely by DCT, the partition/block sizes information may be also retrieved from output bitstream 111 and/or input bitstream 201 and used to apply inverse DCT of appropriate size.

Unpartitioner subsystem 380b of decoder 300b may perform inverse operation to that of partitioner subsystem 320a of encoder 300a and may include two unpartitioning subsystems, coding partitions assembler module 205 that may perform unpartitioning of coded data and prediction partitions assembler module 207 that may perform unpartitioning for prediction. Further if optional adaptive picture organizer module 104 is used at encoder 300a for region segmentation or slices, adaptive picture re-organizer module 217 may be needed at the decoder.

Prediction decoder subsystem 330b of decoder 300b may include characteristics and motion compensated filtering predictor module 213 that may perform prediction of "inter" signal and intra-directional prediction generation module 214 that may perform prediction of "intra" signal. Characteristics and motion compensated filtering predictor module 213 may allow for increasing predictability by first compensating for other sources of differences (such as gain, global motion, registration) or creation of synthesized frames (super resolution, and projection), followed by actual motion compensation.

Filtering decoder subsystem 350b of decoder 300b may perform multiple filtering of the reconstructed pictures based on parameters sent by encoder 300a and may include several subsystems. The first example subsystem, deblock filtering module 208, may deblock and dither to reduce or mask any potential block coding artifacts. The second example subsystem, quality restoration filtering module 209, may perform general quality restoration to reduce the artifacts due to quantization operation in any video coding. The third example subsystem, characteristics and motion compensated filtering predictor module 213, may improve results from motion compensation by using a filter that may adapt to the motion characteristics (motion speed/degree of blurriness) of the content. The fourth example subsystem, prediction fusion filtering module 216, may allow adaptive filtering of the prediction signal (which may reduce spurious artifacts in prediction, often from intra prediction) thereby reducing the prediction error which may need to be coded.

Postrestorer subsystem 390b of decoder 300b is an optional block that may perform further improvement of perceptual quality of decoded video. This processing can be done either in response to quality improvement parameters sent by encoder 100, or it can be standalone decision made at the postrestorer subsystem 390b. In terms of specific parameters computed at encoder 100 that can be used to improve quality at postrestorer subsystem 390b may be estimation of film grain noise and residual blockiness at encoder 100 (even after deblocking). As regards the film grain noise, if parameters can be computed and sent via output bitstream 111 and/or input bitstream 201 to decoder 200, then these parameters may be used to synthesize the film grain noise. Likewise, for any residual blocking artifacts at encoder 100, if they can be measured and parameters sent via output bitstream 111 and/or bitstream 201, postrestorer subsystem 390b may decode these parameters and may use them to optionally perform additional deblocking prior to display. In addition, encoder 100 also may have access to scene change, spatial complexity, temporal complexity, motion range, and prediction distance information that may help in quality restoration in postrestorer subsystem 390b.

While subsystems 330b through 390b are illustrated as being associated with specific example functional modules of decoder 300b in FIG. 3(b), other implementations of decoder 300b herein may include a different distribution of the functional modules of decoder 300b among subsystems 330b through 390b. The present disclosure is not limited in this regard and, in various examples, implementation of the example subsystems 330b through 390b herein may include the undertaking of only a subset of the specific example functional modules of decoder 300b shown, additional functional modules, and/or in a different arrangement than illustrated.

Figure 4:
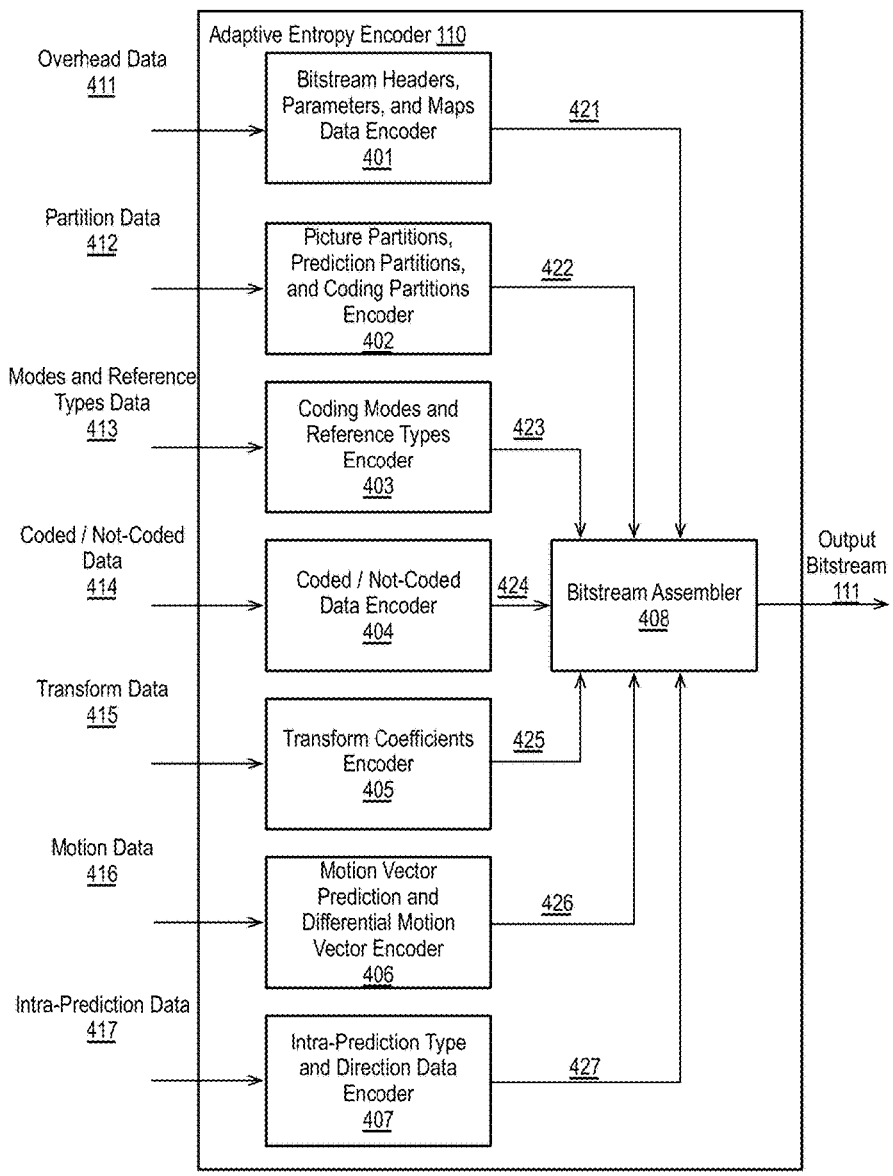
FIG. 4 is an illustrative diagram of an example entropy encoder module.

FIG. 4 is an illustrative diagram of an example entropy encoder module 110, arranged in accordance with at least some implementations of the present disclosure. As shown, entropy encoder module 110 may include bitstream headers, parameters and maps data encoder module 401, picture partitions, prediction partitions, and coding partitions encoder module 402, coding modes and reference types encoder module 403, coded/not-coded data encoder module 404, transform coefficients encoder module 405, motion vector prediction and differential motion vector encoder module 406, intra-prediction type and direction data encoder module 407, and/or bitstream assembler module 408. In the discussion herein, each of modules 401-407 may be shortened to encoder module 401, encoder module 404, or the like for the sake of brevity.

As shown, encoder modules 401-407 may receive video data 411-417, respectively, via adaptive entropy encoder 110. In some examples, received video data 411-417 may be received from various modules of encoder 100 as discussed herein. As shown, encoder modules 401-407 may compress the received video data 411-417 to generated compressed video data 421-427. Compressed video data 421-427 may be provided to bitstream assembler 408, which may assemble compressed video data 421-427 to generate output bitstream 111.

In some examples, encoder modules 401-407 may each include one or more specialized component(s) for efficiently encoding the type of data associated with received video data 411-417. In some examples, one or more of encoder modules 401-407 may preprocess the received video data 411-417 and/or select an entropy coding technique based on a parameter, parameters, or characteristics of the received video data 411-417 or other system information.

For example, encoder module 401 may receive overhead data 411, which may include bitstream header data (e.g., sequence and/or picture level bitstream headers), morphing parameters, synthesizing parameters, or global maps data (e.g., quantizer maps of pictures indicating quantizers to be used on a partition basis). As is discussed further below with respect to FIG. 6, in some examples, encoder module 401 may implement an adaptive symbol-run variable length coding technique, an adaptive proxy variable length coding technique, or a variable length coding table or tables compression of video data 411. In some examples, encoder module 411 may determine which technique provides the greatest compression efficiency (e.g., the fewest bits for compressed video data 421) such that the parameter(s) associated with video data 411 may be the number of bits needed for each coding technique or the like. Encoder module 411 may entropy encode video data 411 to generate compressed video data 421 (e.g., compressed overhead data), which may be transmitted to bitstream assembler 408 as shown.

As discussed, in some examples, the parameter associated with the video data (e.g., any of video data 411-417) may be a fewest number of attainable bits, most efficient encoding technique, or the like. In other examples, the parameter associated with the video data may be a predefined or predetermine parameter such that encoding technique is predetermined. In some examples, the parameter associated with the video data may be based on a characteristic of the video data such that the determined encoding technique may be adaptive to the received video data as is discussed further herein.

As shown, in some examples, encoder module 402 may receive partition data 412, which may include picture slices or regions data, intra-prediction partition data, and/or inter-prediction partition and coding partition data. As is discussed further below with respect to FIG. 6, in some examples, encoder module 412 may implement an adaptive symbol-run variable length coding technique or an adaptive proxy variable length coding technique for the compression of the intra-prediction partition data and/or inter-prediction partition data portions of video data 412 based on a parameter associated with the intra-prediction partition data and/or inter-prediction partition data (e.g., a fewest number of attainable bits, most efficient encoding technique, a predetermined parameter, characteristics of video data 412, or the like), and encoder module 412 may implement adaptive codebook variable length coding for the slices or regions data portions of video data 412 to generate compressed video data 422 (e.g., compressed partition data), which may be transmitted to bitstream assembler 408 as shown. In some examples, the intra-prediction partition data and/or inter-prediction partition data may include data indicating the partitioning of tiles into partitions, partitions into sub-partitions, or the like. In some examples, the partitions and/or sub-partitions may include prediction partitions and/or sub-partitions. In some examples, partitions and/or sub-partitions may include coding partitions and/or sub-partitions.

Further as shown, in some examples, encoder module 403 may receive modes and reference types data 413, which may include modes (e.g., intra, split, skip, auto, inter, or multi) data and/or references data for each prediction partition. For example, the mode split information may indicate whether a partition is further divided or not. If a partition is further divided, the mode data may further include direction information indicating whether the split is a horizontal split (e.g., hor) or a vertical split (e.g., vert). As is discussed further below with respect to FIG. 6, in some examples, encoder module 403 may implement an adaptive symbol-run variable length coding technique or an adaptive proxy variable length coding technique for separate coding of split/non-split partition information data, separate coding of split/non-split split information data, or prediction reference information data based on a parameter associated with the data (e.g., a fewest number of attainable bits, most efficient encoding technique, a predetermined parameter, characteristics of the pertinent portions of video data 413, or the like), and encoder module 403 may implement adaptive variable length coding for joint coding of modes and split information to generate compressed video data 423 (e.g., compressed modes and reference types data), which may be transmitted to bitstream assembler 408 as shown.

Further, in some examples, encoder module 404 may receive coded/not-coded data 414, which may include coded/not-coded data as discussed herein. For example, a partition (or sub-partition) may be coded if it has any nonzero transform coefficients and a partition (or sub-partition) may be not-coded if it has all zero transform coefficients. In some examples, coded/not-coded data may not be needed for partitions having an intra or skip mode. In some examples, coded/not-coded data may be needed for partitions having an auto, inter, or multi mode. As is discussed further below with respect to FIG. 6, in some examples, encoder module 404 may implement an adaptive symbol-run variable length coding technique or an adaptive proxy variable length coding technique for coded/not-coded data based on a parameter associated with the coded/not-coded data (e.g., a fewest number of attainable bits, most efficient encoding technique, a predetermined parameter, characteristics of video data 414, or the like) to generate compressed video data 424 (e.g., compressed coded/not-coded data), which may be transmitted to bitstream assembler 408 as shown.

In some examples, encoder module 405 may receive transform data 415, which may include transform coefficient data. For example, for blocks or partitions or sub-partitions that are coded (e.g., have one or more nonzero transform coefficients), transform coefficient data may be received for entropy encoding. As is discussed further with respect to FIG. 6, encoder module 405 may implement adaptive vector variable length coding for blocks or partitions or sub-partitions having a block or partition or sub-partition size of 2 in one dimension (e.g., 2×K partitions or K×2 sized partitions). Further, encoder module 405 may implement adaptive 1-dimensional variable length coding for blocks or partitions or sub-partitions of size 4×4 and adaptive 2-dimensional variable length coding for all other block or partition or sub-partition sizes (e.g., 4×8, 8×4, 8×8, 16×16, 32×32, 64×64, and so on). The generated compressed video data 425 (e.g., compressed transform data) may be transmitted to bitstream assembler 408 as shown.

For example, the transform coefficient data may result from a forward transform of rectangular (or square or the like) partitions of pixel data or rectangular (or square or the like) of pixel difference values implemented via adaptive transform module 108 followed by a quantization of the resulting coefficients via adaptive quantize module 109. In some examples, the transform coefficient data may be scanned to convert it to a 1-dimensional frequency ordered partition via encoder module 405. Such conversion may be highly adaptive any partition size (e.g., 24 or more or 32 or more partition sizes), different data types (e.g., discrete cosine transform coefficients or hybrid parametric Haar transform coefficients or the like of either intra or inter partitions), and/or different quantizer set characteristics (e.g., various combinations of quantizer parameters and/or matrices). Further, a block or partition or sub-partition may belong to different picture types: I-picture (e.g., intra compensation only), P-picture (e.g., predictive) or F-picture (e.g., functional) and/or may represent different types of signal or data (e.g., luma or chroma or the like), which may be quantized with different quantizer setting.

Further, in some examples, encoder module 406 may receive motion data 416, which may include motion vector data. As is discussed further with respect to FIG. 6, motion vector prediction may be performed based on video data 416 to generate one or more predicted motion vectors. A predicted motion vector may be differenced with an original motion data of video data 416 to generate a difference motion vector. In some examples, encoder module 416 may implement an adaptive classified variable length coding for the difference motion vector(s) to generate compressed video data 426 (e.g., compressed motion data), which may be transmitted to bitstream assembler 408 as shown.

Further, in some examples, encoder module 407 may receive intra-prediction data 417, which may include intra-prediction type or intra-prediction direction data. For example, as discussed, intra coding may use prediction, which may use neighboring past decoded partition(s) within the same frame to generate spatial prediction. In such examples, there may be predictors for indicating a past decoded partition or partitions. For example, the predictors may include dc, slope, directional, BTPC, feature matching, or the like. Further, in some examples, the directional predictor may be adaptive for different partition sizes. For example, specifying a directional predictor may include providing an technique for determining angular prediction pixel partition(s) for coding using causal neighboring decoded partitions and/or specifying a technique for entropy coding spatial prediction directions. In some examples, such techniques may be performed via encoder module 407. As is discussed further below with respect to FIG. 6, in some examples, encoder module 407 may implement an adaptive variable length coding technique or an arithmetic coding technique for intra-prediction type or intra-prediction direction data based on a parameter associated with the intra-prediction type or intra-prediction direction data (e.g., a fewest number of attainable bits, most efficient encoding technique, a predetermined parameter, characteristics of video data 417, or the like) to generate compressed video data 427 (e.g., compressed intra-prediction data), which may be transmitted to bitstream assembler 408 as shown.

As shown in FIG. 4, adaptive entropy encoder 110 may include bitstream assembler 408. In some examples, some or all of encoder modules 401-407 may provide entropy coded compressed video data 421-427 at different instances in time. Further, in some examples, one or some of compressed video data 421-427 may be picture based, region or slice based, tile based, prediction partition based, coding partition based, or any combination thereof. In some examples, bitstream assembler may multiplex (the potentially different) compressed video data 421-427 to create a valid bitstream such as, for example, output bitstream 111. For example, the valid bitstream may be a valid next generation video (NGV) coded bitstream, which may following a NGV bitstream syntax specification. In some examples, output bitstream 111 may be a video only bitstream. In some examples, output bitstream 111 may be multiplexed (e.g., Transport or a Media File Format) with uncoded or coded audio to create a multiplexed audio-visual stream. In any event, the bitstream may be used local decode, storage, or transmission to a decoder as discussed herein.

Figure 5:
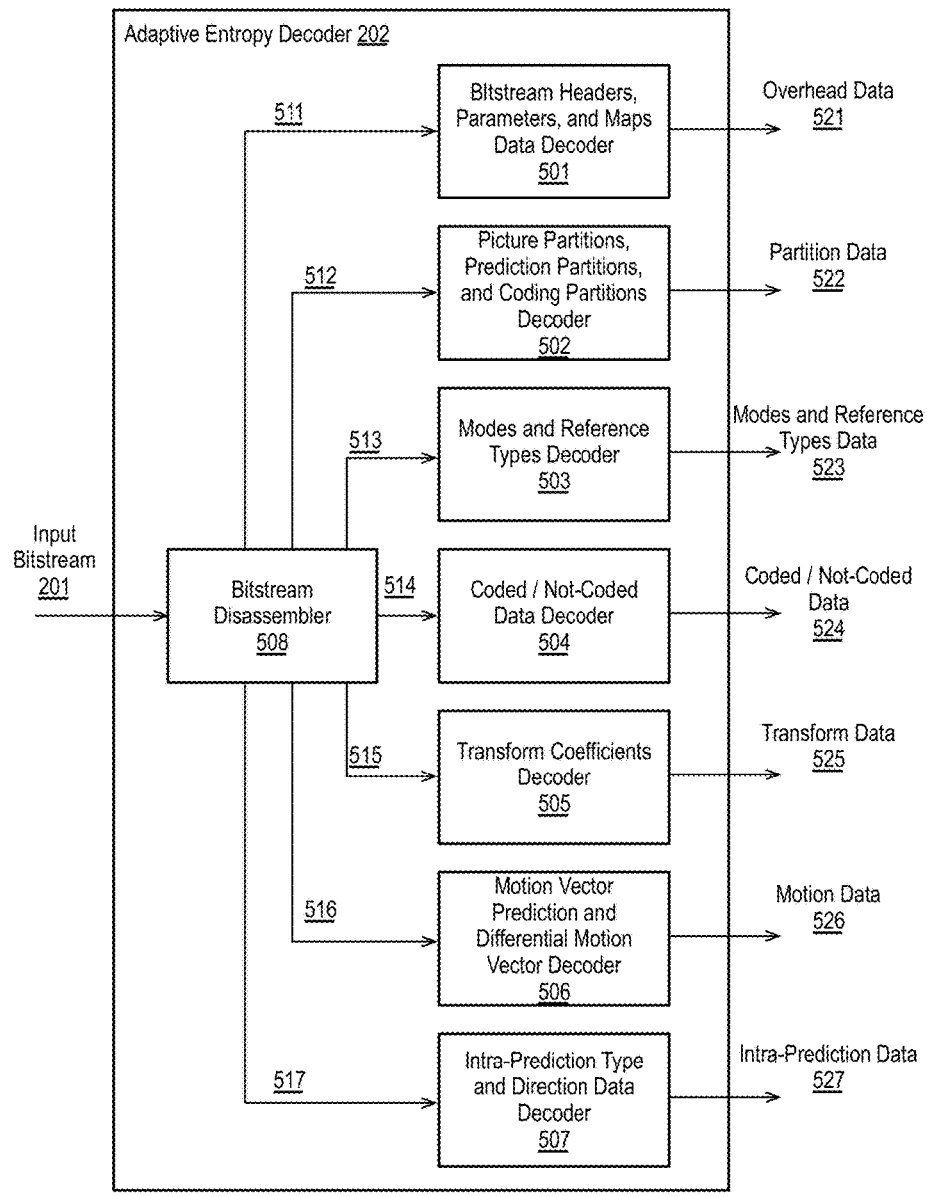
FIG. 5 is an illustrative diagram of an example entropy decoder module.

FIG. 5 is an illustrative diagram of an example entropy decoder module 202, arranged in accordance with at least some implementations of the present disclosure. As shown, entropy decoder module 202 may include bitstream headers, parameters and maps data decoder module 501, picture partitions, prediction partitions, and coding partitions decoder module 502, coding modes and reference types decoder module 503, coded/not-coded data decoder module 504, transform coefficients decoder module 505, motion vector and differential motion vector decoder module 506, intra-prediction and direction data decoder module 507, and/or bitstream disassembler module 508. In the discussion herein, each of modules 501-507 may be shortened to decoder module 501, decoder module 505, or the like for the sake of brevity.

As shown, bitstream disassembler module 508 may receive input bitstream 201. In some examples, input bitstream 201 may be a valid bitstream such as, for example, a valid next generation video (NGV) coded bitstream, which may follow a NGV bitstream syntax specification. In some examples, input bitstream 201 may be a video only bitstream. In some examples, input bitstream 201 may be a multiplexed audio-visual stream as discussed herein. Bitstream disassembler module 508 may disassemble input bitstream 201 to determine compressed video data 511-517 as shown. For example, bitstream disassembler module 508 may use a predefined syntax or specification to divide input bitstream 201 into component compressed video data 511-517 by data type for decompression via decoder modules 501-507. In some examples, bitstream disassembler module 508 may perform an inverse operation with respect to bitstream assembler module 508.

As shown in FIG. 5, decoder modules 501-507 may receive compressed video data 511-517, respectively, and generate video data 521-527. Video data 521-527 may be transmitted to various components of decoder 200 for further decoding as discussed herein. Decoder 200 may thereby generate video frame(s) for presentment to a user via a display device (not shown). In some examples, decoder modules 501-507 may each perform an inverse operation with respect to encoder modules 401-407. In some examples, decoder modules 501-507 may each include one or more specialized component(s) for efficiently entropy decoding the type of data associated with compressed video data 511-517.

For example, decoder module 501 may receive compressed overhead data 511, which may include compressed bitstream header data (e.g., sequence and/or picture level bitstream headers), morphing parameters, synthesizing parameters, or global maps data (e.g., quantizer maps of pictures indicating quantizers to be used on a partition basis). In some examples, decoder module 511 may implement an adaptive symbol-run variable length coding technique, an adaptive proxy variable length coding technique, or a variable length coding table or tables for decompression of compressed overhead data 511 to generate overhead data 521. In some examples, decoder module 501 may determine which coding technique to implement based on a parameter or indicator provided via bitstream 201.

As shown, in some examples, decoder module 502 may receive compressed partition data 512, which may include compressed picture slices or regions data, intra-prediction partition data, and/or inter-prediction partition data. In some examples, decoder module 512 may implement an adaptive symbol-run variable length coding technique or an adaptive proxy variable length coding technique for the decompression of the intra-prediction partition data and/or inter-prediction partition data portions of compressed partition data 512, and decoder module 512 may implement an adaptive codebook variable length coding for the decompression of the slices or regions data portions of compressed partition data 512 to generate partition data 522. In some examples, the intra-prediction partition data and/or inter-prediction partition data may include data indicating the partitioning of tiles into partitions, partitions into sub-partitions, or the like. In some examples, the partitions and/or sub-partitions may include prediction partitions and/or sub-partitions. In some examples, partitions and/or sub-partitions may include coding partitions and/or sub-partitions. In some examples, decoder module 502 may determine which coding technique to implement for the decompression of the intra-prediction partition data and/or inter-prediction partition data portions of compressed video data 512 based on a parameter or indicator provided via bitstream 201.

Further, in some examples, decoder module 503 may receive compressed modes and reference types data 513, which may include compressed modes (e.g., intra, split, skip, auto, inter, or multi) data and/or references data for each prediction partition. For example, the mode split information may indicate whether a partition is further divided or not. If a partition is further divided, the mode data may further include direction information indicating whether the split is a horizontal split (e.g., hor) or a vertical split (e.g., vert). In some examples, decoder module 503 may implement an adaptive symbol-run variable length coding technique or an adaptive proxy variable length coding technique for decompression of separate coding of split/non-split partition information data, separate coding of split/non-split split information data, or prediction reference information data, and decoder module 503 may implement an adaptive variable length coding for decompression of joint coding of modes and split information to generate modes and reference types data 523. In some examples, decoder module 503 may determine which coding technique to implement for decompression of separate coding of split/non-split partition information data, separate coding of split/non-split split information data, or prediction reference information data based on a parameter or indicator provided via bitstream 201.

Further, in some examples, decoder module 504 may receive compressed coded/not-coded data 514, which may include coded/not-coded data as discussed herein. For example, a partition (or sub-partition) may be coded if it has any nonzero transform coefficients and a partition (or sub-partition) may be not-coded if it has all zero transform coefficients. In some examples, coded/not-coded data may not be needed for partitions having an intra or skip mode. In some examples, coded/not-coded data may be needed for partitions having an auto, inter, or multi mode. In some examples, decoder module 504 may implement an adaptive symbol-run variable length coding technique or an adaptive proxy variable length coding technique for decompression of coded/not-coded data to generate coded/not-coded data 524. In some examples, decoder module 504 may determine which coding technique to implement for decompression based on a parameter or indicator provided via bitstream 201.

As shown, in some examples, decoder module 505 may receive compressed transform data 515, which may include transform coefficient data. For example, for blocks or partitions or sub-partitions that are coded (e.g., have one or more nonzero transform coefficients) compressed transform data 515 may include transform coefficient data. In some examples, decoder module 505 may implement an adaptive vector variable length coding for decompression of blocks or partitions or sub-partitions having a block or partition or sub-partition size of 2 in one dimension (e.g., 2×K partitions or K×2 sized partitions. Further, decoder module 505 may implement an adaptive 1-dimensional variable length coding for decompression of blocks or partitions or sub-partitions of size 4×4 and adaptive 2-dimensional variable length coding for decompression of all other block or partition or sub-partition sizes (e.g., 4×8, 8×4, 8×8, 16×16, 32×32, 64×64, and so on). The generated transform data 525 may be transmitted to other module(s) of decoder 200 as shown.

Further, in some examples, decoder module 506 may receive compressed motion data 516, which may include motion vector data. As is discussed further below with respect to FIG. 6, in some examples, compressed motion data 516 may be decompressed using an adaptive classified variable length coding technique to generate predicted difference motion vectors. The predicted difference motion vectors may be added to motion vector prediction to generate reconstructed motion vectors. The motion vector prediction may be generated based on previously decoded motion vectors of neighboring blocks or partitions using the inverse of the technique implemented via encoder module 506, for example, and/or motion vectors. The reconstructed motion vectors may be transmitted to other module(s) of decoder 200 via motion data 526 as shown.

Further, in some examples, decoder module 507 may receive compressed intra-prediction data 517, which may include intra-prediction type or intra-prediction direction data. For example, as discussed, intra coding may use prediction, which may use neighboring past decoded partition(s) within the same frame to generate spatial prediction. In such examples, there may be predictors for indicating a past decoded partition or partitions. For example, the predictors may include dc, slope, directional, BTPC, feature matching, or the like. Further, in some examples, the directional predictor may be adaptive for different partition sizes. For example, specifying a directional predictor may include providing an technique for determining angular prediction pixel partition(s) for coding using causal neighboring decoded partitions and/or specifying a technique for entropy coding spatial prediction directions. In some examples, decoder module 517 may implement an adaptive variable length coding technique or an arithmetic coding technique for decompression of intra-prediction type or intra-prediction direction data to generate intra-prediction data 527. In some examples, decoder module 507 may determine which coding technique to implement for decompression based on a parameter or indicator provided via bitstream 201.

As discussed above, a variety of entropy coding techniques may be implemented on various data types for lossless compression of video data to generate compressed video data at an entropy encoder and for decompression of the compressed video data to generate duplicate video data at an entropy decoder.

In some examples, an adaptive symbol-run variable length coding technique may be implemented. For example, encoder and decoder modules 401, 501, 402, 502, 403, 503, and/or 404, 504 may implement an adaptive symbol-run variable length coding technique on some or all of the video data or compressed video data received.

In some examples, an adaptive symbol-run variable length coding technique may include coding of relative difference in addresses between non-skipped blocks within a frame in video coding that allows one to determine the number of consecutive skipped blocks. For example, in the context of coded/not-coded data as encoded and decoded via encoder and decoder modules 504, 504, instead of sending one bit (e.g., bit-map) for each block to signal coded/not-coded (e.g., skipped) blocks, encoder module 504, for example, may encode a run of skipped blocks. In such implementations, the longer the run of skipped blocks, the more efficiently the data may be compressed.

Further, several types of adaptivity may be added to adaptive symbol-run variable length coding technique as described herein: adaptivity that may allow for use of multiple tables, adaptivity that may allow for use of either performing this type of coding on original bit map data, inverted bitmap, differential bitmap, or gradient predictive bitmap, or the like. For example, the adaptive symbol-run variable length coding technique may include converting the first video data from bit map data to at least one of an inverted bitmap, a differential bit map, or a gradient predictive bit map before applying adaptive symbol-run variable length coding. For example, adaptive symbol-run variable length coding technique may be used to entropy encode substantially any type of event (e.g., symbol/run combination). Further, symbol/run events may be used to code multi-level (e.g., 0, 1, 2, 3, etc.) or binary (e.g., 0, 1) events. In examples where multi-level events are encoded, adaptive symbol-run variable length coding technique may be applied a number of consecutive times, breaking a multi-level map into a number of binary sub-maps, with each previous sub-map, excluded from next level's sub-map, or the like.

In some examples, an adaptive proxy variable length coding technique may be implemented. For example, encoder and decoder modules 401, 501, 402, 502, 403, 503, and/or 404, 504 may implement an adaptive proxy variable length coding technique on some or all of the video data or compressed video data received.

In some examples, an adaptive proxy variable length coding technique may include substitution of original fixed length 1D blocks (e.g., groups) of bits with variable length codes (e.g., patterns of sequence of bits) such that after the replacement the resulting bitstream may be smaller in size. In some examples, at the decoder, the process may be repeated (or inversed) resulting in original intended bitstream. In some examples, the original blocks of bits replaced may be of fixed small sizes (e.g., groups of 2 bits, groups of 3 bits, or groups of 4 bits, or the like). In some examples, the replacement codes may be of small size and variable length in nature. In some examples, the adaptive proxy variable length coding discussed herein may be characterized as Short VLCs (e.g., variable length codes). Further, the adaptive proxy variable length coding technique described herein may be adaptive to content by providing multiple replacement options. In some examples, 1-dimensional blocks/groups of 2 bits may be replaced with 1-3 bit long codes. In some examples, 1-dimensional blocks/groups (or collections of blocks/groups) of 3 bits with codes may be replaced with 1-5 bit long codes. In some examples, the adaptive proxy variable length coding technique may exploit statistical redundancy within a bitstream. In some examples, the adaptive proxy variable length coding technique may provide a compression gain of about 1-1.3. In some examples, adaptive proxy variable length coding technique may offer the advantage of being amenable to application to short sequence of bits.

In some examples, an adaptive block-of-symbols variable length coding technique may be implemented. For example, encoder and decoder modules 405, 505 may implement an adaptive block-of-symbols variable length coding technique on some or all of the video data or compressed video data received.

In some examples, an adaptive block-of-symbols variable length coding technique may include two sub-coding techniques, as will be discussed further with respect to FIG. 7. For example, the adaptive block-of-symbols variable length coding technique may include an adaptive vector variable length coding technique and an adaptive 1D/2D (1-dimensional/2-dimensional) variable length coding technique. In some examples, the adaptive block-of-symbols variable length coding technique may be used to encode blocks of closely related symbols such as blocks of transform coefficients as discussed herein.

In some examples, the adaptive vector variable length coding technique of the adaptive block-of-symbols variable length coding technique may encode relatively small 2D blocks or partitions of symbols by use of a joint single codeword such that coding a block of symbols may result in a VLC (variable length coding) codebook. In some examples, the larger the size of the block or partition, the larger the size of the codebook. In some examples, the adaptive vector variable length coding technique may be applied to block or partition sizes having a size 2 in one dimension (e.g., 2×K or K×2 blocks or partitions). By applying the adaptive vector variable length coding technique to blocks or partitions of such sizes, the size of the VLC codebook may be advantageously limited.

In some examples, the adaptive 1D variable length coding technique of the adaptive block-of-symbols variable length coding technique may be used for coding 4×4 transform coefficient block or partition sizes. is essentially same as the CAVLC coder. This coder is primarily used for coding 4×4. In some examples, the adaptive 1D variable length coding technique may be implemented via a content adaptive variable length coding technique with a number of different VLC Tables used based on the context of the coefficient(s) being coded. For example, based on the context of the coefficient(s) being coded encoder and/or decoder modules 505, 505 may switch VLC Tables.

In some examples, the adaptive 2D variable length coding technique of the adaptive block-of-symbols variable length coding technique may utilize two dimensional properties of a block of symbols to switch based on context between a number of different VCL Tables. In some examples, the adaptive 2D variable length coding technique may be characterized as a CA2DVLC (Content Adaptive 2D Variable Length) coder. In some examples, In some examples, the adaptive 2D variable length coding technique may be used to encode all remaining transform coefficient block or petition sizes besides 2×K, K×2 blocks and 4×4 blocks (e.g., 4×8, 8×4, 8×8, 16×16, 32×32, 64×64, and so on).

Figure 6:
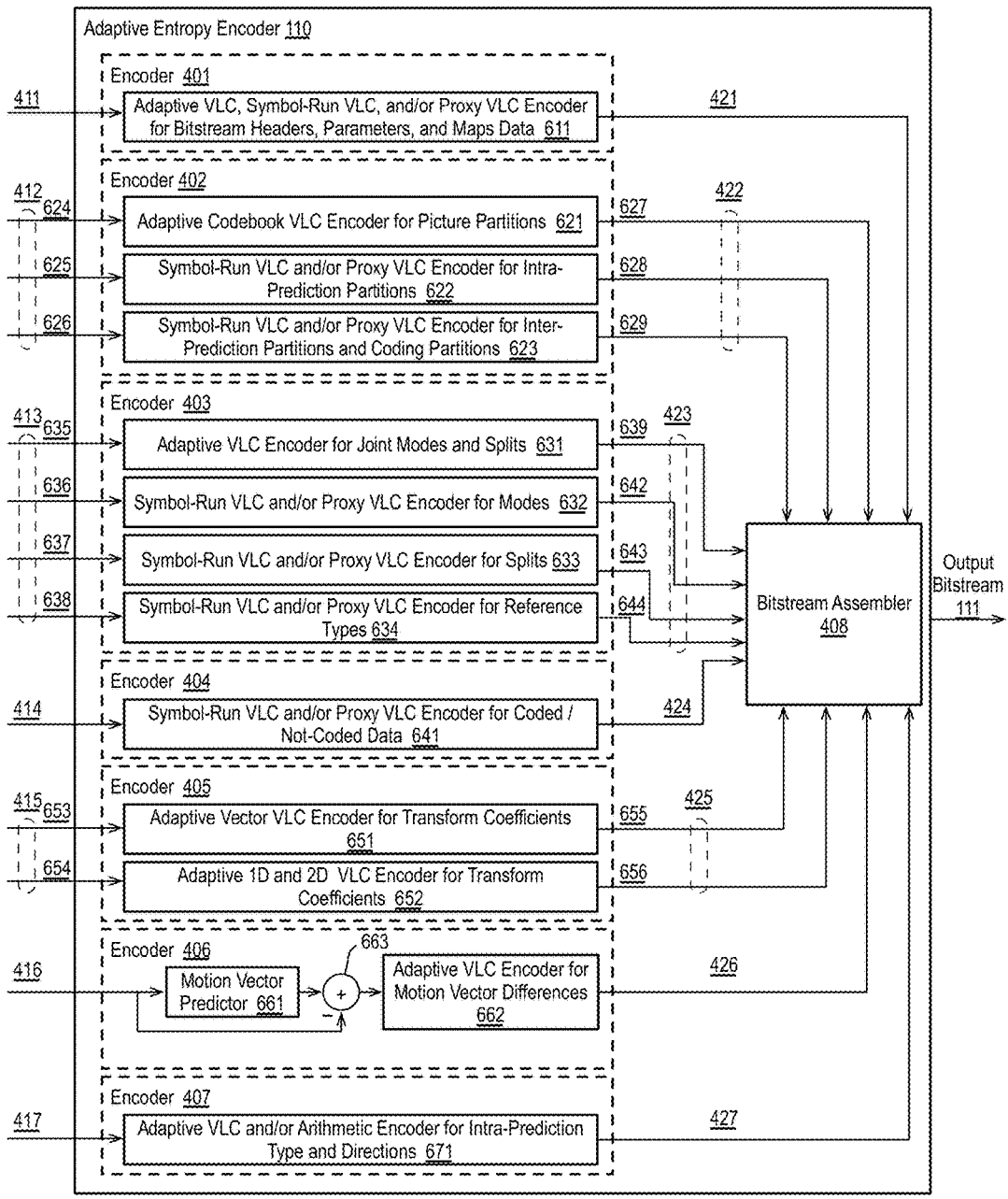
FIG. 6 is an illustrative diagram of an example entropy encoder module.

FIG. 6 is an illustrative diagram of an example entropy encoder module 110, arranged in accordance with at least some implementations of the present disclosure. As shown and as discussed above with respect to FIG. 4, entropy encoder module 110 may include bitstream headers, parameters and maps data encoder module 401, picture partitions, prediction partitions, and coding partitions encoder module 402, coding modes and reference types encoder module 403, coded/not-coded data encoder module 404, transform coefficients encoder module 405, motion vector and differential motion vector encoder module 406, intra-prediction and direction data encoder module 407, and/or bitstream assembler module 408.

As shown, encoder module 401 may include adaptive VLC, symbol-run VLC, and/or proxy VLC encoder for bitstream headers, parameters, and maps data module 611 and may receive video data 411. Video data 411 may have a data type such that video data 411 may include bitstream header data (e.g., sequence and/or picture level bitstream headers), morphing parameters, synthesizing parameters, and/or global maps data (e.g., quantizer maps of pictures indicating quantizers to be used on a partition basis). In some examples, an entropy encoding technique may be determined for video data 411 based on a parameter, parameters or characteristics of video data 411 or other system parameters. In some examples, the entropy encoding technique for video data 411 may be one of an adaptive symbol-run variable length coding technique or an adaptive proxy variable length coding technique, as described above, or a variable length coding table or tables compression technique. The determined entropy encoding technique may be applied to video data 411 to generate compressed video data 421. A variable length coding table or tables compression technique may include a content adaptive variable length coding technique with one or more tables available for coding based on video data 411, for example. In some examples, encoder module 404 may determine which technique provides the greatest compression efficiency (e.g., the fewest bits for compressed video data 421) such that the parameter(s) associated with video data 411 may be the number of bits needed for each coding technique or the like. In some examples, the parameter associated with video data 411 may be based on a characteristic of the video data such that the determined encoding technique may be adaptive to the received video data.

As shown in FIG. 6, encoder module 402 may include adaptive codebook VLC encoder for picture partitions module 621, symbol-run VLC and/or proxy VLC encoder for intra-prediction partitions module 622, and/or symbol-run VLC and/or proxy VLC encoder for inter-prediction partitions and coding partitions module 623. Also as shown, encoder module 402 may receive video data 412. In some examples, video data 412 may include picture slices or regions data 624, intra-prediction partition data 625, and/or inter-prediction and coding partition data 626.

As shown, picture slices or regions data 624 may be received via adaptive codebook VLC encoder for picture partitions module 621, which may apply adaptive codebook variable length coding to picture slices or regions data 624 to generate compressed picture slices or regions data 627. In some examples, picture slices or regions data 624 may include region boundaries for pictures, slices, regions, or the like. In some examples, adaptive codebook variable length coding may include content adaptive variable length coding using an codebook adaptive to the content of picture slices or regions data 624 or other system parameters or the like.

As shown, intra-prediction partition data 625 may be received via symbol-run VLC and/or proxy VLC encoder for intra-prediction partitions module 622. In some examples, an entropy encoding technique may be determined for intra-prediction partition data 625 based on a parameter, parameters or characteristics of intra-prediction partition data 625 or other system parameters (e.g., compression efficiency, a characteristic of the data, and so on), as discussed herein. The determined entropy encoding technique may be applied to intra-prediction partition data 625 to generate compressed intra-prediction partition data 628. As shown, in some examples, the entropy encoding technique for intra-prediction partition data 625 may be one of an adaptive symbol-run variable length coding technique or an adaptive proxy variable length coding technique, as described above. In some examples, intra-prediction partition data 625 may include partitions based on bi-tree partitioning or k-d tree partitioning, or the like.

As shown, inter-prediction and coding partition data 626 may be received via symbol-run VLC and/or proxy VLC encoder for inter-prediction partitions and coding partitions module 623. In some examples, an entropy encoding technique may be determined for or inter-prediction and coding partition data 626 based on a parameter, parameters or characteristics of or inter-prediction and coding partition data 626 or other system parameters (e.g., compression efficiency, a characteristic of the data, and so on), as discussed herein. The determined entropy encoding technique may be applied to or inter-prediction and coding partition data 626 to generate compressed or inter-prediction and coding partition data 629. As shown, in some examples, the entropy encoding technique for or inter-prediction and coding partition data 626 may be one of an adaptive symbol-run variable length coding technique or an adaptive proxy variable length coding technique, as described above. In some examples, or inter-prediction and coding partition data 426 may include inter-partitions and coding tree partitions, or the like.

As shown in FIG. 6, encoder module 403 may include adaptive VLC encoder for joint modes and splits module 631, symbol-run VLC and/or proxy VLC encoder for modes module 632, symbol-run VLC and/or proxy VLC encoder for splits module 633, and/or symbol-run VLC and/or proxy VLC encoder for reference types module 634. Also as shown, encoder module 403 may receive video data 412. In some examples, video data 412 may joint coding of modes and splits data 635, modes information data 636, split/not-split information data 637, and/or prediction reference information data 638.

As shown, joint coding of modes and splits data 635 may be received via adaptive VLC encoder for joint modes and splits module 631, which may apply adaptive variable length coding to joint coding of modes and splits data 635 to generate compressed joint coding of modes and splits data 639. In some examples, adaptive variable length coding may include content adaptive variable length coding adaptive to the content of joint coding of modes and splits data 635 or other system parameters or the like.

As discussed, in some examples, modes and splits data may be coded jointly via adaptive VLC encoder for joint modes and splits module 631. In some examples, modes and splits data may be coded separately via symbol-run VLC and/or proxy VLC encoder for modes module 632 and symbol-run VLC and/or proxy VLC encoder for splits module 633, as is discussed below. In some examples, encoder 100 (via, e.g., adaptive entropy encoder 110 and/or encode controller 103) to code jointly or separately based on results of a comparison of the coding techniques to determine which technique compresses the data most efficiently.

As shown, modes information data 636 may be received via symbol-run VLC and/or proxy VLC encoder for modes module 632. In some examples, an entropy encoding technique may be determined for modes information data 636 based on a parameter, parameters or characteristics of modes information data 636 or other system parameters (e.g., compression efficiency, a characteristic of the data, and so on), as discussed herein. The determined entropy encoding technique may be applied to modes information data 636 to generate compressed modes information data 642. As shown, in some examples, the entropy encoding technique for modes information data 636 may be one of an adaptive symbol-run variable length coding technique or an adaptive proxy variable length coding technique, as described above.

As shown, split/not-split information data 637 may be received via symbol-run VLC and/or proxy VLC encoder for splits module 633. In some examples, an entropy encoding technique may be determined for split/not-split information data 637 based on a parameter, parameters or characteristics of split/not-split information data 637 or other system parameters (e.g., compression efficiency, a characteristic of the data, and so on), as discussed herein. The determined entropy encoding technique may be applied to split/not-split information data 637 to generate compressed split/not-split information data 643. As shown, in some examples, the entropy encoding technique for split/not-split information data 637 may be one of an adaptive symbol-run variable length coding technique or an adaptive proxy variable length coding technique, as described above.

As shown, prediction reference information data 638 may be received via symbol-run VLC and/or proxy VLC encoder for reference types module 634. In some examples, an entropy encoding technique may be determined for prediction reference information data 638 based on a parameter, parameters or characteristics of prediction reference information data 638 or other system parameters (e.g., compression efficiency, a characteristic of the data, and so on), as discussed herein. The determined entropy encoding technique may be applied to prediction reference information data 638 to generate compressed prediction reference information data 644. As shown, in some examples, the entropy encoding technique for prediction reference information data 638 may be one of an adaptive symbol-run variable length coding technique or an adaptive proxy variable length coding technique, as described above.

As shown, encoder module 404 may include symbol-run VLC and/or proxy VLC encoder for coded/not-coded data 641 and may receive video data 414. Video data 414 may have a data type such that video data 411 may coded/not-coded data. For example, a partition (or sub-partition) may be coded if it has any nonzero transform coefficients and a partition (or sub-partition) may be not-coded if it has all zero transform coefficients. In some examples, coded/not-coded data may not be needed for partitions having an intra or skip mode. In some examples, coded/not-coded data may be needed for partitions having an auto, inter, or multi mode. In some examples, an entropy encoding technique may be determined for video data 414 based on a parameter, parameters or characteristics of video data 414 or other system parameters. In some examples, the entropy encoding technique for video data 414 may be one of an adaptive symbol-run variable length coding technique or an adaptive proxy variable length coding technique, as described above. The determined entropy encoding technique may be applied to video data 414 to generate compressed video data 424. In some examples, encoder module 404 may determine which technique provides the greatest compression efficiency as discussed such that the parameter(s) associated with video data 411 may be the number of bits needed for each coding technique or the like. In some examples, the parameter associated with video data 411 may be based on a characteristic of the video data such that the determined encoding technique may be adaptive to the received video data.

As shown, in some examples, encoder module 405 may include an adaptive vector VLC encoder for transform coefficients module 651 and/or an adaptive 1D and 2D VLC encoder for transform coefficients module 652.

As shown, adaptive vector VLC encoder for transform coefficients module 651 may receive transform coefficients data 653, which may include transform coefficient data for blocks or partitions or sub-partitions having a block or partition or sub-partition size of 2 in one dimension (e.g., 2×K partitions or K×2 sized partitions). An adaptive vector variable length coding technique may be applied to transform coefficients data 653 to generate compressed transform coefficients data 655. In some examples, the adaptive vector variable length coding technique may include a quad-tree division of the block or partition or the, representing each quadrant generated via the quad-tree division with a single vector codeword that represents all coefficients with a single index value, and entropy coding the codeword using a variable length coding technique or the like.

Also as shown, adaptive 1D and 2D VLC encoder for transform coefficients module 652 may receive transform coefficient data 654 and may implement an adaptive 1-dimensional variable length coding for blocks or partitions or sub-partitions of size 4×4 and an adaptive 2-dimensional variable length coding for all other block or partition or sub-partition sizes (e.g., 4×8, 8×4, 8×8, 16×16, 32×32, 64×64, and so on) to generate compressed transform coefficient data 656. As discussed, transform coefficient data 653, 654 may result from a forward transform of rectangular (or square or the like) partitions of pixel data or rectangular (or square or the like) of pixel difference values implemented via adaptive transform module 108 followed by a quantization of the resulting coefficients via adaptive quantize module 109. In some examples, the transform coefficient data may be scanned to convert it to a 1-dimensional frequency ordered partition via encoder module 405. Such conversion may be highly adaptive any partition size (e.g., 24 or more or 32 or more partition sizes), different data types (e.g., discrete cosine transform coefficients or hybrid parametric Haar transform coefficients or the like of either intra or inter partitions), and/or different quantizer set characteristics (e.g., various combinations of quantizer parameters and/or matrices). Further, a block or partition or sub-partition may belong to different picture types: I-picture (e.g., intra compensation only), P-picture (e.g., predictive) or F-picture (e.g., functional) and/or may represent different types of signal or data (e.g., luma or chroma or the like), which may be quantized with different quantizer setting.

As shown, encoder module 406 may include a motion vector predictor module 661, an adaptive VLC encoder for motion vector differences module 662, and/or a differencer 663. As shown, encoder module 406 may receive video data 416, which may include motion vector data, via motion vector predictor module 661. Motion vector predictor module 661 may perform motion vector prediction based on video data 416 (e.g., the motion vector data of video data 516) using original motion vector(s) to generate associated predicted motion vector(s). In some examples, the motion vector prediction may be based on immediate neighbors to left, right, above, or below the motion vector being predicted. In some examples, other spatial neighbors that may share the same or similar characteristics may be used. For example, a number of different types of prediction may be adaptively selected and the selection information may provided to decoder 200 via bitstream 111. Differencer 663 may difference the predicted motion vector(s) and the original motion vector(s) to generate difference motion vector(s) for entropy coding. As shown adaptive VLC encoder for motion vector differences module 662 may apply an adaptive variable length coding technique to the difference motion vector (s) to generate compressed video data 526. In some examples, differential (e.g., difference) motion vectors may have twice the range of original motion vectors. Further $\frac{1}{8}^{th}$ pel precision motion compensation may expand the range of the difference motion vector by a factor of 8. In some examples, to address such expansion, classification of large space(s) into smaller subintervals and indexing of vectors inside the subinterval may be used.

As shown, encoder module 407 may include adaptive VLC and/or arithmetic encoder for intra-prediction and directions data module 671 and may receive video data 417. Video data 517 may have a data type such that video data 417 may include intra-prediction type or intra-prediction direction data. In some examples, an entropy encoding technique may be determined for video data 417 based on a parameter, parameters or characteristics of video data 417 or other system parameters (e.g., compression efficiency or the like) as discussed herein. In some examples, the entropy encoding technique for video data 417 may be one of an adaptive variable length coding technique or an arithmetic coding technique, as described above. The determined entropy encoding technique may be applied to video data 417 to generate compressed video data 427. In some examples, the adaptive variable length coding technique may include a content adaptive variable length coding based on the content of video data 417. In some examples, the arithmetic coding technique may include a content adaptive binary arithmetic coding based on the content of video data 417. In some examples, video data 417 may support 9 or more prediction directions and a variety of prediction types including planar, Binary Tree Predictive Coding (BTPC), or the like.

As shown in FIG. 6 and discussed above with respect to FIG. 4, the output encoder modules 401-407 (via the associated sub-modules) may be input to bitstream assembler 408, which may output a multiplexed bitstream formatted per the bitstream syntax, as discussed above.

Figure 7:
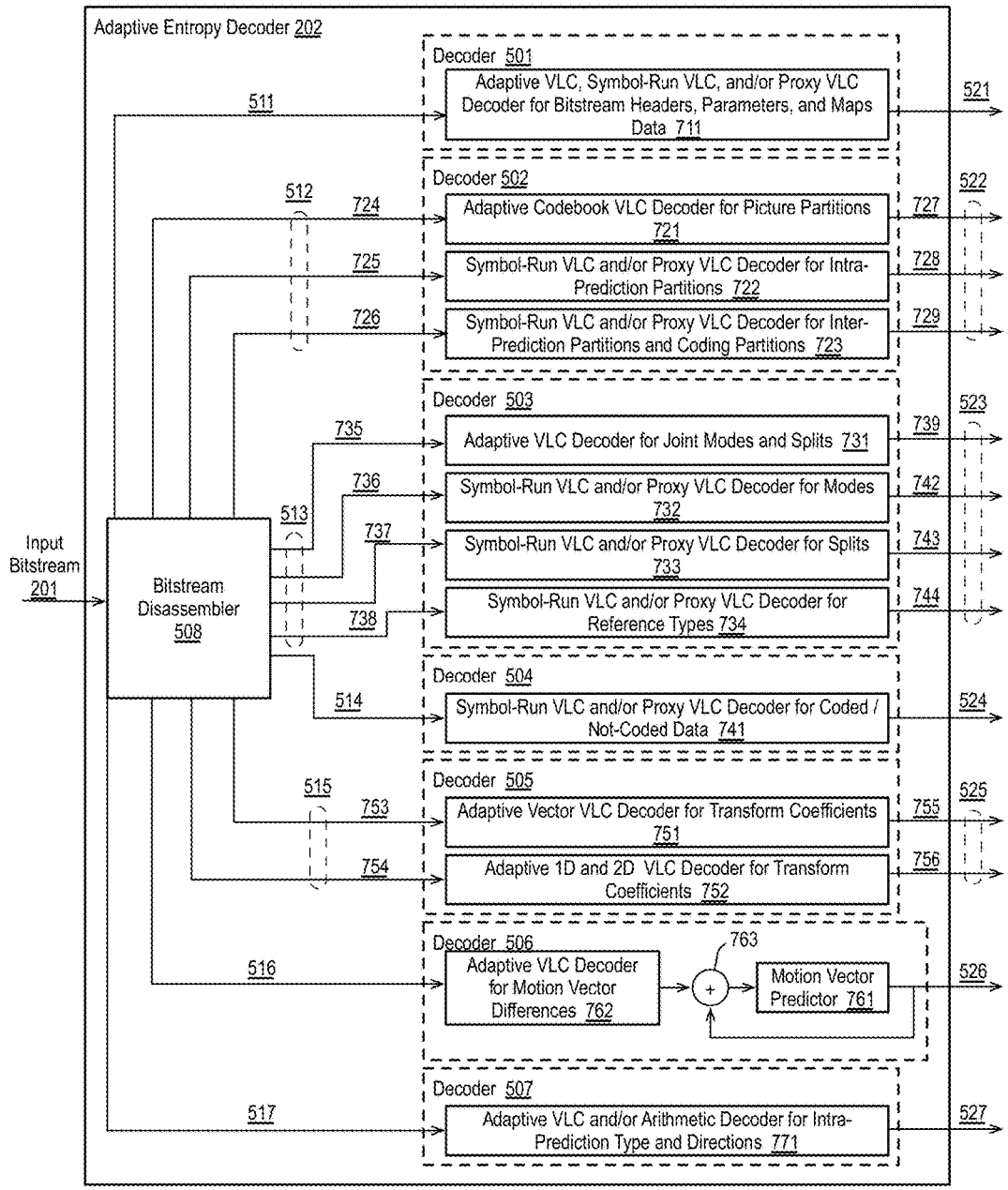
FIG. 7 is an illustrative diagram of an example entropy decoder module.

FIG. 7 is an illustrative diagram of an example entropy decoder module 202, arranged in accordance with at least some implementations of the present disclosure. As shown and as discussed above with respect to FIG. 5, entropy decoder module 202 may include headers, parameters and maps data decoder module 501, picture partitions, prediction partitions, and coding partitions decoder module 502, coding modes and reference types decoder module 503, coded/not-coded data decoder module 504, transform coefficients decoder module 505, motion vector and differential motion vector decoder module 506, intra-prediction and direction data decoder module 507, and/or bitstream disassembler module 508. In some examples, entropy decoder module 202 (and the pertinent sub-modules) may perform an inverse technique with respect to entropy encoder module 110 (and the pertinent sub-modules) such that there may be a one-to-one correspondence between encoder modules (and sub-modules) and decoder modules (and sub-modules)

As shown, bitstream disassembler module 508 may receive input bitstream 201. In some examples, input bitstream 201 may be a valid bitstream such as, for example, a valid next generation video (NGV) coded bitstream, which may follow a NGV bitstream syntax specification or any valid bitstream as discussed herein. As discussed with respect to FIG. 5, bitstream disassembler module 508 may disassemble input bitstream 201 to determine compressed video data 511-517, which may each have one or more component parts as discussed further below. For example, bitstream disassembler module 508 may use a predefined syntax or specification to divide input bitstream 201 into component compressed video data 511-517 by data type for decompression via decoder modules 501-507. In some examples, bitstream disassembler module 508 may perform an inverse operation with respect to bitstream assembler module 308. In some examples, the disassembling of input bitstream 201 may be characterized as a de-multiplexing.

As shown, decoder module 501 may include adaptive VLC, symbol-run VLC, and/or proxy VLC decoder for headers, parameters, and maps data module 711 and may receive compressed video data 511. In some examples, compressed video data 511 may include header data (e.g., sequence and/or picture level bitstream headers), morphing parameters, synthesizing parameters, and/or global maps data entropy encoded using one of an adaptive symbol-run variable length coding technique, an adaptive proxy variable length coding technique, or a variable length coding table or tables compression technique. In some examples, adaptive VLC, symbol-run VLC, and/or proxy VLC decoder for headers, parameters, and maps data module 711 may determine an entropy decoding technique applicable to compressed video data 511 and decode compressed video data 511 using the applicable technique to generate video data 521. In some examples, the applicable technique may be determined based on an indicator, parameter, header data, or the like conveyed via input bitstream 201.

As shown, decoder module 502 may include adaptive codebook VLC decoder for picture partitions module 721, symbol-run VLC and/or proxy VLC decoder for intra-prediction partitions data module 722, and/or symbol-run VLC and/or proxy VLC decoder for inter-prediction partitions and coding partitions data module 723 and may receive compressed video data 512.

As shown, compressed picture slices or regions data 724 may be received via adaptive codebook VLC decoder for picture partitions module 721. In some examples, adaptive codebook VLC decoder for picture partitions module 721 may apply adaptive codebook variable length coding to compressed picture slices or regions data 724 to generate picture slices or regions data 727. As discussed, adaptive codebook variable length coding may include content adaptive variable length coding using an codebook adaptive to the content of compressed picture slices or regions data 724 or other system parameters or the like. In some examples, the codebook may be implemented via adaptive codebook VLC decoder for picture partitions module 721.

As shown, symbol-run VLC and/or proxy VLC decoder for intra-prediction partitions data 722 may receive compressed intra-prediction partition data 725. In some examples, compressed intra-prediction partition data 725 may include compressed intra-prediction partition data entropy encoded using one of an adaptive symbol-run variable length coding technique or an adaptive proxy variable length coding technique, as described herein. In some examples, symbol-run VLC and/or proxy VLC decoder for intra-prediction partitions data 722 may determine an entropy decoding technique applicable to compressed intra-prediction partition data 725 and entropy decode compressed intra-prediction partition data 725 using the applicable technique to generate intra-prediction partition data 728. In some examples, the applicable coding technique may be determined based on an indicator, parameter, header data, or the like conveyed via input bitstream 201.

As shown, symbol-run VLC and/or proxy VLC decoder for inter-prediction partitions and coding partitions data 723 may receive compressed inter-prediction and coding partition data 726. In some examples, compressed inter-prediction and coding partition data 726 may include compressed inter-prediction and coding partition data entropy encoded using one of an adaptive symbol-run variable length coding technique or an adaptive proxy variable length coding technique, as described herein. In some examples, symbol-run VLC and/or proxy VLC decoder for inter-prediction partitions and coding partitions data 723 may determine an entropy decoding technique applicable to compressed inter-prediction and coding partition data 726 and entropy decode compressed inter-prediction and coding partition data 726 using the applicable technique to generate inter-prediction and coding partition data 729. In some examples, the applicable coding technique may be determined based on an indicator, parameter, header data, or the like conveyed via input bitstream 201.

As shown, decoder module 503 may include adaptive VLC decoder for joint modes and splits module 731, symbol-run VLC and/or proxy VLC decoder for modes module 732, symbol-run VLC and/or proxy VLC decoder for splits module 733, and/or symbol-run VLC and/or proxy VLC decoder for reference types module 734 and may receive compressed video data 513.

As discussed above with respect to encoder module 403, in some examples, modes and splits data may be coded jointly and, in some examples, modes and splits data may be coded separately. In some examples, adaptive VLC decoder for joint modes and splits module 731 may decode jointly coded data, and symbol-run VLC and/or proxy VLC decoder for modes module 732 and symbol-run VLC and/or proxy VLC decoder for splits module 733 may decode separately coded data. In some examples, whether data is jointly or separately coded may be indicated via input bitstream 201.

As shown, compressed joint coding of modes and splits data 735 may be received via adaptive VLC decoder for joint modes and splits module 731. In some examples, adaptive VLC decoder for joint modes and splits module 731 may apply adaptive variable length coding to compressed joint coding of modes and splits data 735 to generate joint coding of modes and splits data 739. As discussed, adaptive variable length coding may be content adaptive variable length coding adaptive to the content of compressed joint coding of modes and splits data 735 or other system parameters or the like.

As shown, symbol-run VLC and/or proxy VLC decoder for modes module 732 may receive compressed modes information data 736. In some examples, compressed modes information data 736 may include compressed modes information data entropy encoded using one of an adaptive symbol-run variable length coding technique or an adaptive proxy variable length coding technique, as described herein. In some examples, symbol-run VLC and/or proxy VLC decoder for modes module 732 may determine an entropy decoding technique applicable to compressed modes information data 736 and entropy decode compressed modes information data 736 using the applicable technique to generate modes information data 742. In some examples, the applicable coding technique may be determined based on an indicator, parameter, header data, or the like conveyed via input bitstream 201.

As shown, symbol-run VLC and/or proxy VLC decoder for splits module 733 may receive compressed splits information data 737. In some examples, compressed splits information data 737 may include compressed splits information data entropy encoded using one of an adaptive symbol-run variable length coding technique or an adaptive proxy variable length coding technique, as described herein. In some examples, symbol-run VLC and/or proxy VLC decoder for splits module 733 may determine an entropy decoding technique applicable to compressed splits information data 737 and entropy decode compressed splits information data 737 using the applicable technique to generate splits information data 743. In some examples, the applicable coding technique may be determined based on an indicator, parameter, header data, or the like conveyed via input bitstream 201.

As shown, symbol-run VLC and/or proxy VLC decoder for reference types module 734 may receive compressed reference types information data 738. In some examples, compressed reference types information data 738 may include compressed reference types information data entropy encoded using one of an adaptive symbol-run variable length coding technique or an adaptive proxy variable length coding technique, as described herein. In some examples, symbol-run VLC and/or proxy VLC decoder for reference types module 734 may determine an entropy decoding technique applicable to compressed reference types information data 738 and entropy decode compressed reference types information data 738 using the applicable technique to generate reference types information data 744. In some examples, the applicable coding technique may be determined based on an indicator, parameter, header data, or the like conveyed via input bitstream 201.

As shown, decoder module 504 may include symbol-run VLC and/or proxy VLC decoder for coded/not-coded data module 741 and may receive compressed video data 514. In some examples, compressed video data 514 may include coded/not-coded, as discussed herein, entropy encoded using one of an adaptive symbol-run variable length coding technique or an adaptive proxy variable length coding technique. In some examples, symbol-run VLC and/or proxy VLC decoder for coded/not-coded data module 741 may determine an entropy decoding technique applicable to compressed video data 514 and decode compressed video data 514 using the applicable technique to generate video data 524. In some examples, the applicable technique may be determined based on an indicator, parameter, header data, or the like conveyed via input bitstream 201. In some examples, the applicable technique may be one of an adaptive symbol-run variable length coding technique or an adaptive proxy variable length coding technique.

As shown, decoder module 505 may include adaptive vector VLC decoder for transform coefficients module 751 and/or adaptive 1D and 2D VLC decoder for transform coefficients module 752 and may receive compressed video data 515.

As shown, adaptive vector VLC decoder for transform coefficients module 751 may receive compressed transform coefficients data 753, which may include compressed transform coefficients data for blocks or partitions or sub-partitions having a size of 2 in one dimension (e.g., 2×K partitions or K×2 sized partitions), as discussed herein. In some examples, adaptive vector VLC decoder for transform coefficients module 751 may apply an adaptive vector variable length coding technique to entropy decode compressed transform coefficients data 753 to generate transform coefficients data 755. As discussed, In some examples, the adaptive vector variable length coding technique may include using a variable length codeword to generate all coefficients of a quad-tree division of the block, which may be generated via merging the quad-tree division.

As shown, adaptive 1D and 2D VLC decoder for transform coefficients module 752 may receive compressed transform coefficients data 754, which may include compressed transform coefficients data for blocks or partitions or sub-partitions of size 4×4 and all other block or partition or sub-partition sizes (e.g., 4×8, 8×4, 8×8, 16×16, 32×32, 64×64, and so on). In some examples, adaptive 1D and 2D VLC decoder for transform coefficients module 752 may apply an adaptive 1-dimensional variable length coding for blocks or partitions or sub-partitions of size 4×4 and an adaptive 2-dimensional variable length coding for all other block or partition or sub-partition sizes (e.g., 4×8, 8×4, 8×8, 16×16, 32×32, 64×64, and so on) to entropy decode compressed transform coefficients data 754 to generate transform coefficients data 756.

As shown, decoder module 506 may include an adaptive VLC decoder for motion vector differences module 762, a motion vector predictor 761 and an adder 763, and may receive compressed video data 516. In some examples, adaptive VLC decoder for motion vector differences module 762 may decode compressed video data 516 to generate motion vector differences. Furthermore, motion vector predictor 761 may generate prediction motion vectors using previously decoded neighboring motion vectors in analogy to the techniques discussed with respect to motion vector predictor module 661. As shown, decoded difference motion vector(s) may be added via adder 763 to prediction motion vector(s) to generate reconstructed motion vector(s), which may be output as a part of video data 526 and further used to perform motion vector prediction for other motion vectors via motion vector predictor module 761.

As shown, decoder module 507 may include adaptive VLC and/or arithmetic decoder for intra-prediction type and direction module 771 and may receive compressed video data 517. In some examples, compressed video data 517 may include intra-prediction type and direction data entropy encoded using one of an adaptive VLC technique or an arithmetic coding technique. In some examples, adaptive VLC and/or arithmetic decoder for intra-prediction type and direction module 771 may determine an entropy decoding technique applicable to compressed video data 517 and decode compressed video data 517 using the applicable technique to generate video data 527. In some examples, the applicable technique may be determined based on an indicator, parameter, header data, or the like conveyed via input bitstream 201.

As discussed, video data 521-527 (including various sub-components as discussed) may be transmitted to various components of decoder 200. Further, as discussed, decoder 200 may use entropy decoded video data 521-527 to generate video frames, which may be output, via display video 219, for presentment or display via a display device for a user.

FIG. 8 is a flow diagram illustrating an example process 800, arranged in accordance with at least some implementations of the present disclosure. Process 800 may include one or more operations, functions or actions as illustrated by one or more of operations 802, 804, 806, and/or 808. Process 800 may form at least part of a next generation video coding process. By way of non-limiting example, process 800 may form at least part of a next generation video encoding process as undertaken by encoder system 100 of FIG. 1 and/or entropy encoder module 110 of FIG. 5 or 7.

Process 800 may begin at operation 802, "Obtain First and Second Video Data of Different Types for Entropy Encoding", where first and second (or additional) video data of different types may be obtained or received for entropy coding. For example, two or more of video data 411-417 (and/or any sub-components of video data 511-517) may be received. In some examples, video data 411-417 may be received via adaptive entropy encoder 110. As discussed, the first and second (or additional) video data may be of different types such as any of the types or sub-component types as discussed with respect to video data 411-417 or elsewhere herein.

Process 800 may continue at operation 804, "Determine an Entropy Encoding Technique for the First Video Data", where a first entropy encoding technique may be determined for the first video data. As discussed, in some examples, one or more of encoder modules 401-407 may determine a coding technique for video data 411-417 from various coding technique options. For example, encoder module 401 may determine a coding technique for video data 411 from one of an adaptive symbol-run variable length coding technique, an adaptive proxy variable length coding technique, or a variable length coding table or tables compression technique. Further, encoder module 402 may determine a coding technique for intra-prediction partition data 625 of video data 402 from one of an adaptive symbol-run variable length coding technique and an adaptive proxy variable length coding technique, and so on. A wide range of examples have been provided herein with respect to FIGS. 4 and 6 and will not be repeated here for the sake of brevity. As discussed, in some examples, two ore more types of video data may be received. In some examples, an entropy encoding technique may be determined for two, three, or more types of video data as described herein.

As discussed, an entropy encoding technique may be determined for video data. In some examples, a selected coding table associated with the first encoding technique may be determined from two or more available tables. For example, the table selection may be made based on a bit count comparison, a coding efficiency, or the like between the available tables. For example, any of the described entropy encoding techniques discussed herein may have multiple available tables. In some examples, a table indicator may be generated and provided in bitstream 900 indicating the selected table for the video data. For example, bitstream 900 may include indicators indicating the selected encoding technique and the selected coding table. Further an indicator or indicators associated with the length of the video data may be included into bitstream 900. For example, the length or number of tuples in the video data (e.g. the length of the string of video) may be provided and any remainder portion (e.g., if the length is not evenly divided into tuples) may be coded using a bit map technique and provided into the output bitstream.

Process 800 may continue at operation 806, "Entropy Encode the First Video Data using the First Entropy Encoding Technique and Entropy Encode the Second Video Data to Generate First and Second Compressed Video Data", where the first video data may be entropy encoded using the first entropy encoding technique to generate first compressed video data and the second video data may be compressed using a second entropy encoding technique to generate first and second compressed video data.

Process 800 may continue at operation 808, "Assemble the First and Second Compressed Video Data to Generate an Output Bitstream", where the first compressed video data and the second compressed video data may be assembled to generate an output bitstream. For example, bitstream assembler 508 may assemble or multiplex the first compressed video data and the second compressed video data to generate output bitstream 111 as discussed herein.

As discussed, in some examples, output bitstream 111 may be multiplexed with an audio stream (coded or uncoded) to generate a multiplexed audio-visual stream. Further, as discussed, in some examples, one or more of the video data may be preprocessed or otherwise manipulated prior to entropy coding. For example, for motion vector data, motion vector prediction may be performed to generate predicted motion vector(s), the predicted motion vector(s) may be differenced with the original motion vector(s) to generate difference motion vector(s), and the difference motion vector(s) may be entropy coded as discussed herein. Further, in some examples, each of the seven encoder modules 401-407 may be implemented simultaneously to operate on seven types of video data 411-417. Process 800 may be implemented via adaptive entropy encoder module 110 as discussed herein. Further, process 800 may be repeated either in serial or in parallel on any number of instantiations of video data.

As discussed, video data of different types may be entropy coded using a variety of determined (or predetermined) adaptive entropy coding techniques to generate compressed video data. The compressed video data may be assembled to generate an output bitstream.

Figure 9:
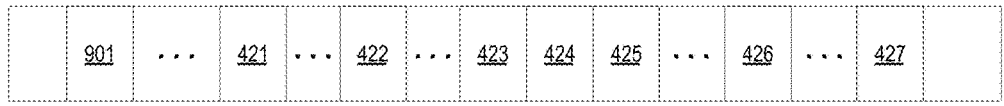
FIG. 9 illustrates an example bitstream.

FIG. 9 illustrates an example bitstream 900, arranged in accordance with at least some implementations of the present disclosure. In some examples, bitstream 900 may correspond to output bitstream 111 as shown in FIGS. 1, 3a, 4, and 6 and/or input bitstream 201 as shown in FIGS. 2, 3b, 5, and 7. Although not shown in FIG. 9 for the sake of clarity of presentation, in some examples bitstream 900 may include a header portion and a data portion. In various examples, bitstream 900 may include data, indicators, index values, mode selection data, or the like associated with encoding compressed video as discussed herein. As shown, in some examples, bitstream 900 may include indicator data 901, compressed video data 421, compressed video data 422, compressed video data 423, compressed video data 424, compressed video data 425, compressed video data 426, and/or compressed video data 427. The illustrated data may be in any order in bitstream 900 and may be adjacent or separated by any other of a variety of additional data for coding video. As discussed, bitstream 900 may also include indicators indicating the selected encoding technique and the selected coding table (e.g., in indicator data 901). Further an indicator or indicators associated with the length of the video data may be included into bitstream 900. For example, the length or number of tuples in the video data (e.g. the length of the string of video) may be provided and any remainder portion (e.g., if the length is not evenly divided into tuples) may be coded using a bit map technique and provided into the output bitstream.

In some examples, compressed video data 421-427 may include any compressed video data encoded via any technique as discussed herein. In some examples, indicator data 901 may include header data, mode indicator data, and/or data indicating entropy encoding techniques associated with compressed video data 421-427. For example, indicator data 901 may indicate an entropy coding technique used for compressing video data 421, an entropy coding technique used for compressing portions of video data 422, an entropy coding technique used for compressing portions of video data 423, an entropy coding technique used for compressing video data 424, and/or an entropy coding technique used for compressing video data 427, as discussed herein with respect to FIGS. 4 and 6.

As discussed, bitstream 900 may be generated by an encoder such as, for example, encoder 100 and/or received by a decoder 200 for decoding such that video frames may be presented via a display device.

Figure 10:
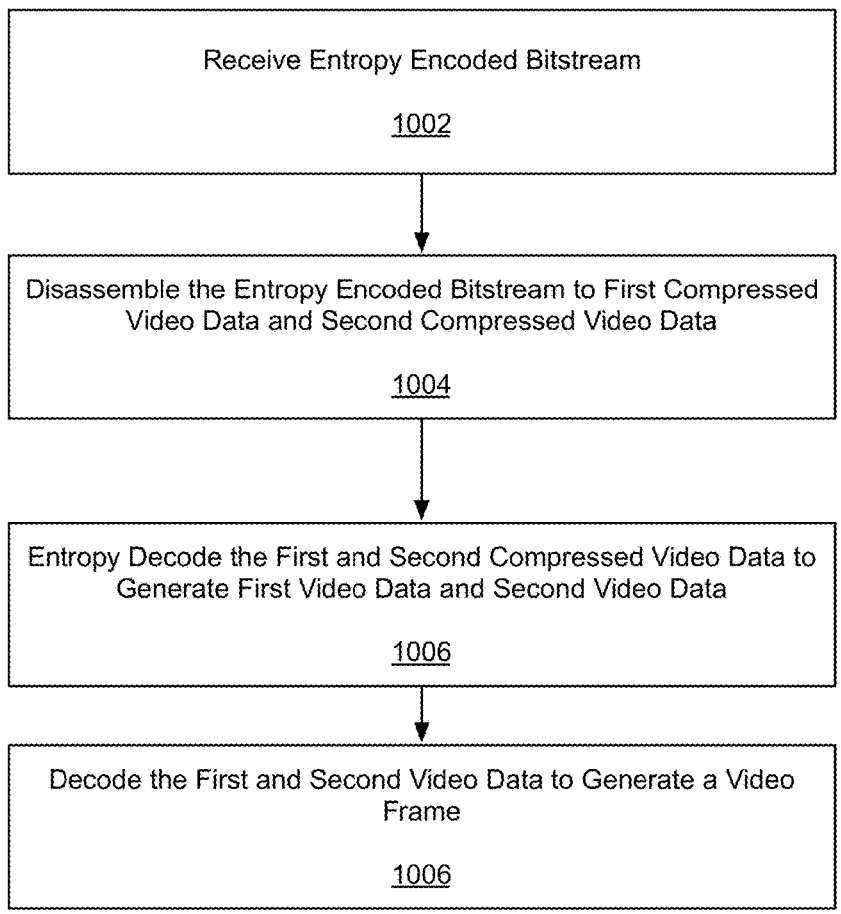
FIG. 10 is a flow diagram illustrating an example process.

FIG. 10 is a flow diagram illustrating an example process 1000, arranged in accordance with at least some implementations of the present disclosure. Process 1000 may include one or more operations, functions or actions as illustrated by one or more of operations 1002, 1004, 1006, and/or 1008. Process 1000 may form at least part of a next generation video coding process. By way of non-limiting example, process 1000 may form at least part of a next generation video decoding process as undertaken by decoder system 200 of FIG. 2.

Process 1000 may begin at operation 1002, "Receive Entropy Encoded Bitstream", where an entropy encoded bitstream may be received. For example, a bitstream encoded as discussed herein may be received at a video decoder. In some examples, bitstream 100 or 900 or the like may be received via decoder 200.

Process 1000 may continue at operation 1004, "Disassemble the Entropy Encoded Bitstream to First Compressed Video Data and Second Compressed Video Data", where the received bitstream may be disassembled to determine different types of compressed video data. For example, bitstream 201 may be disassembled via bitstream disassembler 508 to generate compressed video data 511-517 (and any sub-component video data) as illustrated in FIG. 7. For example, the disassembled compressed video data may include first compressed video and second compressed video data.

Process 1000 may continue at operation 1006, "Entropy Decode the First and Second Compressed Video Data to Generate First Video Data and Second Video Data", where first and second compressed video data may be entropy decoded to generate (decompressed) first and second video data. As discussed, in some examples, one or more of decoder modules 501-507 may determine a coding technique for compressed video data 511-517 from various coding technique options. For example, decoder module 501 may determine a coding technique for compressed video data 511 from one of an adaptive symbol-run variable length coding technique, an adaptive proxy variable length coding technique, or a variable length coding table or tables compression technique based on an indicator or indicators provided via the input bitstream. Further, decoder module 502 may determine a coding technique for compressed intra-prediction partition data 725 of video data 512 from one of an adaptive symbol-run variable length coding technique and an adaptive proxy variable length coding technique, and so on. A wide range of examples have been provided herein with respect to FIGS. 5 and 7 and will not be repeated here for the sake of brevity. As discussed, in some examples, two ore more types of video data may be received. In some examples, an entropy decoding technique may be determined for two, three, or more types of video data as described herein.

Process 1000 may continue at operation 1008, "Decode the First and Second Video Data to Generate a Video Frame", where the first and second video data (and any other entropy decoded video data) may be decoded to generate video frame(s). The video frames may be suitable for presentment to a user via a display device, for example.

As discussed, in some examples, one or more of the entropy decoded video data may be post-processed or otherwise manipulated prior to further decoding. For example, entropy decoded difference motion vector(s) may be added to prediction motion vector(s) to generate reconstructed motion vector(s), which may be output for use in motion vector prediction (e.g., inter-prediction) via decoder 200.

Various components of the systems described herein may be implemented in software, firmware, and/or hardware and/or any combination thereof. For example, various components of encoder 100 or encoder 200 may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

Some additional and/or alternative details related to process 800, 1000 and other processes discussed herein may be illustrated in one or more examples of implementations discussed herein and, in particular, with respect to FIG. 11 below.

Figure 11:
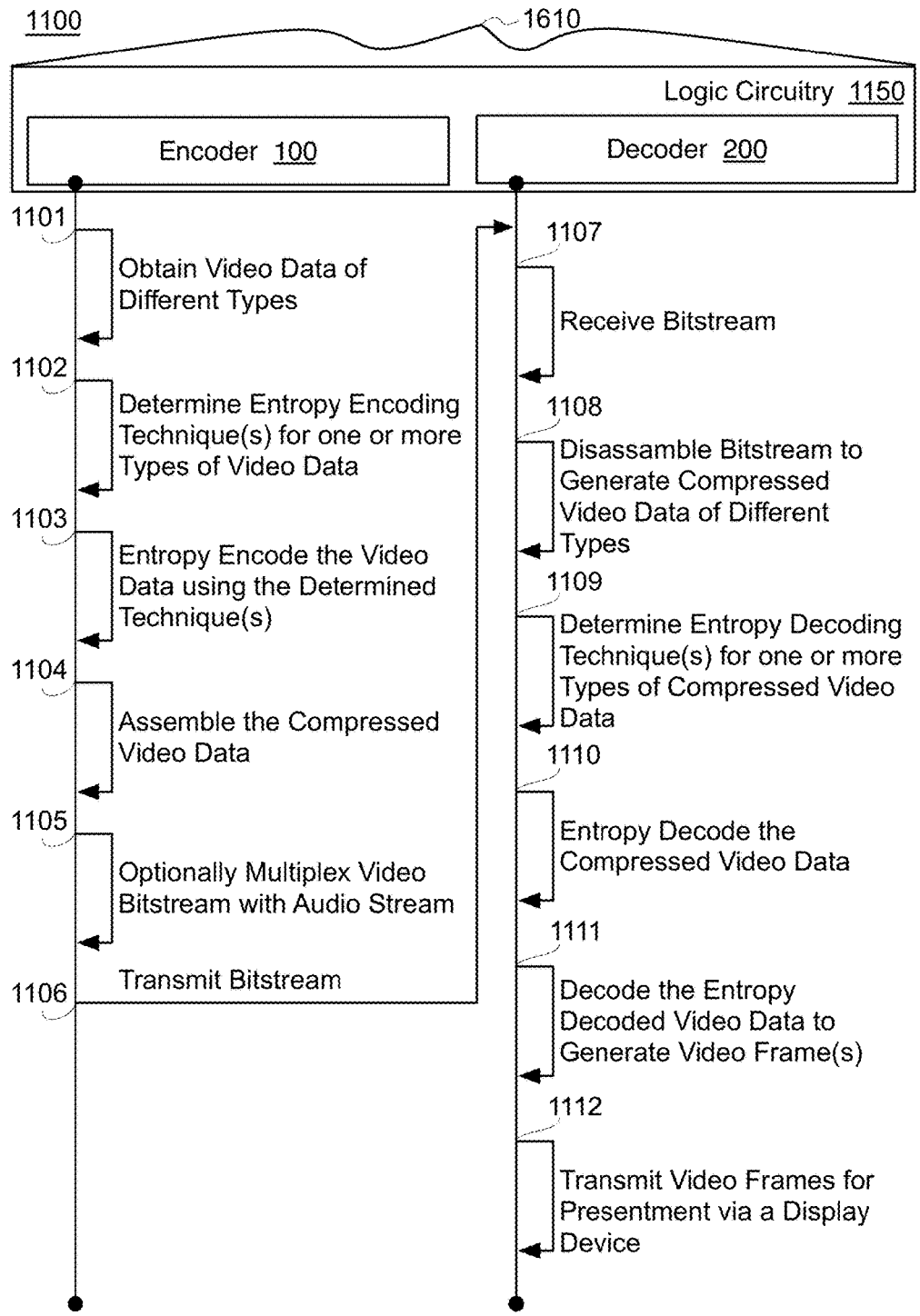
FIG. 11 is an illustrative diagram of an example video coding system and video coding process in operation.

FIG. 11 is an illustrative diagram of an example video coding system 1610 and video coding process 1100 in operation, arranged in accordance with at least some implementations of the present disclosure. In the illustrated implementation, process 1100 may include one or more operations, functions or actions as illustrated by one or more of actions 1100-1112. By way of non-limiting example, process 1100 will be described herein with reference to example video coding system 1610 including encoder 100 of FIG. 1 and decoder 200 of FIG. 2, as is discussed further herein below with respect to FIG. 16.

In various examples, process 1100 may be undertaken by a system including both an encoder and decoder or by separate systems with one system employing an encoder (and optionally a decoder) and another system employing a decoder (and optionally an encoder). It is also noted, as discussed above, that an encoder may include a local decode loop employing a local decoder as a part of the encoder system.

Figure 16:
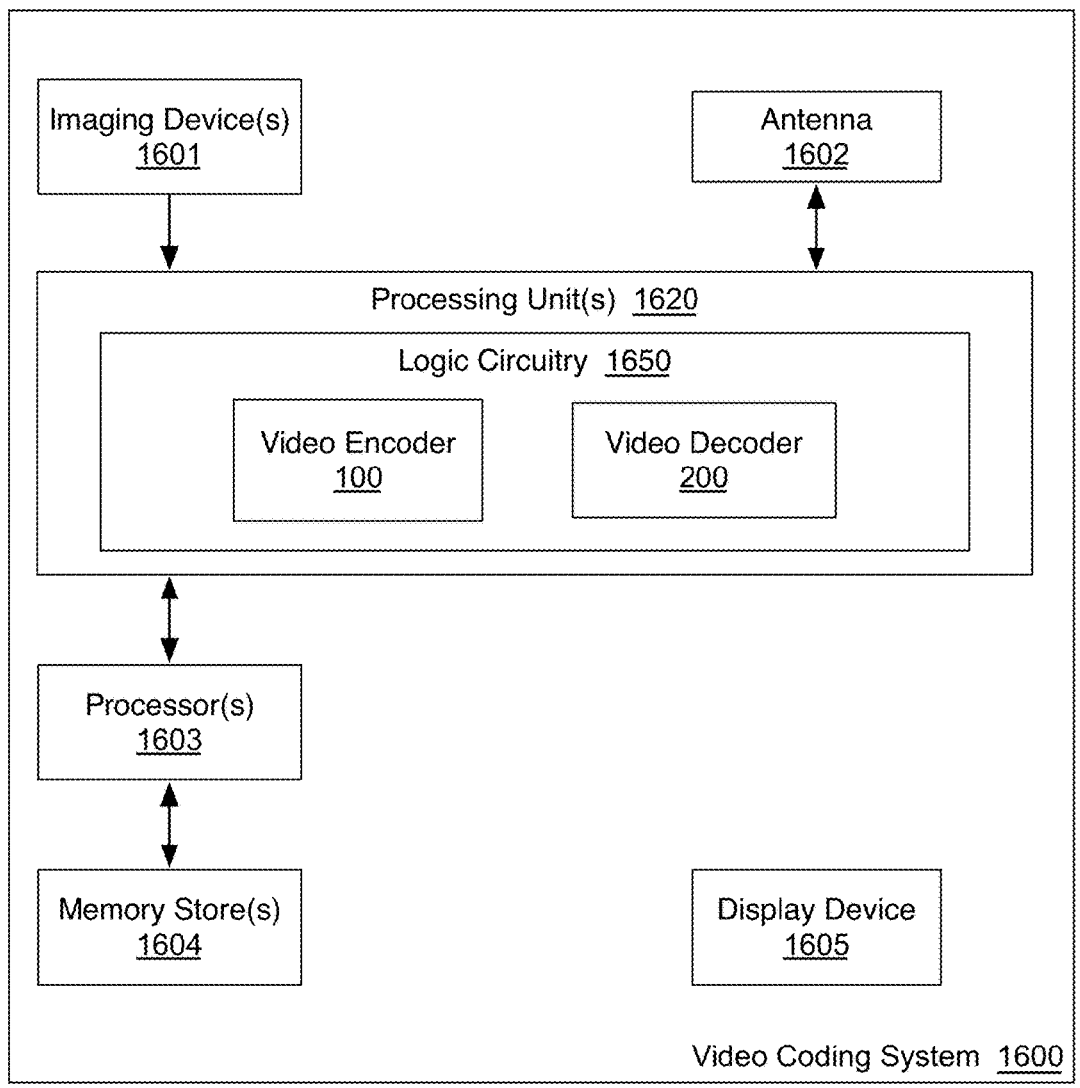
FIG. 16 is an illustrative diagram of an example video coding system.

In the illustrated implementation, video coding system 1610 may include logic circuitry 1150, the like, and/or combinations thereof. For example, logic circuitry 1150, may include encoder 100 and may include any modules as discussed with respect to FIG. 1 and/or FIGS. 3 and 5 and decoder 200 and may include any modules as discussed with respect to FIG. 2 and/or FIGS. 4 and 6. Although video coding system 1610, as shown in FIG. 16, may include one particular set of blocks or actions associated with particular modules, these blocks or actions may be associated with different modules than the particular module illustrated here. Although process 1100, as illustrated, is directed to encoding and decoding, the concepts and/or operations described may be applied to encoding and/or decoding separately, and, more generally, to video coding.

Process 1100 may begin at operation 1101, "Obtain Video Data of Different Types", where video data of different types may be received for entropy encoding. For example two or more types of video data may be received for entropy encoding. For example, two or more of video data 411-417 (and/or any sub-components of video data 411-417) may be received via adaptive entropy encoder 110. As discussed, the first and second (or additional) video data may be of different types such as any of the types or sub-component types as discussed with respect to video data 411-417 or elsewhere herein.

Process 1100 may continue from operation 1101 to operation 1102, "Determine Entropy Encoding Technique(s) for one or more Types of Video Data", where entropy encoding technique(s) may be determined for one or more of the video data types. As discussed, in some examples, one or more of encoder modules 401-407 may determine a coding technique for video data 411-417 from various coding technique options. For example, encoder module 401 may determine a coding technique for video data 411 from one of an adaptive symbol-run variable length coding technique, an adaptive proxy variable length coding technique, or a variable length coding table or tables compression technique. Further, encoder module 402 may determine a coding technique for intra-prediction partition data 625 of video data 402 from one of an adaptive symbol-run variable length coding technique and an adaptive proxy variable length coding technique, and so on as discussed herein.

Process 1100 may continue at operation 1103, "Entropy Encode the Video Data using the Determined Technique(s)", the video data may be entropy encoded using the determined technique(s). For example, first video data may be entropy encoded using a first entropy encoding technique to generate first compressed video data. In some examples, second, third, or more additional video data may be entropy encoded using second, third or more additional entropy encoding techniques as discussed herein to generate first, second, third, and so on respective compressed video data.

Process 1100 may continue from operation 1103 to operation 1104, "Assemble the Compressed Video Data", where the compressed video data of different types may be assembled to generate an output bitstream. For example, bitstream assembler 408 may assemble or multiplex the compressed video data to generate output bitstream 111 as discussed herein.

Process 1100 may continue from operation 1104 to operation 1105, "Optionally Multiplex Video Bitstream with Audio Stream", where the video bitstream may be optionally multiplexed with a coded or uncoded audio stream to generate an audio-visual bitstream.

Process 1100 may continue from operation 1105 or operation 1104 to operation 1106, "Transmit Bitstream", where the bitstream may be transmitted. For example, video coding system 1610 may transmit output bitstream 111 or bitstream 800 or the like via an antenna 1102 (please refer to FIG. 16).

Operations 1101-1106 may provide for video encoding and bitstream transmission techniques, which may be employed by an encoder system as discussed herein. The following operations, operations 1107-1112 may provide for video decoding and video display techniques, which may be employed by a decoder system as discussed herein.

Process 1100 may continue at operation 1107, "Receive Bitstream", where the encoded bitstream may be received. For example, input bitstream 100, 201, or bitstream 800 or the like may be received via decoder 200. In some examples, the bitstream may include different types of entropy encoded data as discussed herein.

Process 1100 may continue from operation 1107 to operation 1108, "Disassamble Bitstream to Generate Compressed Video Data of Different Types", where the received bitstream may be disassembled to determine different types of compressed video data. For example, bitstream 201 may be disassembled via bitstream disassembler 508 to generate compressed video data 511-517 (and any sub-component video data) as illustrated in FIG. 7. For example, the disassembled compressed video data may include first, second, third, or more compressed video data.

Process 1100 may continue from operation 1108 to operation 1109, "Determine Entropy Decoding Technique(s) for one or more Types of Compressed Video Data", entropy decoding technique(s) may be determined for one or more of the compressed video data types. In some examples, the entropy decoding technique(s) may be determined based on a flag or indicator or the like conveyed via the received bitstream. As discussed, in some examples, one or more of decoder modules 501-507 may determine a coding technique for compressed video data 511-517 from various coding technique options. For example, decoder module 401 may determine a coding technique for compressed video data 511 from one of an adaptive symbol-run variable length coding technique, an adaptive proxy variable length coding technique, or a variable length coding table or tables compression technique based on an indicator or indicators provided via the input bitstream. Further, decoder module 502 may determine a coding technique for compressed intra-prediction partition data 725 of video data 512 from one of an adaptive symbol-run variable length coding technique and an adaptive proxy variable length coding technique, and so on. A wide range of examples have been provided herein and will not be repeated here for the sake of brevity. As discussed, in some examples, two ore more types of video data may be received. In some examples, an entropy decoding technique may be determined for two, three, or more types of video data as described herein.

Process 1100 may continue from operation 1109 to operation 1610, "Entropy Decode the Compressed Video Data", where the compressed video data may be entropy decoded based on the determined entropy decoding techniques. For example, compressed video data 511-517 may be entropy decoded via decode modules 501-507.

Process 1100 may continue from operation 1610 to operation 1111, "Decode the Entropy Decoded Video Data to Generate Video Frame(s)", where the first and second video data (and any other entropy decoded video data) may be decoded to generate video frame(s). The video frames may be suitable for presentment to a user via a display device, for example. For example, the video frame may be determined based on the implementation of decode techniques discussed with respect to decoder 200.

Process 1100 may continue from operation 1111 to operation 1112, "Transmit Video Frames for Presentment via a Display Device", where generated video frame(s) may be transmitted for presentment via a display device. For example, the video frame(s) may be transmitted to a display device 1105 (as shown in FIG. 16) for presentment. In some examples, display device 1105 may display the video frames to a user, for example.

While implementation of the example processes herein may include the undertaking of all operations shown in the order illustrated, the present disclosure is not limited in this regard and, in various examples, implementation of the example processes herein may include the undertaking of only a subset of the operations shown and/or in a different order than illustrated.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the video systems as discussed herein.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

Figure 12:
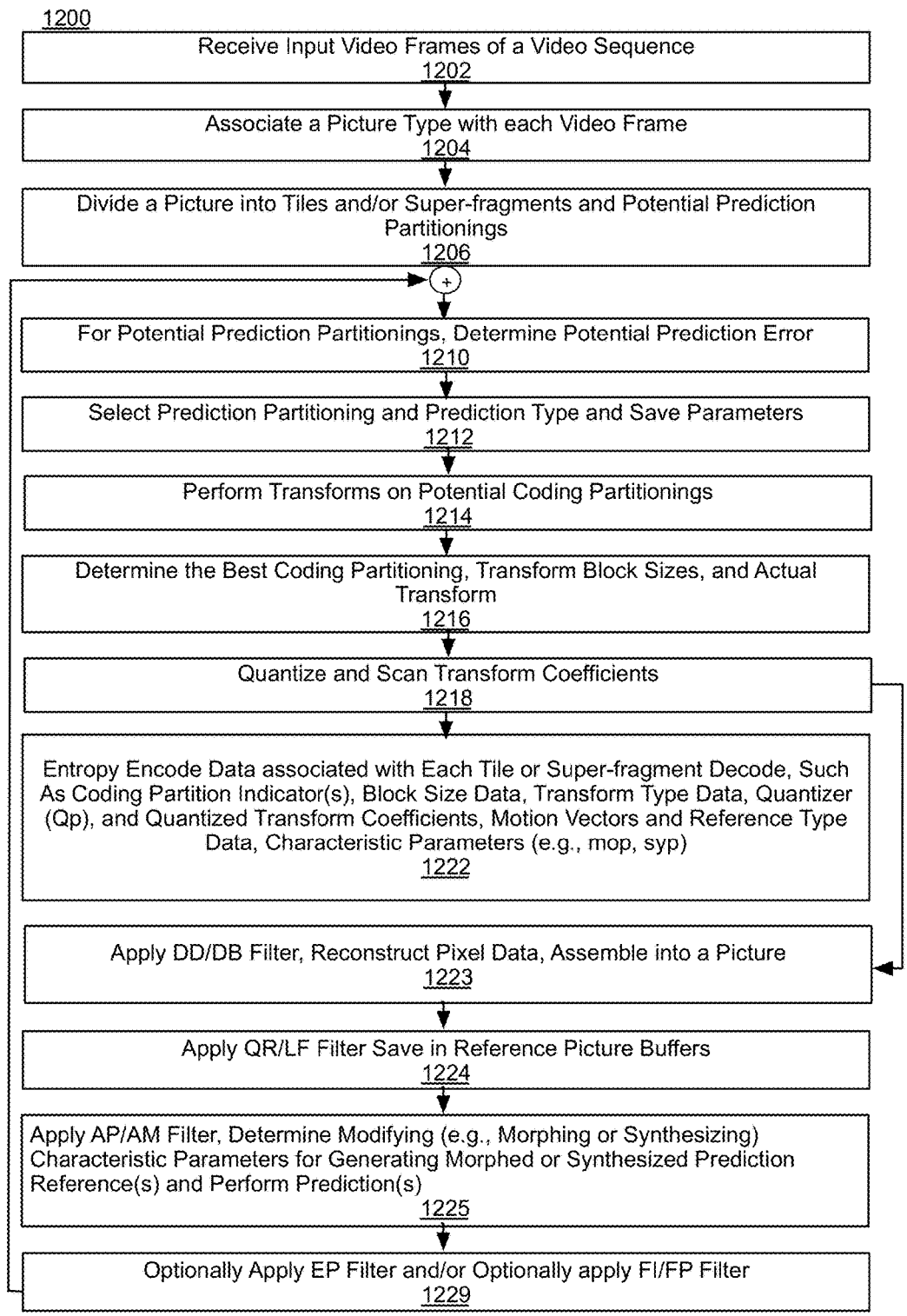
FIG. 12 is a flow diagram illustrating an example encoding process.

FIG. 12 is a flow diagram illustrating an example process 1200, arranged in accordance with at least some implementations of the present disclosure. Process 1200 may include one or more operations, functions or actions as illustrated by one or more operations. Process 1200 may form at least part of a next generation video coding process. By way of non-limiting example, process 1200 may form at least part of a next generation video encoding process as undertaken by encoder system 100 of FIG. 1 and/or any other encoder system or subsystems described herein.

Process 1200 may begin at operation 1202, "Receive Input Video Frames of a Video Sequence", where input video frames of a video sequence may be received via encoder 100 for example.

Process 1200 may continue at operation 1204, "Associate a Picture Type with each Video Frame", where a picture type may be associated with each video frame in a group of pictures via content pre-analyzer module 102 for example. For example, the picture type may be F/B-picture, P-picture, or I-picture, or the like. In some examples, a video sequence may include groups of pictures and the processing described herein (e.g., operations 1203 through 1211) may be performed on a frame or picture of a group of pictures and the processing may be repeated for all frames or pictures of a group and then repeated for all groups of pictures in a video sequence.

Process 1200 may continue at operation 1206, "Divide a Picture into Tiles and/or Super-fragments and Potential Prediction Partitionings", where a picture may be divided into tiles or super-fragments and potential prediction partitions via prediction partitions generator 105 for example.

Process 1200 may continue at operation 1210, "For Potential Prediction Partitioning, Determine Potential Prediction Error", where, for each potential prediction partitioning, a potential prediction error may be determined. For example, for each prediction partitioning (and associated prediction partitions, prediction(s), and prediction parameters), a prediction error may be determined. For example, determining the potential prediction error may include differencing original pixels (e.g., original pixel data of a prediction partition) with prediction pixels. In some examples, the associated prediction parameters may be stored. As discussed, in some examples, the prediction error data partition may include prediction error data generated based at least in part on a previously decoded frame generated using at least one of a morphing technique or a synthesizing technique.

Process 1200 may continue at operation 1212, "Select Prediction Partitioning and Prediction Type and Save Parameters", where a prediction partitioning and prediction type may be selected and the associated parameters may be saved. In some examples, the potential prediction partitioning with a minimum prediction error may be selected. In some examples, the potential prediction partitioning may be selected based on a rate distortion optimization (RDO).

Process 1200 may continue at operation 1214, "Perform Transforms on Potential Coding Partitionings", where fixed or content adaptive transforms with various block sizes may be performed on various potential coding partitionings of partition prediction error data. For example, partition prediction error data may be partitioned to generate a plurality of coding partitions. For example, the partition prediction error data may be partitioned by a bi-tree coding partitioner module or a k-d tree coding partitioner module of coding partitions generator module 107 as discussed herein. In some examples, partition prediction error data associated with an F/B- or P-picture may be partitioned by a bi-tree coding partitioner module. In some examples, video data associated with an I-picture (e.g., tiles or super-fragments in some examples) may be partitioned by a k-d tree coding partitioner module. In some examples, a coding partitioner module may be chosen or selected via a switch or switches. For example, the partitions may be generated by coding partitions generator module 107.

Process 1200 may continue at operation 1216, "Determine the Best Coding Partitioning, Transform Block Sizes, and Actual Transform", where the best coding partitioning, transform block sizes, and actual transforms may be determined. For example, various coding partitionings (e.g., having various coding partitions) may be evaluated based on RDO or another basis to determine a selected coding partitioning (which may also include further division of coding partitions into transform blocks when coding partitions to not match a transform block size as discussed). For example, the actual transform (or selected transform) may include any content adaptive transform or fixed transform performed on coding partition or block sizes as described herein.

Process 1200 may continue at operation 1218, "Quantize and Scan Transform Coefficients", where transform coefficients associated with coding partitions (and/or transform blocks) may be quantized and scanned in preparation for entropy coding.

Process 1200 may continue at operation 1222, "Entropy Encode Data associated with Each Tile or Super-fragment Decode, Such As Coding Partition Indicator(s), Block Size Data, Transform Type Data, Quantizer (Qp), and Quantized Transform Coefficients, Motion Vectors and Reference Type Data, Characteristic Parameters (e.g., mop, syp)", where data may be entropy encoded. For example, the entropy encoded data may include the coding partition indicators, block size data, transform type data, quantizer (Qp), quantized transform coefficients, motion vectors and reference type data, characteristic parameters (e.g., mop, syp), the like, and/or combinations thereof. Additionally or alternatively, the entropy encoded data may include prediction partitioning, prediction parameters, the selected coding partitioning, the selected characteristics data, motion vector data, quantized transform coefficients, filter parameters, selection data (such as mode selection data), and indictors.

Process 1200 may continue at operation 1223 "Apply DD/DB Filter, Reconstruct Pixel Data, Assemble into a Picture", where deblock filtering (e.g., DD or DB filters) may be applied, pixel data may be reconstructed, and assembled into a picture. For example, after a local decode loop (e.g., including inverse scan, inverse transform, and assembling coding partitions), prediction error data partitions may be generated. The prediction error data partitions may be added with a prediction partition to generate reconstructed prediction partitions, which may be assembled into tiles or super-fragments. The assembled tiles or super-fragments may be optionally processed via deblock filtering and/or quality restoration filtering and assembled to generate a picture.

Process 1200 may continue at operation 1224 "Apply QR/LF Filter Save in Reference Picture Buffers", where quality restoration filtering (e.g., QR or LF filtering) may be applied, and the assembled picture may be saved in reference picture buffers. For example, in addition to or in the alternative to the DD/DB filtering, the assembled tiles or super-fragments may be optionally processed via quality restoration filtering and assembled to generate a picture. The picture may be saved in decoded picture buffer 119 as a reference picture for prediction of other (e.g., following) pictures.

Process 1200 may continue at operation 1225, "Apply AP/AM Filter, Determine Modifying (e.g., Morphing or Synthesizing) Characteristic Parameters for Generating Morphed or Synthesized Prediction Reference(s) and Perform Prediction(s)", where, modifying (e.g., morphing or synthesizing) characteristic parameters and prediction(s) may be performed and adaptive motion filtering or adaptive precision filtering (e.g., AP/AM Filter) may be applied. For example, modifying (e.g., morphing or synthesizing) characteristic parameters for generating morphed or synthesized prediction reference(s) may be generated and prediction(s) may be performed. Additionally, adaptive motion filtering or adaptive precision filtering may be applied at this point in the process.

As discussed, in some examples, inter-prediction may be performed. In some examples, up to 4 decoded past and/or future pictures and several morphing/synthesis predictions may be used to generate a large number of reference types (e.g., reference pictures). For instance in 'inter' mode, up to nine reference types may be supported in P-pictures, and up to ten reference types may be supported for F/B-pictures. Further, 'multi' mode may provide a type of inter prediction mode in which instead of 1 reference picture, 2 reference pictures may be used and P- and F/B-pictures respectively may allow 3, and up to 8 reference types. For example, prediction may be based on a previously decoded frame generated using at least one of a morphing technique or a synthesizing technique. In such examples, and the bitstream (discussed below with respect to operation 1212) may include a frame reference, morphing parameters, or synthesizing parameters associated with the prediction partition.

Process 1200 may continue at operation 1229 "Optionally Apply EP Filter and/or Optionally apply FI/FP Filter", where enhanced predicted partition (e.g., EP Filtering) or FI/FP Filtering (e.g., fusion filtering or fusion improvement filtering) may be optionally applied. In some examples, a decision may be made regarding whether to utilize some form or FI/FP Filter (fusion improvement filtering/fusion filtering) or not to use FI/FP Filtering. When some form or FI/FP Filter (e.g., fusion filtering or fusion improvement filtering) is to be applied to the selected predicted partition the selected predicted partition and a second selected predicted partition may be assembled to generate at least a portion of an assembled picture. FI/FP Filtering may be applied to filter the portion of the assembled picture. FI/FP Filtering parameters (e.g., filtering parameters or fusion improvement filtering parameters) associated with the FI/FP Filtering may be generated and sent to the entropy coder subsystem.

In implementations where both EP Filtering or FI/FP Filtering are available, an indicator may be generated that indicates to the decoder system whether to use the enhanced predicted partition (e.g., EP Filtering) or the predicted partition data as the selected predicted partition for the prediction partition.

Operations 1202 through 1229 may provide for video encoding and bitstream transmission techniques, which may be employed by an encoder system as discussed herein.

FIG. 13 illustrates an example bitstream 1300, arranged in accordance with at least some implementations of the present disclosure. In some examples, bitstream 1300 may correspond to output bitstream 111 as shown in FIG. 1 and/or input bitstream 201 as shown in FIG. 2. Although not shown in FIG. 29 for the sake of clarity of presentation, in some examples bitstream 1300 may include a header portion and a data portion. In various examples, bitstream 1300 may include data, indicators, index values, mode selection data, or the like associated with encoding a video frame as discussed herein.

As discussed, bitstream 1300 may be generated by an encoder such as, for example, encoder 100 and/or received by a decoder 200 for decoding such that decoded video frames may be presented via a display device.

FIG. 14 is a flow diagram illustrating an example process 1400, arranged in accordance with at least some implementations of the present disclosure. Process 1400 may include one or more operations, functions or actions as illustrated by one or more operations. Process 1400 may form at least part of a next generation video coding process. By way of non-limiting example, process 1400 may form at least part of a next generation video decoding process as undertaken by decoder system 200 and/or any other decoder system or subsystems described herein.

Process 1400 may begin at operation 1402, "Receive Encoded Bitstream", where a bitstream may be received. For example, a bitstream encoded as discussed herein may be received at a video decoder. In some examples, bitstream 900 or 1300 may be received via decoder 200.

Process 1400 may continue at operation 1404, "Decode the Entropy Encoded Bitstream to Determine Coding Partition Indicator(s), Block Size Data, Transform Type Data, Quantizer (Qp), Quantized Transform Coefficients, Motion Vectors and Reference Type Data, Characteristic Parameters (e.g., mop, syp)", where the bitstream may be decoded to determine coding partition indicators, block size data, transform type data, quantizer (Qp), quantized transform coefficients, motion vectors and reference type data, characteristic parameters (e.g., mop, syp), the like, and/or combinations thereof. Additionally or alternatively, the entropy encoded data may include prediction partitioning, prediction parameters, the selected coding partitioning, the selected characteristics data, motion vector data, quantized transform coefficients, filter parameters, selection data (such as mode selection data), and indictors.

Process 1400 may continue at operation 1406, "Apply Quantizer (Qp) on Quantized Coefficients to Generate Inverse Quantized Transform Coefficients", where quantizer (Qp) may be applied to quantized transform coefficients to generate inverse quantized transform coefficients. For example, operation 1406 may be applied via adaptive inverse quantize module 203.

Process 1400 may continue at operation 1408, "On each Decoded Block of Coefficients in a Coding (or Intra Predicted) Partition Perform Inverse Transform based on Transform Type and Block Size Data to Generate Decoded Prediction Error Partitions", where, on each decode block of transform coefficients in a coding (or intra predicted) partition, an inverse transform based on the transform type and block size data may be performed to generate decoded prediction error partitions. In some examples, the inverse transform may include an inverse fixed transform. In some examples, the inverse transform may include an inverse content adaptive transform. In such examples, performing the inverse content adaptive transform may include determining basis functions associated with the inverse content adaptive transform based on a neighboring block of decoded video data, as discussed herein. Any forward transform used for encoding as discussed herein may be used for decoding using an associated inverse transform. In some examples, the inverse transform may be performed by adaptive inverse transform module 204. In some examples, generating the decoded prediction error partitions may also include assembling coding partitions via coding partitions assembler 205.

Process 1400 may continue at operation 1423 "Apply DD/DB Filter, Reconstruct Pixel Data, Assemble into a Picture", where deblock filtering (e.g., DD or DB filters) may be applied, pixel data may be reconstructed, and assembled into a picture. For example, after inverse scan, inverse transform, and assembling coding partitions, the prediction error data partitions may be added with a prediction partition to generate reconstructed prediction partitions, which may be assembled into tiles or super-fragments. The assembled tiles or super-fragments may be optionally processed via deblock filtering.

Process 1400 may continue at operation 1424 "Apply QR/LF Filter Save in Reference Picture Buffers", where quality restoration filtering (e.g., QR or LF filtering) may be applied, and the assembled picture may be saved in reference picture buffers. For example, in addition to or in the alternative to the DD/DB filtering, the assembled tiles or super-fragments may be optionally processed via quality restoration filtering and assembled to generate a picture. The picture may be saved in decoded picture buffer 119 as a reference picture for prediction of other (e.g., following) pictures.

Process 1400 may continue at operation 1425, "Apply AP/AM Filter, Use Decoded Modifying Characteristics (e.g., mop, syp) to Generate Modified References for Prediction and Use Motion Vectors and Reference Info, Predicted Partition Info, and Modified References to Generate Predicted Partition", where modified references for prediction may be generated and predicted partitions may be generated as well, and where adaptive motion filtering or adaptive precision filtering (e.g., AP/AM Filter) may be applied. For example, where modified references for prediction may be generated based at least in part on decoded modifying characteristics (e.g., mop, syp) and predicted partitions may be generated based at least in part on motion vectors and reference information, predicted partition information, and modified references. Additionally, adaptive motion filtering or adaptive precision filtering may be applied at this point in the process.

Process 1400 may continue at operation 1429 "Optionally Apply EP Filter and/or Optionally apply FI/FP Filter", where enhanced predicted partition (e.g., EP Filtering) or FI/FP Filtering (e.g., fusion filtering or fusion improvement filtering) may be optionally applied. In some examples, a decision may be made regarding whether to utilize some form or FI/FP Filter (fusion improvement filtering/fusion filtering) or not to use FI/FP Filtering. When some form or FI/FP Filter (e.g., fusion filtering or fusion improvement filtering) is to be applied to the selected predicted partition the selected predicted partition and a second selected predicted partition may be assembled to generate at least a portion of an assembled picture. FI/FP Filtering may be applied to filter the portion of the assembled picture. FI/FP Filtering parameters (e.g., filtering parameters or fusion improvement filtering parameters) associated with the FI/FP Filtering may be generated and sent to the entropy coder subsystem.

In implementations where both EP Filtering or FI/FP Filtering are available, an indicator may be received from the encoder system that indicates to the decoder system whether to use the enhanced predicted partition (e.g., EP Filtering) or the predicted partition data as the selected predicted partition for the prediction partition.

Process 1400 may continue at operation 1430, "Add Prediction Partition to the Decoded Prediction Error Data Partition to Generate a Reconstructed Partition", where a prediction partition my be added to the decoded prediction error data partition to generate a reconstructed prediction partition. For example, the decoded prediction error data partition may be added to the associated prediction partition via adder 206.

Process 1400 may continue at operation 1432, "Assemble Reconstructed Partitions to Generate a Tile or Super-Fragment", where the reconstructed prediction partitions may be assembled to generate tiles or super-fragments. For example, the reconstructed prediction partitions may be assembled to generate tiles or super-fragments via prediction partitions assembler module 207.

Process 1400 may continue at operation 1434, "Assemble Tiles or Super-Fragments of a Picture to Generate a Full Decoded Picture", where the tiles or super-fragments of a picture may be assembled to generate a full decoded picture. For example, after optional deblock filtering and/or quality restoration filtering, tiles or super-fragments may be assembled to generate a full decoded picture, which may be stored via decoded picture buffer 210 and/or transmitted for presentment via a display device after processing via adaptive picture re-organizer module 217 and content post-restorer module 218.

Figure 15A:
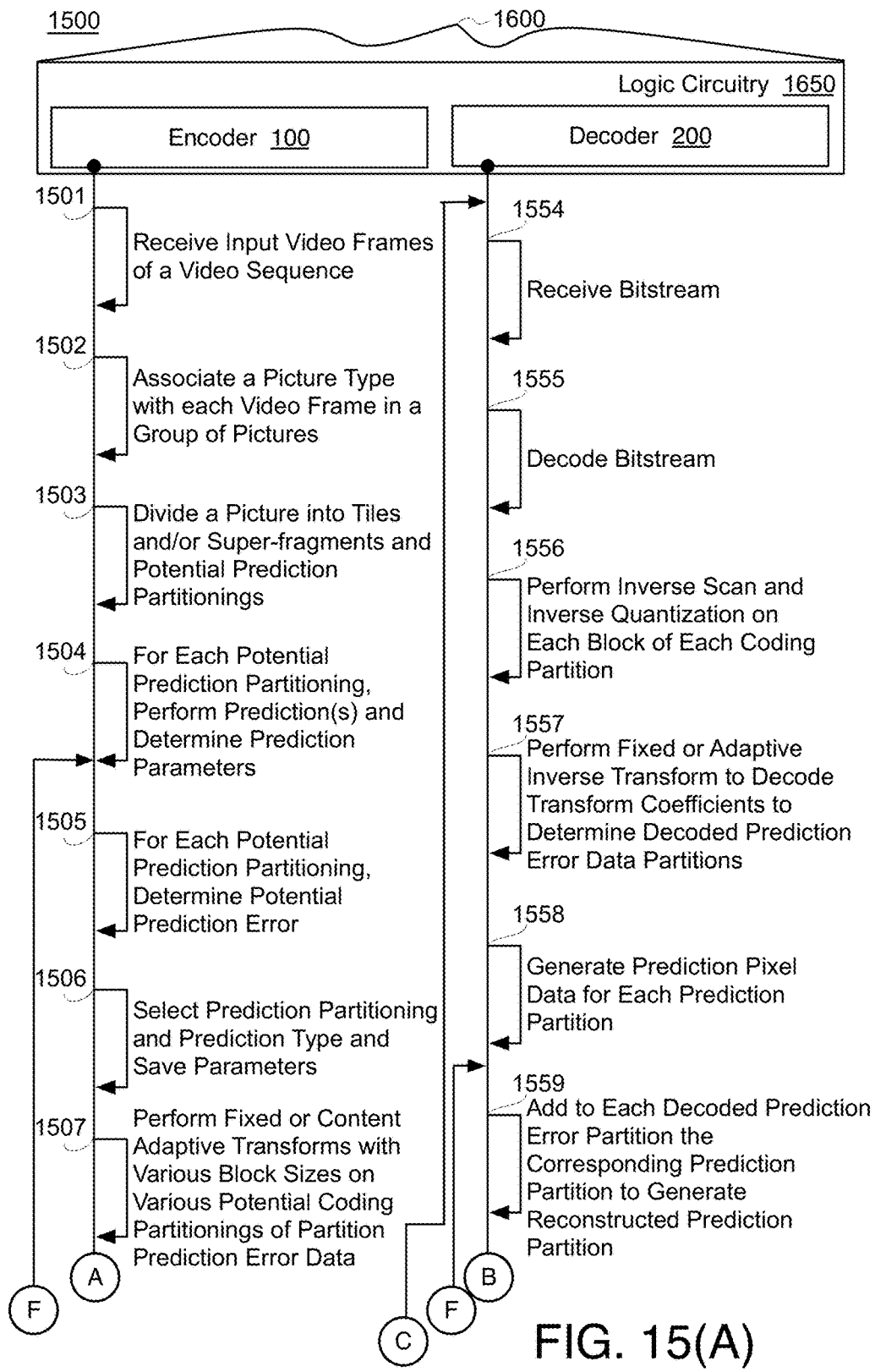
FIGS. 15(A), 15(B), and 15(C) provide an illustrative diagram of an example video coding system and video coding process in operation.
Figure 15B:
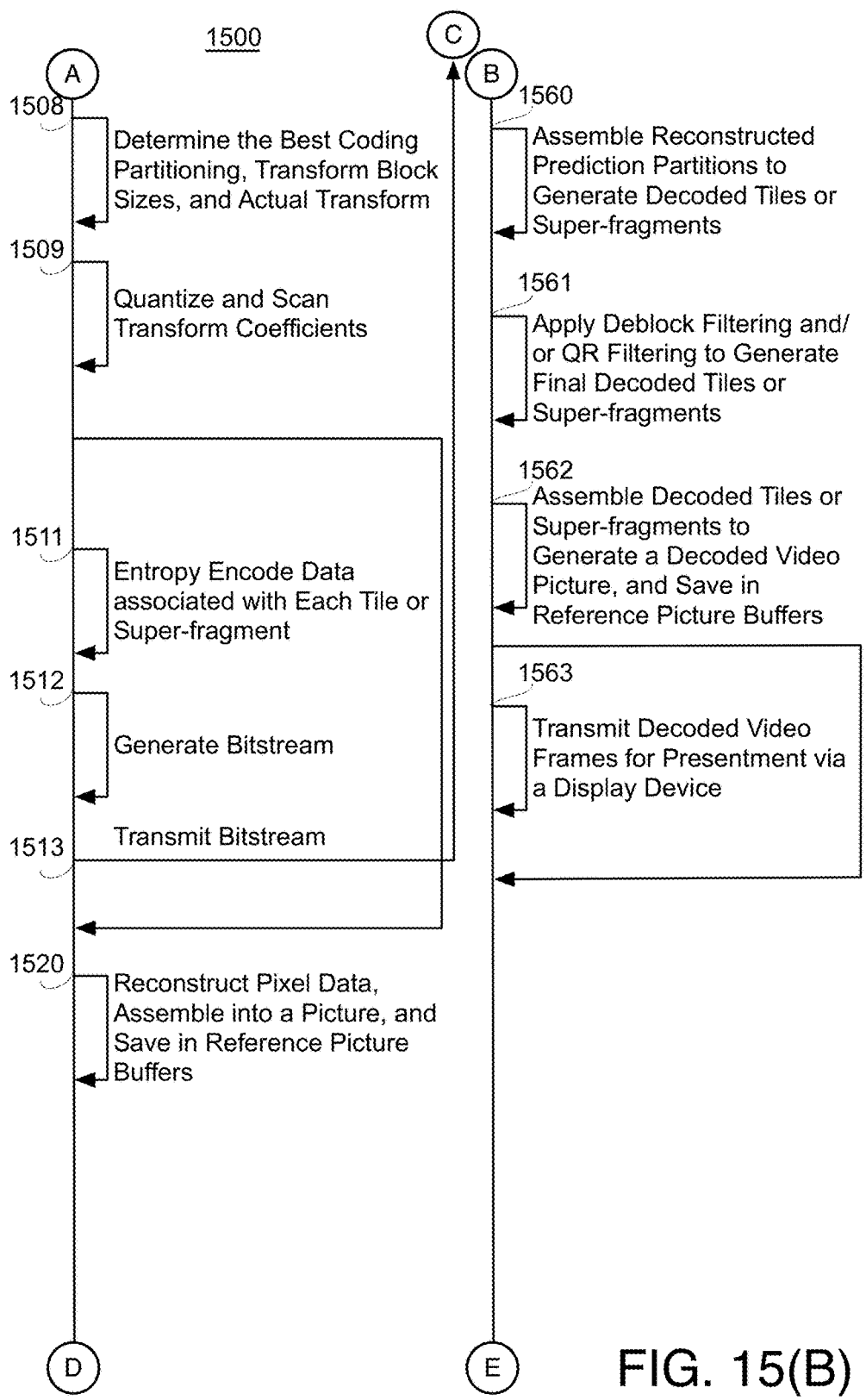
Figure 15C:
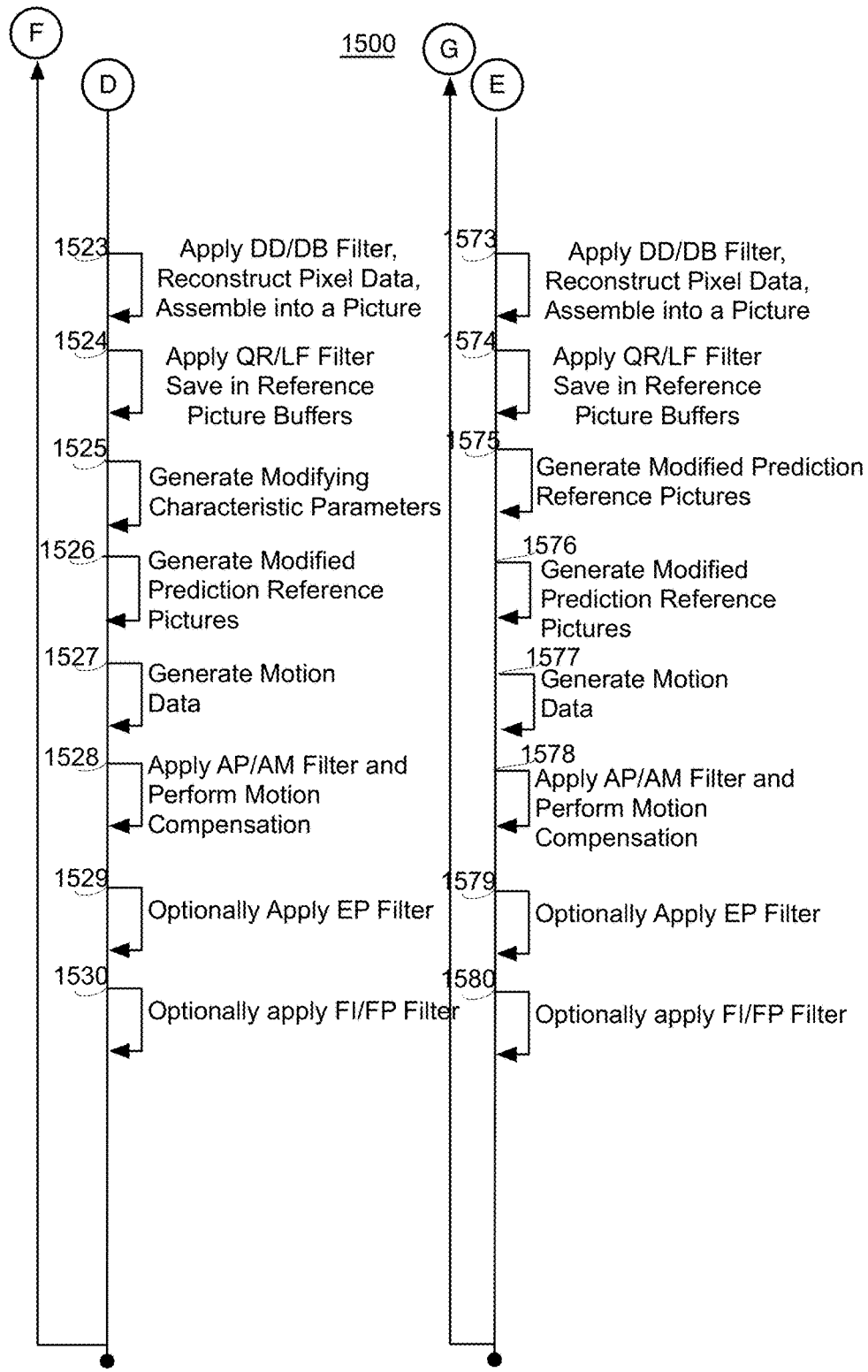

FIGS. 15(A), 15(B), and 15(C) provide an illustrative diagram of an example video coding system 1600 and video coding process 1500 in operation, arranged in accordance with at least some implementations of the present disclosure. In the illustrated implementation, process 1500 may include one or more operations, functions or actions as illustrated by one or more of actions 1501 through 1580. By way of non-limiting example, process 1500 will be described herein with reference to example video coding system 1600 including encoder 100 of FIG. 1 and decoder 200 of FIG. 2, as is discussed further herein below with respect to FIG. 16. In various examples, process 1500 may be undertaken by a system including both an encoder and decoder or by separate systems with one system employing an encoder (and optionally a decoder) and another system employing a decoder (and optionally an encoder). It is also noted, as discussed above, that an encoder may include a local decode loop employing a local decoder as a part of the encoder system.

In the illustrated implementation, video coding system 1600 may include logic circuitry 1650, the like, and/or combinations thereof. For example, logic circuitry 1650 may include encoder system 100 of FIG. 1 and/or decoder system 200 of FIG. 2 and may include any modules as discussed with respect to any of the encoder systems or subsystems described herein and/or decoder systems or subsystems described herein. Although video coding system 1600, as shown in FIGS. 15(A)-(C) may include one particular set of blocks or actions associated with particular modules, these blocks or actions may be associated with different modules than the particular modules illustrated here. Although process 1500, as illustrated, is directed to encoding and decoding, the concepts and/or operations described may be applied to encoding and/or decoding separately, and, more generally, to video coding.

Process 1500 may begin at operation 1501, "Receive Input Video Frames of a Video Sequence", where input video frames of a video sequence may be received via encoder 100 for example.

Process 1500 may continue at operation 1502, "Associate a Picture Type with each Video Frame in a Group of Pictures", where a picture type may be associated with each video frame in a group of pictures via content pre-analyzer module 102 for example. For example, the picture type may be F/B-picture, P-picture, or I-picture, or the like. In some examples, a video sequence may include groups of pictures and the processing described herein (e.g., operations 1503 through 1511) may be performed on a frame or picture of a group of pictures and the processing may be repeated for all frames or pictures of a group and then repeated for all groups of pictures in a video sequence.

Process 1500 may continue at operation 1503, "Divide a Picture into Tiles and/or Super-fragments and Potential Prediction Partitionings", where a picture may be divided into tiles or super-fragments and potential prediction partitions via prediction partitions generator 105 for example.

Process 1500 may continue at operation 1504, "For Each Potential Prediction Partitioning, Perform Prediction(s) and Determine Prediction Parameters", where, for each potential prediction partitionings, prediction(s) may be performed and prediction parameters may be determined. For example, a range of potential prediction partitionings (each having various prediction partitions) may be generated and the associated prediction(s) and prediction parameters may be determined. For example, the prediction(s) may include prediction(s) using characteristics and motion based multi-reference predictions or intra-predictions.

As discussed, in some examples, inter-prediction may be performed. In some examples, up to 4 decoded past and/or future pictures and several morphing/synthesis predictions may be used to generate a large number of reference types (e.g., reference pictures). For instance in 'inter' mode, up to 9 reference types may be supported in P-pictures, and up to 10 reference types may be supported for F/B-pictures. Further, 'multi' mode may provide a type of inter prediction mode in which instead of 1 reference picture, 2 reference pictures may be used and P- and F/B-pictures respectively may allow 3, and up to 8 reference types. For example, prediction may be based on a previously decoded frame generated using at least one of a morphing technique or a synthesizing technique. In such examples, and the bitstream (discussed below with respect to operation 1512) may include a frame reference, morphing parameters, or synthesizing parameters associated with the prediction partition.

Process 1500 may continue at operation 1505, "For Each Potential Prediction Partitioning, Determine Potential Prediction Error", where, for each potential prediction partitioning, a potential prediction error may be determined. For example, for each prediction partitioning (and associated prediction partitions, prediction(s), and prediction parameters), a prediction error may be determined. For example, determining the potential prediction error may include differencing original pixels (e.g., original pixel data of a prediction partition) with prediction pixels. In some examples, the associated prediction parameters may be stored. As discussed, in some examples, the prediction error data partition may include prediction error data generated based at least in part on a previously decoded frame generated using at least one of a morphing technique or a synthesizing technique.

Process 1500 may continue at operation 1506, "Select Prediction Partitioning and Prediction Type and Save Parameters", where a prediction partitioning and prediction type may be selected and the associated parameters may be saved. In some examples, the potential prediction partitioning with a minimum prediction error may be selected. In some examples, the potential prediction partitioning may be selected based on a rate distortion optimization (RDO).

Process 1500 may continue at operation 1507, "Perform Fixed or Content Adaptive Transforms with Various Block Sizes on Various Potential Coding Partitionings of Partition Prediction Error Data", where fixed or content adaptive transforms with various block sizes may be performed on various potential coding partitionings of partition prediction error data. For example, partition prediction error data may be partitioned to generate a plurality of coding partitions. For example, the partition prediction error data may be partitioned by a bi-tree coding partitioner module or a k-d tree coding partitioner module of coding partitions generator module 107 as discussed herein. In some examples, partition prediction error data associated with an F/B- or P-picture may be partitioned by a bi-tree coding partitioner module. In some examples, video data associated with an I-picture (e.g., tiles or super-fragments in some examples) may be partitioned by a k-d tree coding partitioner module. In some examples, a coding partitioner module may be chosen or selected via a switch or switches. For example, the partitions may be generated by coding partitions generator module 107.

Process 1500 may continue at operation 1508, "Determine the Best Coding Partitioning, Transform Block Sizes, and Actual Transform", where the best coding partitioning, transform block sizes, and actual transforms may be determined. For example, various coding partitionings (e.g., having various coding partitions) may be evaluated based on RDO or another basis to determine a selected coding partitioning (which may also include further division of coding partitions into transform blocks when coding partitions to not match a transform block size as discussed). For example, the actual transform (or selected transform) may include any content adaptive transform or fixed transform performed on coding partition or block sizes as described herein.

Process 1500 may continue at operation 1509, "Quantize and Scan Transform Coefficients", where transform coefficients associated with coding partitions (and/or transform blocks) may be quantized and scanned in preparation for entropy coding.

Process 1500 may continue at operation 1511, "Entropy Encode Data associated with Each Tile or Super-fragment", where data associated with each tile or super-fragment may be entropy encoded. For example, data associated with each tile or super-fragment of each picture of each group of pictures of each video sequence may be entropy encoded. The entropy encoded data may include the prediction partitioning, prediction parameters, the selected coding partitioning, the selected characteristics data, motion vector data, quantized transform coefficients, filter parameters, selection data (such as mode selection data), and indictors.

Process 1500 may continue at operation 1512, "Generate Bitstream" where a bitstream may be generated based on the entropy encoded data. As discussed, in some examples, the bitstream may include a frame or picture reference, morphing parameters, or synthesizing parameters associated with a prediction partition.

Process 1500 may continue at operation 1513, "Transmit Bitstream", where the bitstream may be transmitted. For example, video coding system 2400 may transmit output bitstream 111, bitstream 2100, or the like via an antenna 2402 (please refer to FIG. 34).

Process 1500 may continue at operation 1520, "Reconstruct Pixel Data, Assemble into a Picture, and Save in Reference Picture Buffers", where pixel data may be reconstructed, assembled into a picture, and saved in reference picture buffers. For example, after a local decode loop (e.g., including inverse scan, inverse transform, and assembling coding partitions), prediction error data partitions may be generated. The prediction error data partitions may be added with a prediction partition to generate reconstructed prediction partitions, which may be assembled into tiles or super-fragments. The assembled tiles or super-fragments may be optionally processed via deblock filtering and/or quality restoration filtering and assembled to generate a picture. The picture may be saved in decoded picture buffer 119 as a reference picture for prediction of other (e.g., following) pictures.

Process 1500 may continue at operation 1523 "Apply DD/DB Filter, Reconstruct Pixel Data, Assemble into a Picture", where deblock filtering (e.g., DD or DB filters) may be applied, pixel data may be reconstructed, and assembled into a picture. For example, after a local decode loop (e.g., including inverse scan, inverse transform, and assembling coding partitions), prediction error data partitions may be generated. The prediction error data partitions may be added with a prediction partition to generate reconstructed prediction partitions, which may be assembled into tiles or super-fragments. The assembled tiles or super-fragments may be optionally processed via deblock filtering and/or quality restoration filtering and assembled to generate a picture.

Process 1500 may continue at operation 1524 "Apply QR/LF Filter Save in Reference Picture Buffers", where quality restoration filtering (e.g., QR or LF filtering) may be applied, and the assembled picture may be saved in reference picture buffers. For example, in addition to or in the alternative to the DD/DB filtering, the assembled tiles or super-fragments may be optionally processed via quality restoration filtering and assembled to generate a picture. The picture may be saved in decoded picture buffer 119 as a reference picture for prediction of other (e.g., following) pictures.

Process 1500 may continue at operation 1525, "Generate Modifying Characteristic Parameters", where, modified characteristic parameters may be generated. For example, a second modified prediction reference picture and second modifying characteristic parameters associated with the second modified prediction reference picture may be generated based at least in part on the second decoded prediction reference picture, where the second modified reference picture may be of a different type than the first modified reference picture.

Process 1500 may continue at operation 1526, "Generate Modified Prediction Reference Pictures", where modified prediction reference pictures may be generated, for example, a first modified prediction reference picture and first modifying characteristic parameters associated with the first modified prediction reference picture may be generated based at least in part on the first decoded prediction reference picture.

Process 1500 may continue at operation 1527, "Generate Motion Data", where, motion estimation data may be generated. For example, motion data associated with a prediction partition of a current picture may be generated based at least in part on one of the first modified prediction reference picture or the second modified prediction reference picture.

Process 1500 may continue at operation 1528, "Apply AP/AM Filter Perform Motion Compensation", where, motion compensation may be performed. For example, motion compensation may be performed based at least in part on the motion data and at least one of the first modified prediction reference picture or the second modified prediction reference picture to generate prediction partition data for the prediction partition and adaptive motion filtering or adaptive precision filtering (e.g., AP/AM Filter) may be applied. Process 1500 may feed this information back to operation 1504 where each decoded prediction error partition (e.g., including zero prediction error partitions) may be added to the corresponding prediction partition to generate a reconstructed prediction partition. Additionally, adaptive motion filtering or adaptive precision filtering may be applied at this point in the process.

Process 1500 may continue at operation 1529 "Optionally Apply EP", where enhanced predicted partition (e.g., EP Filtering) may be optionally applied. In some examples, where both EP Filtering or FI/FP Filtering are available, an indicator may be generated that indicates to the decoder system whether to use the enhanced predicted partition (e.g., EP Filtering) or the predicted partition data as the selected predicted partition for the prediction partition.

Process 1500 may continue at operation 1530 "Optionally apply FI/FP Filter", where FI/FP Filtering (e.g., fusion filtering or fusion improvement filtering) may be optionally applied. In some examples, a decision may be made regarding whether to utilize some form or FI/FP Filter (fusion improvement filtering/fusion filtering) or not to use FI/FP Filtering. When some form or FI/FP Filter (e.g., fusion filtering or fusion improvement filtering) is to be applied to the selected predicted partition the selected predicted partition and a second selected predicted partition may be assembled to generate at least a portion of an assembled picture. FI/FP Filtering may be applied to filter the portion of the assembled picture. FI/FP Filtering parameters (e.g., filtering parameters or fusion improvement filtering parameters) associated with the FI/FP Filtering may be generated and sent to the entropy coder subsystem.

Operations 1501 through 1530 may provide for video encoding and bitstream transmission techniques, which may be employed by an encoder system as discussed herein. The following operations, operations 1554 through 1568 may provide for video decoding and video display techniques, which may be employed by a decoder system as discussed herein.

Process 1500 may continue at operation 1554, "Receive Bitstream", where the bitstream may be received. For example, input bitstream 201, bitstream 2100, or the like may be received via decoder 200. In some examples, the bitstream may include data associated with a coding partition, one or more indicators, and/or data defining coding partition(s) as discussed above. In some examples, the bitstream may include the prediction partitioning, prediction parameters, the selected coding partitioning, the selected characteristics data, motion vector data, quantized transform coefficients, filter parameters, selection data (such as mode selection data), and indictors.

Process 1500 may continue at operation 1555, "Decode Bitstream", where the received bitstream may be decoded via adaptive entropy decoder module 202 for example. For example, received bitstream may be entropy decoded to determine the prediction partitioning, prediction parameters, the selected coding partitioning, the selected characteristics data, motion vector data, quantized transform coefficients, filter parameters, selection data (such as mode selection data), and indictors.

Process 1500 may continue at operation 1556, "Perform Inverse Scan and Inverse Quantization on Each Block of Each Coding Partition", where an inverse scan and inverse quantization may be performed on each block of each coding partition for the prediction partition being processed. For example, the inverse scan and inverse quantization may be performed via adaptive inverse quantize module 203.

Process 1500 may continue at operation 1557, "Perform Fixed or Content Adaptive Inverse Transform to Decode Transform Coefficients to Determine Decoded Prediction Error Data Partitions", where a fixed or content adaptive inverse transform may be performed to decode transform coefficients to determine decoded prediction error data partitions. For example, the inverse transform may include an inverse content adaptive transform such as a hybrid parametric Haar inverse transform such that the hybrid parametric Haar inverse transform may include a parametric Haar inverse transform in a direction of the parametric transform direction and a discrete cosine inverse transform in a direction orthogonal to the parametric transform direction. In some examples, the fixed inverse transform may include a discrete cosine inverse transform or a discrete cosine inverse transform approximator. For example, the fixed or content adaptive transform may be performed via adaptive inverse transform module 204. As discussed, the content adaptive inverse transform may be based on other previously decoded data, such as, for example, decoded neighboring partitions or blocks. In some examples, generating the decoded prediction error data partitions may include assembling decoded coding partitions via coding partitions assembler module 205.

Process 1500 may continue at operation 1558, "Generate Prediction Pixel Data for Each Prediction Partition", where prediction pixel data may be generated for each prediction partition. For example, prediction pixel data may be generated using the selected prediction type (e.g., based on characteristics and motion, or intra-, or other types) and associated prediction parameters.

Process 1500 may continue at operation 1559, "Add to Each Decoded Prediction Error Partition the Corresponding Prediction Partition to Generate Reconstructed Prediction Partition", where each decoded prediction error partition (e.g., including zero prediction error partitions) may be added to the corresponding prediction partition to generated a reconstructed prediction partition. For example, prediction partitions may be generated via the decode loop illustrated in FIG. 2 and added via adder 206 to decoded prediction error partitions.

Process 1500 may continue at operation 1560, "Assemble Reconstructed Prediction Partitions to Generate Decoded Tiles or Super-fragments", where reconstructed prediction partitions may be assembled to generate decoded tiles or super-fragments. For example, prediction partitions may be assembled to generate decoded tiles or super-fragments via prediction partitions assembler module 207.

Process 1500 may continue at operation 1561, "Apply Deblock Filtering and/or QR Filtering to Generate Final Decoded Tiles or Super-fragments", where optional deblock filtering and/or quality restoration filtering may be applied to the decoded tiles or super-fragments to generate final decoded tiles or super-fragments. For example, optional deblock filtering may be applied via deblock filtering module 208 and/or optional quality restoration filtering may be applied via quality restoration filtering module 209.

Process 1500 may continue at operation 1562, "Assemble Decoded Tiles or Super-fragments to Generate a Decoded Video Picture, and Save in Reference Picture Buffers", where decoded (or final decoded) tiles or super-fragments may be assembled to generate a decoded video picture, and the decoded video picture may be saved in reference picture buffers (e.g., decoded picture buffer 210) for use in future prediction.

Process 1500 may continue at operation 1563, "Transmit Decoded Video Frames for Presentment via a Display Device", where decoded video frames may be transmitted for presentment via a display device. For example, decoded video pictures may be further processed via adaptive picture re-organizer 217 and content post restorer module 218 and transmitted to a display device as video frames of display video 219 for presentment to a user. For example, the video frame(s) may be transmitted to a display device 2405 (as shown in FIG. 34) for presentment.

Process 1500 may continue at operation 1573 "Apply DD/DB Filter, Reconstruct Pixel Data, Assemble into a Picture", where deblock filtering (e.g., DD or DB filters) may be applied, pixel data may be reconstructed, and assembled into a picture. For example, after inverse scan, inverse transform, and assembling coding partitions, the prediction error data partitions may be added with a prediction partition to generate reconstructed prediction partitions, which may be assembled into tiles or super-fragments. The assembled tiles or super-fragments may be optionally processed via deblock filtering.

Process 1500 may continue at operation 1574 "Apply QR/LF Filter Save in Reference Picture Buffers", where quality restoration filtering (e.g., QR or LF filtering) may be applied, and the assembled picture may be saved in reference picture buffers. For example, in addition to or in the alternative to the DD/DB filtering, the assembled tiles or super-fragments may be optionally processed via quality restoration filtering and assembled to generate a picture. The picture may be saved in a picture buffer as a reference picture for prediction of other (e.g., following) pictures.

Process 1500 may continue at operation 1576, "Generate Modified Prediction Reference Pictures", where modified prediction reference pictures may be generated, for example, at least a portion of a third modified prediction reference picture may be generated based at least in part on the third modifying characteristic parameters. Similarly, at least a portion a fourth modified prediction reference picture may be generated based at least in part on the second modifying characteristic parameters associated.

Process 1500 may continue at operation 1577, "Generate Motion Data", where, motion estimation data may be generated. For example, motion data associated with a prediction partition of a current picture may be generated based at least in part on one of the third modified prediction reference picture or the third modified prediction reference picture.

Process 1500 may continue at operation 1578, "Apply AP/AM Filter and Perform Motion Compensation", where, motion compensation may be performed and where adaptive motion filtering or adaptive precision filtering (e.g., AP/AM Filter) may be applied. For example, motion compensation may be performed based at least in part on the motion data and at least one of the third modified prediction reference picture or the fourth modified prediction reference picture to generate prediction partition data for the prediction partition. Process 1300 may feed this information back to operation 1559 where each decoded prediction error partition (e.g., including zero prediction error partitions) may be added to the corresponding prediction partition to generate a reconstructed prediction partition. Additionally, adaptive motion filtering or adaptive precision filtering may be applied at this point in the process.

Process 1500 may continue at operation 1579 "Optionally Apply EP Filter", where enhanced predicted partition (e.g., EP Filtering) may be optionally applied. In some examples, where both EP Filtering or FI/FP Filtering are available, an indicator may be received from the encoder system that indicates to the decoder system whether to use the enhanced predicted partition (e.g., EP Filtering) or the predicted partition data as the selected predicted partition for the prediction partition.

Process 1500 may continue at operation 1580 "Optionally apply FI/FP Filter", where FI/FP Filtering (e.g., fusion filtering or fusion improvement filtering) may be optionally applied. In some examples, a decision may be made regarding whether to utilize some form or FI/FP Filter (fusion improvement filtering/fusion filtering) or not to use FI/FP Filtering. When some form or FI/FP Filter (e.g., fusion filtering or fusion improvement filtering) is to be applied to the selected predicted partition the selected predicted partition and a second selected predicted partition may be assembled to generate at least a portion of an assembled picture. FI/FP Filtering may be applied to filter the portion of the assembled picture. FI/FP Filtering parameters (e.g., filtering parameters or fusion improvement filtering parameters) associated with the FI/FP Filtering may be generated and sent to the entropy coder subsystem.

Process 1500 may be implemented via any of the coder systems as discussed herein. Further, process 1500 may be repeated either in serial or in parallel on any number of instantiations of video data such as prediction error data partitions, original data partitions, or wavelet data or the like.

While implementation of the example processes herein may include the undertaking of all operations shown in the order illustrated, the present disclosure is not limited in this regard and, in various examples, implementation of the example processes herein may include the undertaking of only a subset of the operations shown and/or in a different order than illustrated.

FIG. 16 is an illustrative diagram of example video coding system 1600, arranged in accordance with at least some implementations of the present disclosure. In the illustrated implementation, video coding system 1600 may include imaging device(s) 1601, video encoder 100 and/or a video encoder implemented via logic circuitry 1650 of processing unit(s) 1620, video decoder 200 and/or a video decoder implemented via logic circuitry 1650 of processing unit(s) 1620, an antenna 1602, one or more processor(s) 1603, one or more memory store(s) 2004, and/or a display device 1605.

As illustrated, imaging device(s) 1601, antenna 1602, processing unit(s) 1620, logic circuitry 1650, video encoder 100, video decoder 200, processor(s) 1603, memory store(s) 1604, and/or display device 1605 may be capable of communication with one another. As discussed, although illustrated with both video encoder 100 and video decoder 200, video coding system 1600 may include only video encoder 100 or only video decoder 200 in various examples.

As shown, in some examples, video coding system 1600 may include antenna 1602. Antenna 1602 may be configured to transmit or receive an encoded bitstream of video data, for example. Further, in some examples, video coding system 1600 may include display device 1605. Display device 1605 may be configured to present video data. As shown, in some example, logic circuitry 1650 may be implemented via processing unit(s) 1620. Processing unit(s) 1620 may include application-specific integrated circuit (ASIC) logic, graphics processor(s), general purpose processor(s), or the like. Video coding system 1600 also may include optional processor(s) 1603, which may similarly include application-specific integrated circuit (ASIC) logic, graphics processor(s), general purpose processor(s), or the like. In some examples, logic circuitry 1650 may be implemented via hardware or video coding dedicated hardware or the like, and processor(s) 1603 may implemented general purpose software or operating systems or the like. In addition, memory stores 1604 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 1604 may be implemented by cache memory. In some examples, logic circuitry 1650 may access memory stores 1604 (for implementation of an image buffer for example). In other examples, logic circuitry 1650 and/or processing unit(s) 1620 may include memory stores (e.g., cache or the like) for the implementation of an image buffer or the like.

In some examples, video encoder 100 implemented via logic circuitry may include an image buffer (e.g., via either processing unit(s) 1620 or memory store(s) 1604)) and a graphics processing unit (e.g., via processing unit(s) 1620). The graphics processing unit may be communicatively coupled to the image buffer. The graphics processing unit may include video encoder 100 as implemented via logic circuitry 1650 to embody the various modules as discussed with respect to FIG. 1 and FIGS. 3 and 5. For example, the graphics processing unit may include entropy encoder logic circuitry, and so on. The logic circuitry may be configured to perform the various operations as discussed herein. For example, the entropy encoder logic circuitry may be configured to receive first video data and second video data of different types for entropy encoding, determine a first entropy encoding technique for the first video data based at least in part on a parameter associated with the first video data such that the first entropy encoding technique comprises at least one of an adaptive symbol-run variable length coding technique or an adaptive proxy variable length coding technique, entropy encode the first video data using the first encoding technique to generate first compressed video data and the second video data using a second encoding technique to generate second compressed video data, and assemble the first compressed video data and the second compressed video data to generate an output bitstream. Video decoder 200 may be implemented in a similar manner.

In some examples, antenna 1602 of video coding system 1600 may be configured to receive an entropy encoded bitstream of video data. As discussed, the bitstream may include two or more compressed video data types. Video coding system 1600 may also include video decoder 200 coupled to antenna 1602 and configured to decode the encoded bitstream. For example, video decoder 200 may be configured to disassemble the entropy encoded bitstream to determine first compressed video data and second compressed video data, determine a first entropy decoding technique for the first compressed video data, such that the first entropy decoding technique comprises at least one of an adaptive symbol-run variable length coding technique or an adaptive proxy variable length coding technique, entropy decode the first compressed video data based on the first entropy decoding technique to generate first video data and the second compressed video data based on a second entropy decoding technique to generate second video data, and decode the first video data and the second video data to generate a video frame.

In embodiments, features described herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more features described herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the features described herein.

Figure 17:
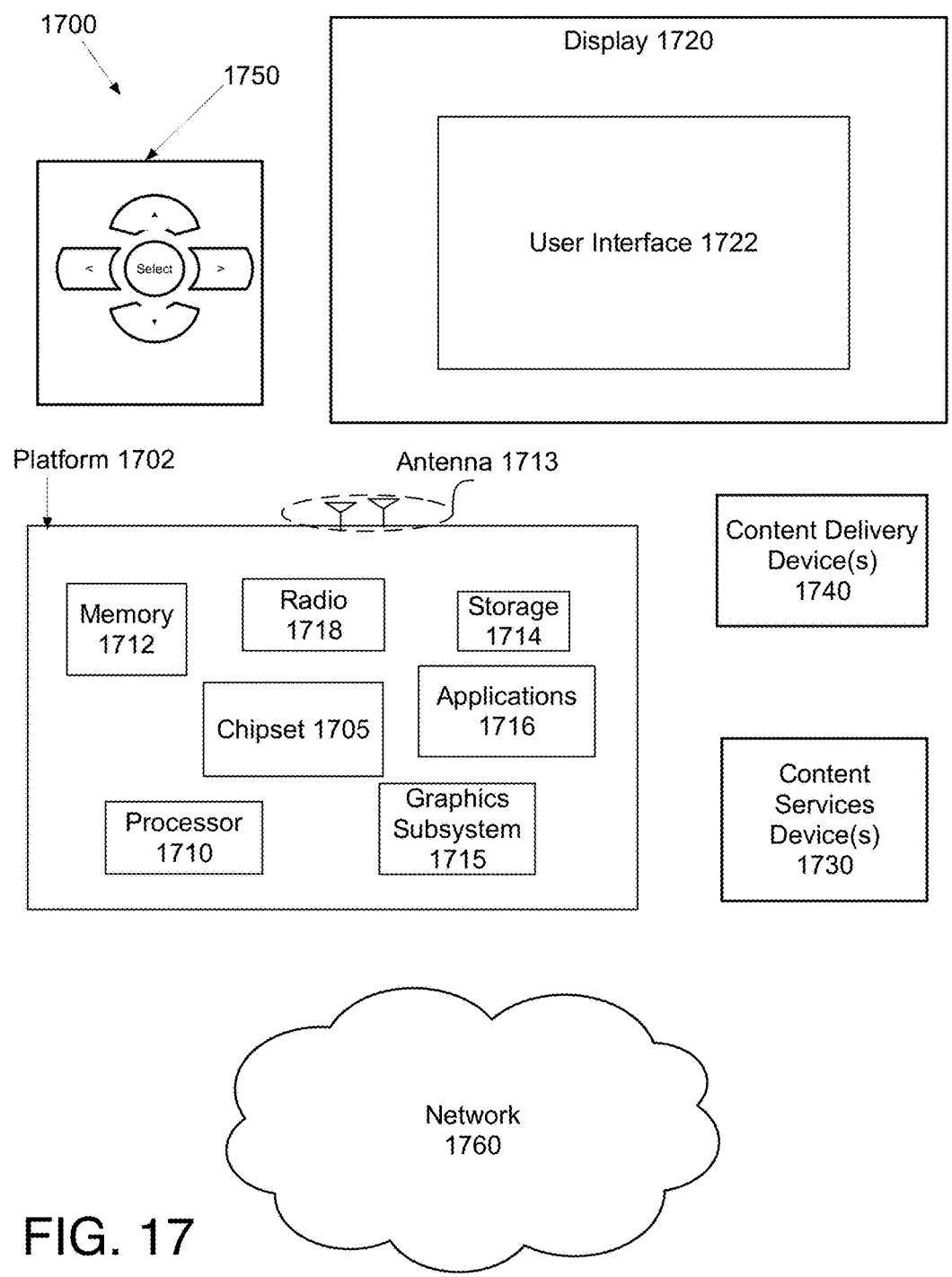
FIG. 17 is an illustrative diagram of an example system.

FIG. 17 is an illustrative diagram of an example system 1700, arranged in accordance with at least some implementations of the present disclosure. In various implementations, system 1700 may be a media system although system 1700 is not limited to this context. For example, system 1700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1700 includes a platform 1702 coupled to a display 1720. Platform 1702 may receive content from a content device such as content services device(s) 1730 or content delivery device(s) 1740 or other similar content sources. A navigation controller 1750 including one or more navigation features may be used to interact with, for example, platform 1702 and/or display 1720. Each of these components is described in greater detail below.

In various implementations, platform 1702 may include any combination of a chipset 1705, processor 1710, memory 1712, antenna 1713, storage 1714, graphics subsystem 1715, applications 1716 and/or radio 1718. Chipset 1705 may provide intercommunication among processor 1710, memory 1712, storage 1714, graphics subsystem 1715, applications 1716 and/or radio 1718. For example, chipset 1705 may include a storage adapter (not depicted) capable of providing intercommunication with storage 1714.

Processor 1710 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1710 may be dual-core processor(s), dual-core mobile processor(s), and so forth.

Memory 1712 may be implemented as a volatile memory device such as, but not limited to, a Random Access Memory (RAM), Dynamic Random Access Memory (DRAM), or Static RAM (SRAM).

Storage 1714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1714 may include technology to increase the storage performance enhanced protection for valuable digital media when multiple hard drives are included, for example.

Graphics subsystem 1715 may perform processing of images such as still or video for display. Graphics subsystem 1715 may be a graphics processing unit (GPU) or a visual processing unit (VPU), for example. An analog or digital interface may be used to communicatively couple graphics subsystem 1715 and display 1720. For example, the interface may be any of a High-Definition Multimedia Interface, DisplayPort, wireless HDMI, and/or wireless HD compliant techniques. Graphics subsystem 1715 may be integrated into processor 1710 or chipset 1705. In some implementations, graphics subsystem 1715 may be a stand-alone device communicatively coupled to chipset 1705.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1718 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1718 may operate in accordance with one or more applicable standards in any version.

In various implementations, display 1720 may include any television type monitor or display. Display 1720 may include, for example, a computer display screen, touch screen display, video monitor, television-like device, and/or a television. Display 1720 may be digital and/or analog. In various implementations, display 1720 may be a holographic display. Also, display 1720 may be a transparent surface that may receive a visual projection. Such projections may convey various forms of information, images, and/or objects. For example, such projections may be a visual overlay for a mobile augmented reality (MAR) application. Under the control of one or more software applications 1716, platform 1702 may display user interface 1722 on display 1720.

In various implementations, content services device(s) 1730 may be hosted by any national, international and/or independent service and thus accessible to platform 1702 via the Internet, for example. Content services device(s) 1730 may be coupled to platform 1702 and/or to display 1720. Platform 1702 and/or content services device(s) 1730 may be coupled to a network 1760 to communicate (e.g., send and/or receive) media information to and from network 1760. Content delivery device(s) 1740 also may be coupled to platform 1702 and/or to display 1720.

In various implementations, content services device(s) 1730 may include a cable television box, personal computer, network, telephone, Internet enabled devices or appliance capable of delivering digital information and/or content, and any other similar device capable of unidirectionally or bidirectionally communicating content between content providers and platform 1702 and/display 1720, via network 1760 or directly. It will be appreciated that the content may be communicated unidirectionally and/or bidirectionally to and from any one of the components in system 1700 and a content provider via network 1760. Examples of content may include any media information including, for example, video, music, medical and gaming information, and so forth.

Content services device(s) 1730 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1702 may receive control signals from navigation controller 1750 having one or more navigation features. The navigation features of controller 1750 may be used to interact with user interface 1722, for example. In various embodiments, navigation controller 1750 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1750 may be replicated on a display (e.g., display 1720) by movements of a pointer, cursor, focus ring, or other visual indicators displayed on the display. For example, under the control of software applications 1716, the navigation features located on navigation controller 1750 may be mapped to virtual navigation features displayed on user interface 1722, for example. In various embodiments, controller 1750 may not be a separate component but may be integrated into platform 1702 and/or display 1720. The present disclosure, however, is not limited to the elements or in the context shown or described herein.

In various implementations, drivers (not shown) may include technology to enable users to instantly turn on and off platform 1702 like a television with the touch of a button after initial boot-up, when enabled, for example. Program logic may allow platform 1702 to stream content to media adaptors or other content services device(s) 1730 or content delivery device(s) 1740 even when the platform is turned "off." In addition, chipset 1705 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1700 may be integrated. For example, platform 1702 and content services device(s) 1730 may be integrated, or platform 1702 and content delivery device(s) 1740 may be integrated, or platform 1702, content services device(s) 1730, and content delivery device(s) 1740 may be integrated, for example. In various embodiments, platform 1702 and display 1720 may be an integrated unit. Display 1720 and content service device(s) 1730 may be integrated, or display 1720 and content delivery device(s) 1740 may be integrated, for example. These examples are not meant to limit the present disclosure.

In various embodiments, system 1700 may be implemented as a wireless system, a wired system, or a combination of both. When implemented as a wireless system, system 1700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 17.

Figure 18:
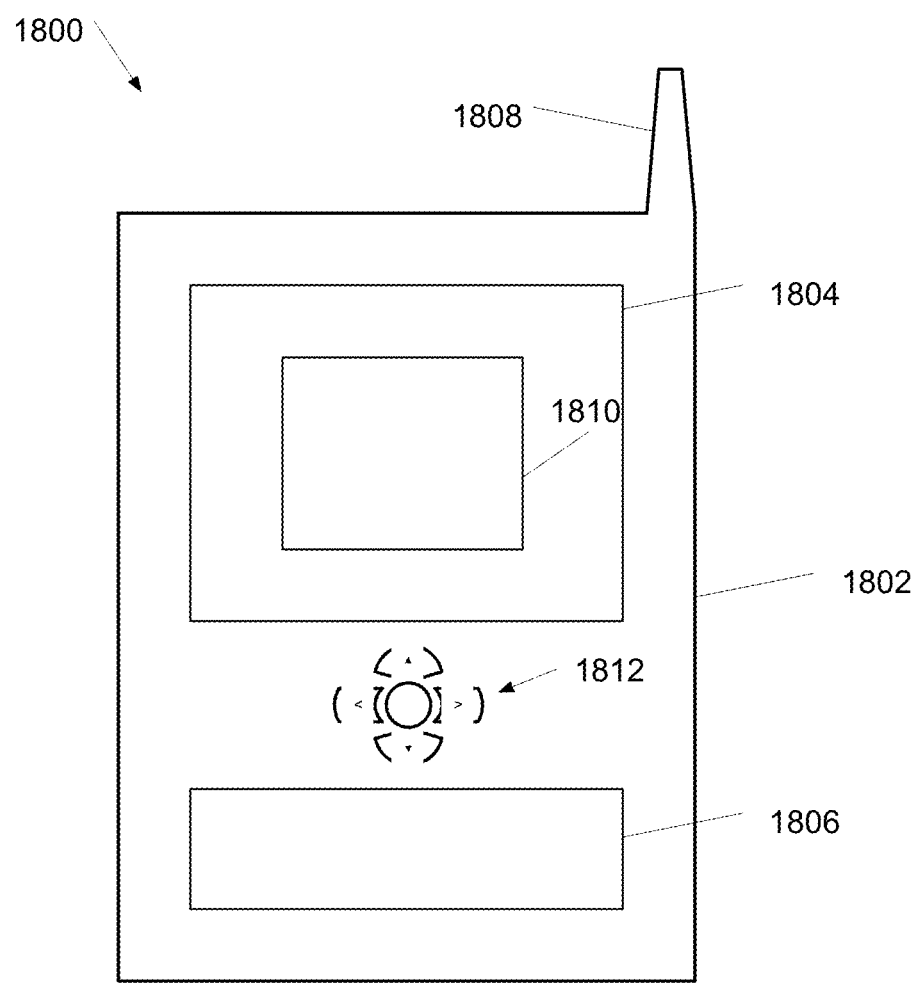
FIG. 18 illustrates an example device.

As described above, system 1700 may be embodied in varying physical styles or form factors. FIG. 18 illustrates implementations of a small form factor device 1800 in which system 1800 may be embodied. In various embodiments, for example, device 1800 may be implemented as a mobile computing device a having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 18, device 1800 may include a housing 1802, a display 1804, an input/output (I/O) device 1806, and an antenna 1808. Device 1800 also may include navigation features 1812. Display 1804 may include any suitable display unit for displaying information appropriate for a mobile computing device. I/O device 1806 may include any suitable I/O device for entering information into a mobile computing device. Examples for I/O device 1806 may include an alphanumeric keyboard, a numeric keypad, a touch pad, input keys, buttons, switches, rocker switches, microphones, speakers, voice recognition device and software, and so forth. Information also may be entered into device 1800 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

As discussed, systems, apparatus, articles, and methods are described herein related to content adaptive entropy coding for video systems. In some examples, systems, apparatus, articles, and methods are described herein related to content adaptive entropy coding for coded/not coded video data (e.g., data indicating whether blocks or partitions or the like include non-zero transform coefficients) for video systems.

In some examples, a selected entropy coding technique may be determined for coded/not-coded video data from a plurality of entropy coding techniques. For example, the plurality of entropy coding techniques may include a proxy variable length coding technique and a symbol-run coding technique, the plurality of entropy coding techniques may include two or more proxy variable length coding techniques implementing different variable length codes for different sequences (e.g., via proxy variable length coding tables), or the plurality of entropy coding techniques may include two or more symbol-run coding techniques implementing different codes (e.g., via symbol-run coding tables), or the like.

In some examples, the selected entropy coding technique may be based on evaluations of various processed bitstreams associated with the coded/not-coded video data. For example, the processed bitstream(s) may include a pass-through bitstream (e.g., a bitstream that is the coded/not-coded video data), a reversed bitstream (e.g., a reversal of the coded/not-coded video data), an inverted bitstream (e.g., a bit inversion of the coded/not-coded video data), or a differential bitstream (e.g., a bit difference of the coded/not-coded video data). The various processed bitstreams may be evaluated based on various entropy coding techniques (e.g., proxy variable length coding technique(s) and symbol-run coding technique(s) as discussed) to determine a processed bitstream and entropy coding technique having a minimum bit cost (e.g., the fewest bits of the evaluated processed bitstreams and entropy coding techniques). The processed bitstream may be entropy encoded to generate an encoded coded/not-coded video data bitstream and the encoded coded/not-coded video data bitstream may be assembled to generate an output bitstream. In some examples, the output bitstream may also include a coded/not-coded video data header indicating the selected entropy coding technique and the type of the processed bitstream (e.g., pass-through, reversed, inverted, differential, or the like).

As discussed herein, encoder module 404 may include symbol-run VLC and/or proxy VLC encoder for coded/not-coded data 641 (please refer to FIG. 6). Encoder module 404 may receive video data 414, which may include coded/not-coded symbol bits as is discussed further herein, via symbol-run VLC and/or proxy VLC encoder for coded/not-coded data 641. Symbol-run VLC and/or proxy VLC encoder for coded/not-coded data 641 may determine an entropy encoding technique for video data 414 based on a parameter, parameters or characteristics of video data 414 or other system parameters. In some examples, the entropy encoding technique for video data 414 may be one of an adaptive symbol-run variable length coding technique or an adaptive proxy variable length coding technique, or multiple adaptive symbol-run variable length coding techniques or multiple adaptive proxy variable length coding technique, or combinations thereof as described herein. The determined entropy encoding technique may be applied to video data 414 to generate compressed video data 424. As is discussed further herein, encoder module 404 may determine which technique provides the greatest compression efficiency that the parameter(s) associated with video data 414 may be the number of bits needed for each coding technique or the like. In some examples, the parameter associated with video data 314 may be based on a characteristic of the video data such that the determined encoding technique may be adaptive to the received video data.

As discussed, next generation video coding may use 3 picture types, I-, P-, and F-pictures. For example, I- and P-pictures, while they may have differences in details of prediction and coding, may be functionally similar. For example, inter-partitions (e.g., as referred herein to inter-blocks) of P- or F-pictures, after transform and quantization (please refer to FIG. 1), may result in either any non-zero quantized transform coefficients that may need to be sent to decoder or all zero quantized transform coefficients (e.g., no non-zero quantized transform coefficients). If a block (e.g., partition) has any non-zero transform coefficients, the block may be classified as coded. If a block (e.g., partition) has no non-zero transform coefficients, the block may be classified as not-coded. This coded/not-coded (e.g., CNC) data may be communicated to a decoder via output bitstream 111 or the like. In some implementations, the coded/not-coded data may be substantial due to the use of variable block size partitioning that may result in lots of small blocks, particularly at higher bitrates.

Figure 19:
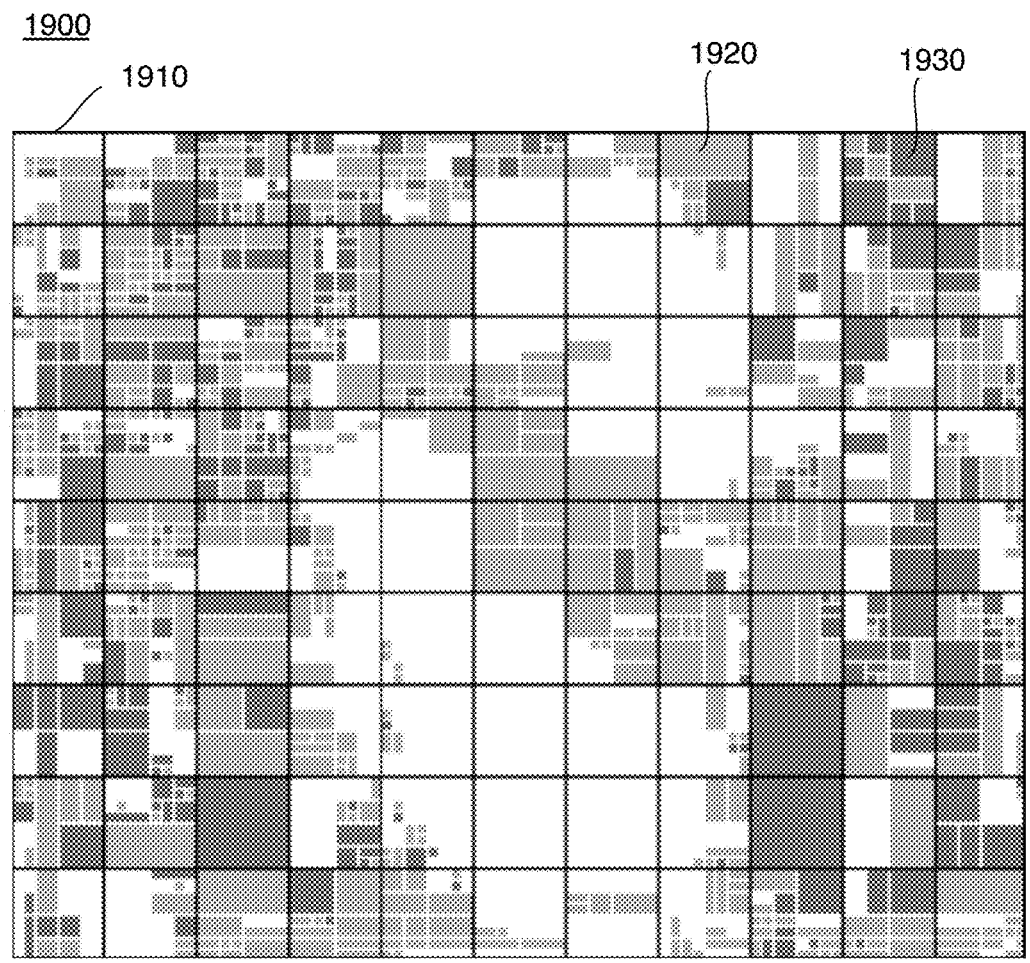
FIG. 19 is an illustrative diagram of an example picture of coded/not-coded inter-blocks.

FIG. 19 is an illustrative diagram of an example picture 1900 of coded/not-coded inter-blocks, arranged in accordance with at least some implementations of the present disclosure. As shown in FIG. 19, picture 1900 may include tiles 1910, which may include one or more blocks, partitions, sub-partitions, or the like, as discussed herein. In the discussion herein, the term block may be used for the sake of clarity; however, it is to be understood the term block may be representative of a prediction partition or sub-partition or the like, which may be substantially any size or shape. For example, picture 1900 may be a P-picture having a tile size of 32×32 for coding using a quantizer value (e.g., quantization parameter, Qp) of 8. For example, a quantizer value may determine a step size in the quantization of transform coefficients (e.g., by adaptive quantize module 109, please see FIG. 1). In FIG. 19, coded inter-blocks 1920 are illustrated in light gray and not-coded inter-blocks 1930 are illustrated in dark gray. Blocks which are illustrated in white may be other types of blocks (e.g., intra, skip, or auto blocks) such that inter-prediction does not apply to such blocks. The prediction of such blocks may not be relevant to the present discussion.

As shown in FIG. 19, for smaller quantizer values (e.g., Qp=8), the partitioning for coding may result in a significant number of coded inter-blocks 1920 and not-coded inter-blocks 1930. For example, there may be a significant density of coded/not-coded inter-blocks. In some examples, each block (e.g. of coded/not-coded blocks 1920, 1930) may be assigned one bit. In such examples, the coded/not coded (e.g., CNC) data may result in a substantial bitstream of data.

Figure 20:
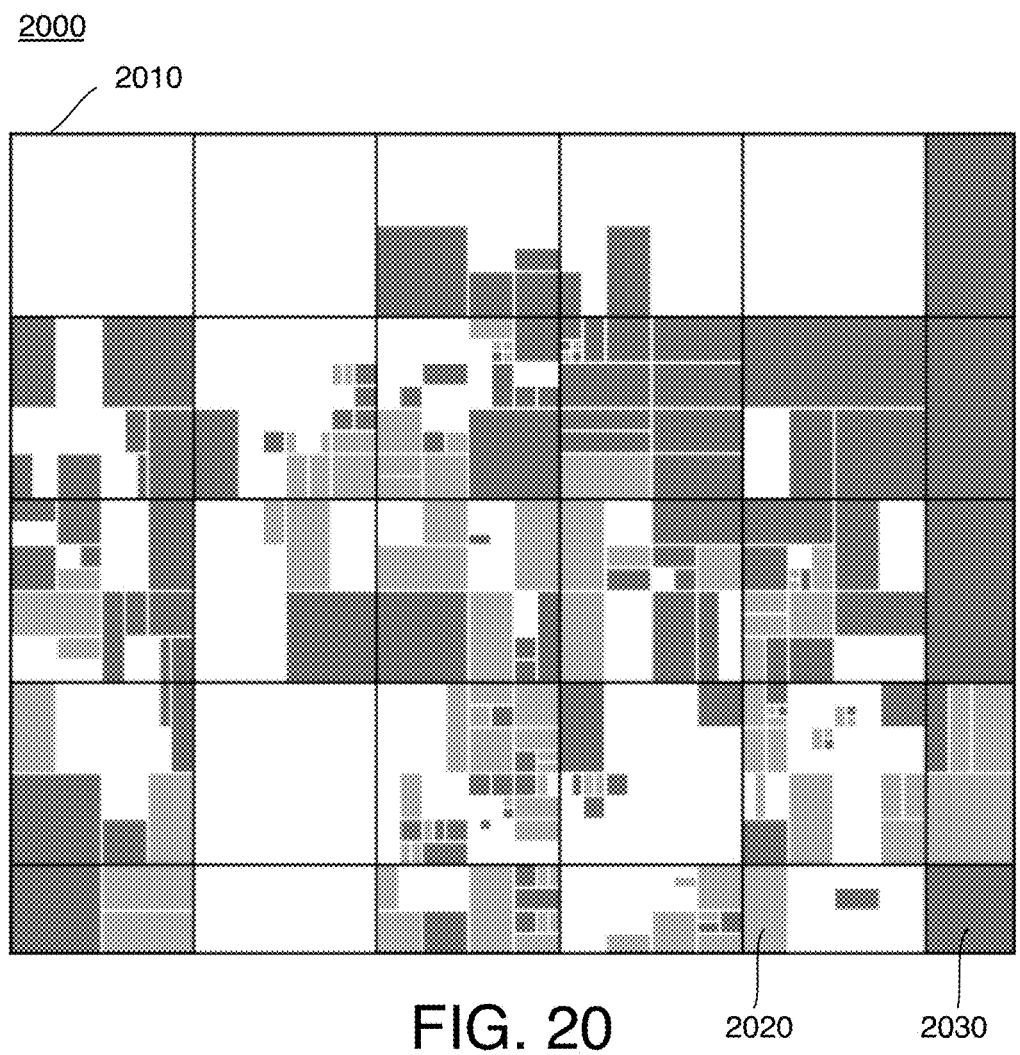
FIG. 20 is an illustrative diagram of example coded/not-coded inter-blocks.

FIG. 20 is an illustrative diagram of an example picture 2000 of coded/not-coded inter-blocks, arranged in accordance with at least some implementations of the present disclosure. As shown in FIG. 20, picture 2000 may include tiles 2010, which may include one or more blocks, partitions, prediction partitions, sub-partitions, or the like, as discussed herein. For example, picture 2000 may be an F-picture having a tile size of 64×64 for coding using a quantizer value of 32. In FIG. 20, coded inter-blocks 2020 are illustrated in light gray and not-coded inter-blocks 2030 are illustrated in dark gray. As discussed with respect to FIG. 19, blocks illustrated in white may be other types of blocks (e.g., intra, skip, or auto blocks) such that inter-prediction does not apply to such blocks and they may not be relevant to the present discussion.

As shown in FIG. 20, for larger quantizer values (e.g., Qp=32), the partitioning for coding may result in a smaller number of coded inter-blocks 2020 and not-coded inter-blocks 2030. For example, there may be a lesser density of coded/not-coded inter-blocks as compared with the example of FIG. 19. Further, in general, F-pictures may have a lesser density of coded/not-coded inter-blocks as compared with P-pictures. Further still, less complicated scenes or video sequences may have lesser density of coded/not-coded inter-blocks as compared with more complicated or more movement oriented video sequences. Also as discussed with respect to FIG. 19, in some examples, each block (e.g. of coded/not-coded blocks 2020, 2030) may be assigned one bit.

In some examples, entropy coding techniques discussed herein may used to encode the coded/not-coded data. In some examples, an adaptive symbol-run variable coding technique may be used. In some examples, an adaptive proxy variable length coding technique may be used. Such techniques have been described herein and will not be repeated for the sake of brevity. In some implementations, various techniques discussed with respect to adaptive symbol-run variable coding and/or adaptive proxy variable length coding as discussed elsewhere herein may be used with respect to encoder module 404, sub-modules, and the various methods and modes discussed herein.

As is discussed further below, the described entropy coding techniques (e.g., adaptive symbol-run variable coding and adaptive proxy variable length coding) may each be modified based on the codes, symbols, or the like used in the entropy coding implementation. Such implementations will be described further herein with respect to symbol run variable length coding tables and proxy variable length coding tables such as Tables 3-12 below.

Further, a selected entropy coding technique may operate on a processed bitstream associated with the coded/not-coded video data. For example, a frame of video data may have a block (or partition) structure. Referring to FIG. 19, picture 1910 may have a block structure as shown via coded/not-coded blocks 1920, 1930. For example, the block structure may include the partitioning of picture 1910 into blocks (or partitions). In some examples, the block structure may be substantially complicated and may be adaptive to a variety of characteristics and/or parameters of picture 1910, adjacent pictures (or frames), coding settings, or the like. In some examples, a block structure associated with a video frame may be read (e.g., by adaptive entropy encoder 110 or a module therein). The block structure may be associated with the coded/not-coded video data such that the bits of the coded/not-coded video data indicate a 1 for blocks of the block structure that are coded (e.g., have non-zero transform coefficients) and a 0 for blocks of the block structure that are not-coded (e.g., have no non-zero transform coefficients).

The coded/not-coded video data may subsequently be processed. For example, for P-pictures, a 1-dimensional raster scan may be generated based on the coded/not-coded video data and a 1-dimensional block-based scan may be generated based on the coded/not-coded video data. In some examples, the 1-dimensional raster scan and the 1-dimensional block-based scan may be considered processed bitstreams associated with the coded/not-coded video data. Further, the 1-dimensional raster scan or the 1-dimensional block-based scan or both may be further processed by performing bit inversions, reversals, bit differentials, or the like. Such further processed bitstreams may also be considered processed bitstreams as described herein.

A processed bitstream associated with the coded/not-coded video data may be entropy encoded using a selected entropy coding technique (e.g., including selected codes, symbols, or the like as described herein using tables). For example, the selected entropy coding technique may be chosen based on evaluating multiple entropy coding techniques with respect to multiple processed bitstreams to determine the selected entropy coding technique and the relevant (e.g., selected) processed bitstream.

Figure 21:
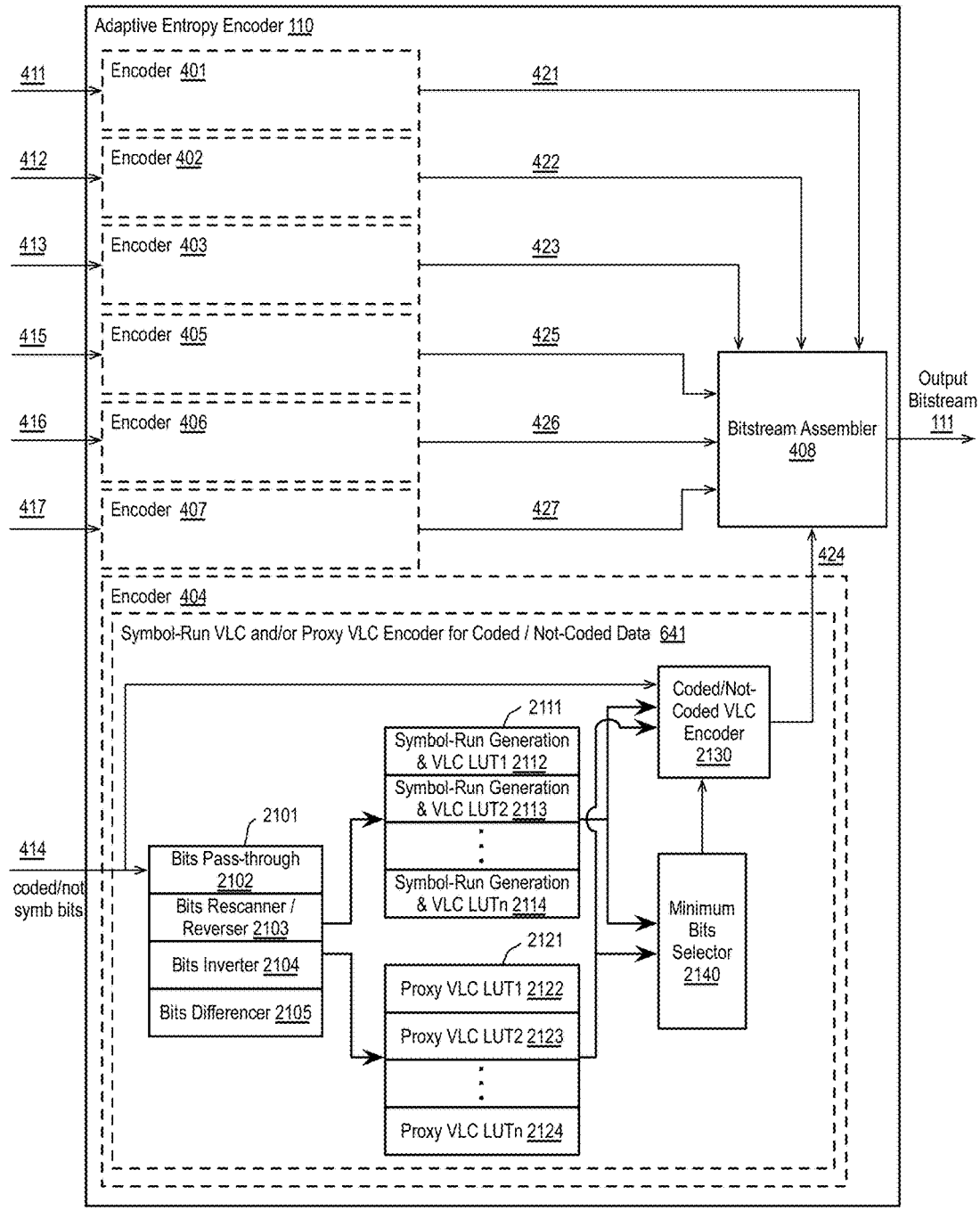
FIG. 21 is an illustrative diagram of an example coded/not-coded data encoder module.

FIG. 21 is an illustrative diagram of an example coded/not-coded data encoder module 404, arranged in accordance with at least some implementations of the present disclosure. As shown, coded/not-coded data encoder module 404, which may be described as encoder module 404 herein for the sake of brevity, may include symbol-run VLC and/or proxy VLC encoder for coded/not-coded data 641, as discussed with respect to FIG. 6. In some examples, coded/not-coded data encoder module 404 may not include symbol-run VLC and/or proxy VLC encoder for coded/not-coded data 641. The other modules (e.g., encoder modules 401-403 and 405-407) of adaptive entropy encoder 110 may be implemented as described elsewhere herein and will not be described further with respect to FIG. 21. In some examples, coded/not-coded data encoder module 404 may provide efficiency by incorporating a number of adaptive techniques. Further, coded/not-coded data encoder module 404 may allow coding efficiency while providing substantially low complexity.

Also as illustrated in FIG. 21, coded/not-coded data encoder module 404 may include a coded/not-coded data processing module 2101, a symbol-run generation and variable length coding (VLC) lookup table (LUT) module 2111, a proxy variable length coding (VLC) lookup table (LUT) module 2120, a coded/not-coded variable length coding (VLC) encoder module 2130, and a minimum bits selector 2140. As shown, symbol-run generation and VLC LUT module 2111 may include multiple symbol-run generation and VLC LUT modules 2112, 2113, 2114. Symbol-run generation and VLC LUT module 2111 may include any number of modules such as modules corresponding to the symbol-run VLC tables discussed herein or the like. Further, proxy VLC LUT module 2121 may include multiple proxy VLC LUT modules 2122, 2123, 2124. Proxy VLC LUT module 2111 may include any number of modules such as modules corresponding to the proxy VLC tables discussed herein or the like.

Also as shown, coded/not-coded data processing module 2101 may include a bits pass-through module 2102, a bits rescanner/reverser module 2103, a bits inverter module 2104, and a bits differencer module 2105. For example, coded/not-coded data processing module 2101 and coded/not-coded VLC encoder module 2130 may receive video data 414. Video data 414 may include any suitable coded/not-coded video data (e.g., including coded/not symb bits as shown). In some examples, video data 414 may include coded/not-coded video data associated with a block structure of a video frame or picture. In some examples, video data 414 may include a representation of a 2-dimensional description of various size blocks (or partitions) that may be coded/not-coded (e.g., 1 may indicate coded and 0 may indicate not-coded).

Video data 414 may be received and processed by coded/not-coded data processing module 2101. For example, coded/not-coded data processing module 2101 may process 414 via one or more of modules 2102, 2103, 2104, 2105. In some examples, coded/not-coded data processing module 2101 may process video data 414 via all of modules 2102, 2103, 2104, 2105 in parallel. As discussed, coded/not-coded data processing module 2101 may include bits pass-through module 2102, bits rescanner/reverser module 2103, bits inverter module 2104, and/or a bits differencer module 2105.

In some examples, bits pass-through module 2102 may pass-through one or more bitstreams associated with coded/not-coded video data of video data 414. For example, the coded/not-coded data may be processed or scanned to produce one or more scans associated with the coded/not-coded video data. For example, the coded/not-coded video data may be processed to generate a 1-dimensional raster scan, a 1-dimensional block-based scan, a 1-dimensional tile-based scan, or the like.

In some examples, generating a 1-dimensional raster scan may include a frame or picture based scan that processes from the top-left of the frame to the bottom-right of the frame and generates a 1 bit for each coded block and a 0 bit for each not-coded block (or vice versa). For example, the scan may follow a pattern from top-left to bottom-right by moving horizontally from left to right at a top row and then dropping down one row and repeating the left to right scans vertically down the picture. In such a coding, the size and/or shape of the block may be ignored such that each size and shape of block may be given a 1 or 0 as described. Further, as scanning progresses, blocks may be processed when the block's top-left corner is scanned and, if the block's edge is scanned in subsequent horizontal scans, the block may be skipped as previously scanned. Other portions of the described codec may indicate the size, shape, and location of each block (e.g., via partitioning and the like) such that that information may not be needed in the coded/not-coded data scan. In some examples, generating a 1-dimensional tile-based scan may include performing a scan (e.g. a scan from top-left to bottom-right as discussed) within a top-left tile and then moving to the next tile and repeating the scan within each tile. In such examples, the ordering of the tiles may also follow a pattern from top-left to bottom-right of the frame or picture by moving horizontally from left to right and then dropping down one row and repeating the left to right scans progressing vertically down the picture until the picture is complete. In some examples, generating a 1-dimensional block-based scan may include performing a scan (again from top-left to bottom-right as discussed) within a block (not corresponding to the blocks being coded), such that the blocks are portions of a tile. For example, a tile may be divided in half vertically and then each half may be quartered horizontally to define 8 8×16 blocks that may each be scanned. In order, the scan may be performed from top-left to bottom-right within a block, then within a tile, and then within a picture. In some examples, prior to the dividing steps described, a tile may be flipped vertically about a vertical centerline prior to dividing vertically into halves and quartering each half horizontally. As will be appreciated, other block sizes and/or divisions of tiles may be used.

Bits pass-through module 2102 may pass-through the generated or processed bitstream, for example, without further processing. In some examples, the generated or processed bitstream may be generated by coded/not-coded data processing module 2101 or another module of coded/not-coded data encoder module 404.

In some examples, bits rescanner/reverser module 2103 may reverse the order of the scan or bitstream to generate a reversed scan such as, for example, 1-dimensional reversed raster scan, a 1-dimensional reversed block-based scan, a 1-dimensional reversed tile-based scan, or the like. Further, in some examples, bits inverter module 2104 may invert the bits (e.g., bit invert) of the scan or bitstream (e.g., change 0s to 1s and vice versa) to generate an inverted bits scan such as, for example, a 1-dimensional inverted bits raster scan, a 1-dimensional inverted bits block-based scan, a 1-dimensional inverted bits tile-based scan, or the like. Further, in some examples, bits differencer module 2105 may difference the bits (e.g., bit difference) of the scan or bitstream (e.g., take a difference along sequential bits) to generate a differential bits scan such as, for example, a 1-dimensional differential bits raster scan, a 1-dimensional differential bits block-based scan, a 1-dimensional differential bits tile-based scan, or the like. Further, in some examples, bitstreams or scans may be passed between modules 2102, 2103, 2104, 2105. For example, an inverted scan generated by bits inverter module 2104 may be operated on by bits differencer module 2105 to generate an inverted differential scan such as, for example, a 1-dimensional inverted differential bits raster scan, a 1-dimensional inverted differential bits block-based scan, a 1-dimensional inverted differential bits tile-based scan, or the like.

As shown in FIG. 21, one or more or all of the generated processed bitstreams as discussed may be transmitted to one or both of symbol-run generation and VLC LUT module 2111 and/or proxy VLC LUT module 2121. In some examples, the same processed bitstreams may be transmitted to both-run generation and VLC LUT module 2111 and/or proxy VLC LUT module 2121. In some examples, different processed bitstreams may be transmitted to symbol-run generation and VLC LUT module 2111 and/or proxy VLC LUT module 2121.

For example, the processed bitstream(s) received by symbol-run generation and VLC LUT module 2111 may be processed to determine bit cost(s) associated with coding the processed bitstream(s) using symbol-run coding with one or more symbol/code combinations. For example, a bit cost may be determined for a processed bitstream using a first and second or a first, second, and third (or the like) symbol-run coding LUT. For example, symbol-run generation and VLC LUT module 2111 may allow for the counting of the bit cost(s) of events (e.g., symbol-run combination(s)).

Similarly the processed bitstream(s) received by proxy VLC LUT module 2121 may be processed to determine bit cost(s) associated with coding the processed bitstream(s) using symbol-run coding with one or more symbol/code combinations. For example, a bit cost may be determined for a processed bitstream using one, a first and second, or a first, second, and third (or the like) proxy VLC LUT. For example, proxy VLC LUT module 2121 may allow for the counting of bits by trying any number of different proxy VLC codes that may replace groups of bits/patterns with shorter codes.

The processing by symbol-run generation and VLC LUT module 2111 and/or proxy VLC LUT module 2121 may be performed via a bit counting by look up or the like (e.g., actual encoding and bit counting may not be required). Such processing may substantially reduce the complexity of encoder module 404, for example.

A wide range of bit costs may thereby be determined based on combinations of processed bitstream(s), encoding technique (e.g., symbol-run or proxy VLC), and encoding technique implementation (e.g., look up table for the pertinent encoding technique). As will be further discussed with respect to FIGS. 23 and 24, example bit costs are provided for P-pictures and F-pictures, respectively, herein. However, such example implementations are not meant to be limiting.

As shown in FIG. 21, the determined bit costs may be transmitted to minimum bits selector 2140 and/or coded/not-coded VLC encoder module 2130. Minimum bits selector 2140 may determine the minimum bit cost based on the received bit cost to determine the selected entropy coding technique and the selected processed bitstream. Minimum bits selector 2140 may transmit the selected entropy coding technique and the selected processed bitstream to coded/not-coded VLC encoder module 2130. For example, minimum bits selector 2140 may determine a best solution (e.g., fewest number of bits) for representing the coded/not-coded data for a current frame. For example, the output of minimum bits selector 2140 may be an index to the entropy coding technique and table that produces the highest compression.

Coded/not-coded VLC encoder module 2130 may generate the selected processed bitstream associated with the coded/not-coded video data, as discussed, and entropy encode the processed bitstream using the selected entropy coding technique to generate an encoded coded/not-coded video data bitstream, which may be a part of or implemented as compressed video data 324. For example, coded/not-coded VLC encoder module 2130 may use the index provided via minimum bits selector 2140 to access the selected entropy coding technique and table to generate a compressed representation of the coded/not-coded video data as, for example compressed video data 424. As discussed herein, compressed video data 424 may be transmitted to bitstream assembler 408, which may assemble compressed video data and other compressed video data (e.g., compressed video data 401-403 and 405-407) to generate output bitstream 111.

Due to the dependence (e.g., statistical dependence) of coded/not coded data on the quantizer (as discussed above) used for transform coding (e.g., a larger quantizer may provide more 'not coded' blocks while a smaller quantizer may provide more 'coded' blocks) and on frame type, P-pictures may have more 'coded' blocks with respect to F-pictures, which may have more 'not coded' blocks. In such examples, it may be advantageous to evaluate symbol-run VLC coding techniques with many tables and to evaluate proxy VLC techniques with many tables on an original stream (e.g., an original scan such as a 1-dimensional raster scan, a 1-dimensional block-based scan, or a 1-dimensional tile-based scan) and further processed stream(s) to determine a solution that is most efficient in compression (e.g., a minimum bit cost).

The use of a substantial number of tables may not substantially increase the complexity of coded/not-coded data encoder module 404 since, as discussed, actual encoding of the processed bitstream(s) by many methods may not be needed. Instead, only bit counting by look up may be required to estimate the bit cost for a processed bitstream and entropy coding technique combination.

FIG. 22 is a flow diagram illustrating an example process 2200, arranged in accordance with at least some implementations of the present disclosure. Process 2200 may include one or more operations, functions or actions as illustrated by one or more of operations 2202, 2204, and/or 2206. Process 2200 may form at least part of a next generation video coding process. By way of non-limiting example, process 2200 may form at least part of a next generation video encoding process as undertaken by encoder system 100 of FIG. 1 and/or entropy encoder module 110 as discussed herein.

In some examples, process 2200 may include reading a block structure associated with a frame of video data as discussed with respect to FIGS. 19 and 20. The block structure may be associated with coded/not-coded video data as discussed such that the coded/not-coded video data has a bit associated with each block of the block structure indicting whether the block is coded (e.g., is associated with a bit of 1) or not-coded (e.g., is associated with a bit of 0).

Process 2200 may begin (or continue from reading the block structure and associating the block structure with coded/not-coded data) at operation 2202, "Determine a Selected Entropy Coding Technique for Coded/Not-Coded Video Data", where a selected entropy coding technique may be determined for coded/not-coded video data from multiple entropy coding techniques as discussed herein. For example the entropy coding techniques may include a proxy variable length coding technique and a symbol-run coding technique, a single proxy variable length coding technique and multiple symbol-run coding techniques (e.g., implemented via different tables), multiple proxy variable length coding techniques (e.g., implemented via different tables) and a single symbol-run coding technique, multiple proxy variable length coding techniques, or multiple symbol-run coding techniques, or the like. The selected entropy coding technique may be determined based on estimating bit costs for the multiple entropy coding techniques and with various processed bitstreams (e.g., a pass-through of the coded/not-coded video data, a reverse of the coded/not-coded video data, a bit inversion of the coded/not-coded video data, a bit difference of the coded/not-coded video data, 1-dimensional scans, bit inversions, bit differences, bits reversals, or the like), as discussed herein, and selecting the entropy coding technique and processed bitstream having the lowest bit cost. For example, the selected entropy coding technique may be determined via coded/not-coded data encoder module 304.

Process 2200 may continue at operation 2204, "Entropy Encode a Processed Bitstream Associated with the Coded/Not-Coded Video Data Using the Selected Entropy Coding Technique", where a processed bitstream associated with the coded/not-coded video data may be entropy encoded using the selected entropy coding technique to generate an encoded coded/not-coded video data bitstream. For example, the processed bitstream may be a selected bitstream such that the selected bitstream and selected entropy coding technique provided the lowest bit cost. For example, the processed bitstream may be entropy encoded via coded/not-coded VLC encoder module 2130.

Process 2200 may continue at operation 2206, "Assemble the Encoded Coded/Not-Coded Video into an Output Bitstream", where the encoded coded/not-coded video data may be assembled into an output bitstream. For example, bitstream assembler 308 may assemble the encoded coded/not-coded video data (e.g., compressed video data 424) and other compressed video data (e.g., compressed video data 421-423 and 425-427) into output bitstream 111. As discussed, in some examples, a coded/not-coded video data header associated with the selected entropy coding technique and/or the selected processed bitstream may be assembled into the output bitstream. For example, compressed video data 424 may include the coded/not-coded video data header, which may be assembled as discussed into output bitstream 111.

As discussed, in some examples, output bitstream 111 may be transmitted via encoder system 100 as implemented via video coding system 1100 or the like to one or more video decoders.

FIG. 23 is a flow diagram illustrating an example process 2300, arranged in accordance with at least some implementations of the present disclosure. Process 2300 may include one or more operations, functions or actions as illustrated by one or more of operations 2302, 2304, 2306, and/or 230. Process 2300 may form at least part of a next generation video coding process. By way of non-limiting example, process 2300 may form at least part of a next generation video encoding process as undertaken by decoder system 200 of FIG. 2 and/or entropy decoder module 202 as discussed herein.

Process 2300 may begin at operation 2302, "Receive an Entropy Encoded Bitstream", where an entropy encoded bitstream may be received. For example, output bitstream 111, input bitstream 201, or bitstream 800 or the like may be received via video decoder 200 as implemented via video coding system 1100 or the like.

Process 2300 may continue at operation 2304, "Disassemble the Entropy Encoded Bitstream to Determine a Coded/Not-Coded Video Data Header and an Encoded Coded/Not-Coded Video Data Bitstream", where the entropy encoded bitstream may be disassembled to determine a coded/not-coded video data header and encoded coded/not-coded video data. For example, the entropy encoded bitstream may be disassembled via bitstream disassembler 408.

Process 2300 may continue at operation 2306, "Determine a Selected Entropy Coding Technique Based on the Coded/Not-Coded Video Data Header", where a selected entropy coding technique may be determined for the encoded coded/not-coded video data from multiple entropy coding techniques based at least in part on the coded/not-coded video data header. For example, the coded/not-coded video data header may include a code indicating a selected entropy coding technique (and/or selected table for the entropy coding technique) for the encoded coded/not-coded video data and a format or type of the bitstream of the encoded coded/not-coded video data. For example, the selected entropy coding technique may include any technique as discussed herein (e.g., symbol-run coding technique(s) as implemented via various tables and/or proxy variable length coding technique(s) as implemented via various tables) and the bitstream may include any bitstream type or processing as discussed herein (e.g., 1-dimensional scans, bit inversions, bit differences, bits reversals, or the like) encoded or compressed via the selected entropy coding technique.

Process 2300 may continue at operation 2308, "Entropy Decode the Encoded Coded/Not-Coded Video Data Bitstream Using the Selected Entropy Coding Technique to Determine Coded/Not-Coded Video Data", where the encoded coded/not-coded video data may be entropy decoded using the selected entropy coding technique to determine coded/not-coded video data. For example, the encoded coded/not-coded video data may be decompressed to using the selected entropy coding technique to generate a processed bitstream. For example, the processed bitstream may include any processed bitstream (e.g., 1-dimensional scans, bit inversions, bit differences, bits reversals, or the like) as discussed herein. The processed bitstream may be decoded via the inverse of the operation used to generate the processed bitstream (e.g., by pass-through, bit inversion, bit reversal, or bit differential as discussed) to generate the coded/not-coded video data.

Process 2300 may continue at operation 2310, "Generate a Video Frame Based on the Coded/Not-Coded Video Data", where the coded/not-coded video data may be used to generate a video frame as discussed herein with respect to decoder system 200. Further, the generated video frame may be transmitted to a display device for presentment to a viewer or user.

As discussed, multiple combinations of entropy coding techniques and processed bitstreams may be evaluated to determine a minimum bit cost combination. In some examples, a subset of such combinations may be chosen for evaluation. For example, those combinations likely to produce minimum bit costs or efficient coding may be selected for evaluation. In some examples, the chosen combinations may be based on the frame type (e.g., F- or P-picture) of the video data.

Figure 24:
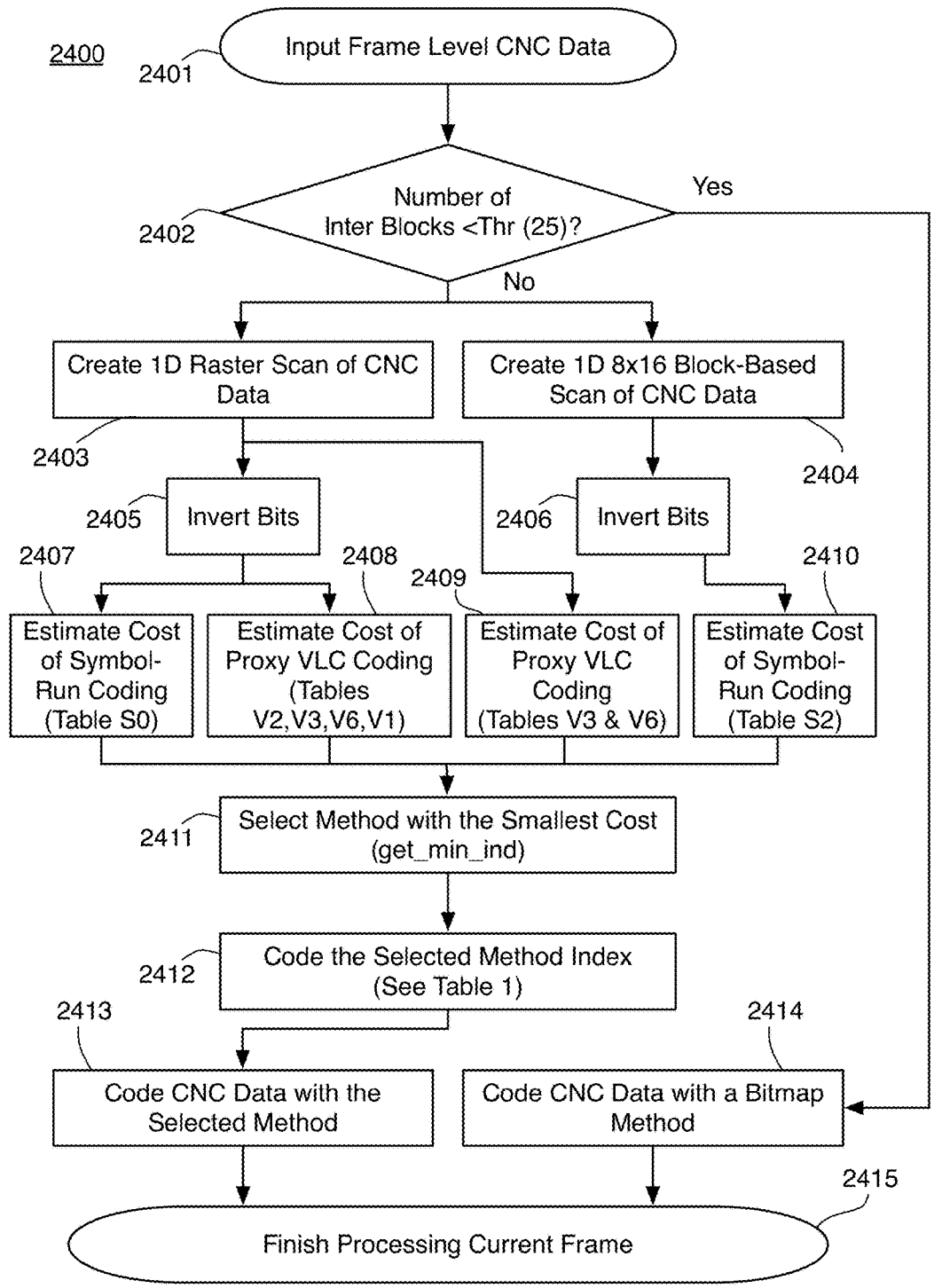
FIG. 24 is a flow diagram illustrating an example process.

FIG. 24 provides a flow diagram illustrating an example process 2400, arranged in accordance with at least some implementations of the present disclosure. Process A1900 may include one or more operations, functions or actions as illustrated by one or more of operations 2400-2415. Process 2400 may form at least part of a next generation video coding process. By way of non-limiting example, process 2400 may form at least part of a next generation video encoding process as undertaken by encoder system 100 of FIG. 1 and/or entropy encoder module 110 as discussed herein. In some examples, process 2400 may be applied to P-pictures.

Process 2400 may begin at operation 2401 "Input Frame Level CNC Data", where frame-level tile/block structure and coded/not-coded video data (e.g., binary information; CNC data) for inter mode blocks may be read. For example, a block structure associated with a frame of video data may be read. Process 2400 may continue at operation 2402 "Number of Inter Blocks <Thr (25)?", where, if the number of inter blocks in the frame is less than a threshold value (e.g., 25 in the example), then the CNC data may be coded with a bitmap method (e.g., bit by bit) as shown at operation 2414 "Code CNC Data with a Bitmap Method" and process 2400 may terminate as shown at operation 2415 "Finish Processing Current Frame". In some examples, operation 2402 may check for a simple case such that determining a compression technique may not be advantageous and the frame may be processed with bitmap coding. If the number of inter blocks in the frame is greater than (or equal to) the threshold, process 2400 may continue at operations 2403 and 2404.

At operation 2403 "Create 1D Raster Scan of CNC Data", a 1-dimensional raster scan of the coded/not-coded data may be generated. At operation 2404 "Create 1D 8×16 Block-Based Scan of CNC Data", a 1-dimensional block based scan of the coded/not-coded data may be generated. For example, the 1-dimensional raster scan may include a normal raster scan of blocks (e.g., frame-wise) and the 1-dimensional block based scan may include a 8×16 block-based scan (e.g., a scan of blocks in raster order within the 8×16 areas while processing 8×16 areas in raster order) or an equivalent 2×4 scale scan.

Process 2400 may continue at operations 2405 "Invert Bits" and 2406 "Invert Bits", where the respective scans may be bit inverted. For example, at operation 2405, the 1-dimensional raster scan may be bit inverted to generate an inverted bits 1-dimensional raster scan. At operation 2406, the 1-dimensional block-based scan may be bit inverted to generate an inverted bits 1-dimensional block-based scan. As discussed herein, operations 2403-2406 may generated processed bitstreams.

Process 2400 may continue at operations 2407 "Estimate Cost of Symbol-Run Coding (Table S0)", 2408 "Estimate Cost of Proxy VLC Coding (Tables V2,V3,V6,V1)", 2409 "Estimate Cost of Proxy VLC Coding (Tables V3 & V6)", and 2410 "Estimate Cost of Symbol-Run Coding (Table S2)", where the bit costs of the illustrated processed bitstream and entropy coding technique combinations may be estimated. As discussed, in some examples, the bit costs estimations may be determined based on a table look up or the like (e.g., and not based on an actual encoding and bit counting of the processed bitstreams). For example, at operation 2407, a first bit cost associated with a symbol run coding technique (e.g., using Table S0) of the inverted bits 1-dimensional raster scan may be estimated. For example, at operation 2408, a second, a third, a fourth, and a fifth bit cost associated with multiple proxy variable length coding techniques (e.g., one each using Tables V2, V3, V6, and V1) of the inverted bits 1-dimensional raster scan may be estimated. For example, at operation 2409, a sixth and a seventh bit cost associated with a proxy variable length coding techniques (e.g., one each using Tables V3 and V6) of the 1-dimensional raster scan may be estimated. For example, at operation 2410, an eighth bit cost associated with a proxy variable length coding technique (e.g., using Table S2) of the 1-dimensional raster scan may be estimated.

Operations 2407-2410 may provide advantageous coding techniques (including coding table) and processed bitstream combinations for P-pictures. In some examples, some of the provided combinations may be eliminated. In some examples, other available combinations may be added. For example, a difference bits operation may be added to process 2400 to provide additional processed bitstreams for bit cost estimation(s).

Process 2400 may continue at operation 2411 "Select Method with the Smallest Cost ($get_{13}$ $min_{13}$ ind)", where a minimum (e.g., smallest) bit cost based on the first through eighth bit costs may be determined (e.g., as illustrated via action "$get_{13}$ $min_{13}$ ind"). For example, the estimated bits for all methods may be compared to determine the one with the smallest cost. Process 2400 may continue at operation 2412 "Code the Selected Method Index (See Table 1)", where a header code associated with the selected entropy coding technique (and table if applicable) may be encoded. For example, Table 1 as follows illustrated example header codes:

TABLE 1

Symbol-run/Proxy VLC methods in P-frames

| # | Method/Entropy Coding Technique and Processed Bitstream | Header Code | Code Length |
|---|---|---|---|
| 0 | Symbol-run on inverted bits with table S0 on raster-scan ordered blocks | 100 | 3 |
| 1 | Symbol-run on inverted bits with table S2 on 2×4-scan ordered blocks | 1100 | 4 |
| 2 | Proxy VLC coder on inverted bits with table V2 on raster-scan ordered blocks | 00 | 2 |
| 3 | Proxy VLC coder on inverted bits with table V3 on raster-scan ordered blocks | 1101 | 4 |
| 4 | Proxy VLC coder on inverted bits with table V6 on raster-scan ordered blocks | 101 | 3 |
| 5 | Proxy VLC coder on inverted bits with table V1 on raster-scan ordered blocks | 1110 | 4 |
| 6 | Proxy VLC coder with table V3 on raster-scan ordered blocks | 1111 | 4 |
| 7 | Proxy VLC coder with table V6 on raster-scan ordered blocks | 01 | 2 |

Process 2400 may continue at operation 2413 "Code CNC Data with the Selected Method", where the processed bitstream associated with the coded/not-coded video data may be entropy encoded using the selected entropy coding technique to generate encoded coded/not-coded video data. Further, as discussed, the encoded coded/not-coded video data bitstream may be assembled into an output bitstream. For example, the selected method may be applied to the CNC data and the result may be written to bitstream. Process 2400 may terminate at operation 2415 "Finish Processing Current Frame". Process 2400 may be repeated as needed to encode any number of frames such as, for example, P-pictures or P-pictures.

Figure 25:
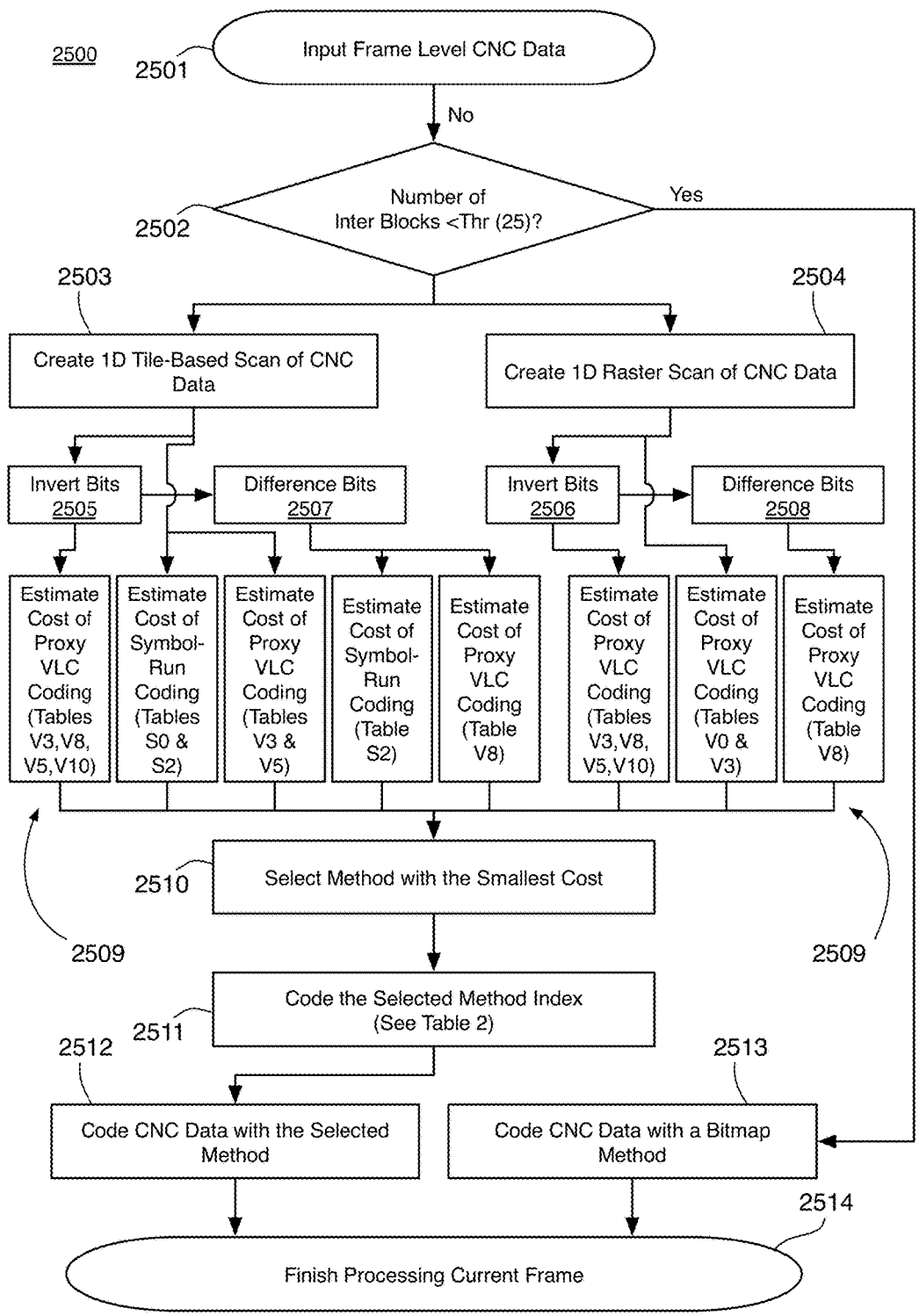
FIG. 25 is a flow diagram illustrating an example process.

FIG. 25 provides a flow diagram illustrating an example process 2500, arranged in accordance with at least some implementations of the present disclosure. Process A2000 may include one or more operations, functions or actions as illustrated by one or more of operations 2500-2514. Process 2500 may form at least part of a next generation video coding process. By way of non-limiting example, process 2500 may form at least part of a next generation video encoding process as undertaken by encoder system 100 of FIG. 1 and/or entropy encoder module 110 as discussed herein. In some examples, process 2500 may be applied to F-pictures.

Process 2500 may begin at operation 2501 "Input Frame Level CNC Data", where frame-level tile/block structure and coded/not-coded video data (e.g., binary information; CNC data) for inter mode blocks may be read. For example, a block structure associated with a frame of video data may be read. Process 2500 may continue at operation 2502 "Number of Inter Blocks <Thr (25)?", where, if the number of inter blocks in the frame is less than a threshold value (e.g., 25 in the example), then the CNC data may be coded with a bitmap method (e.g., bit by bit) as shown at operation 2513 "Code CNC Data with a Bitmap Method" and process 2500 may terminate as shown at operation 2514 "Finish Processing Current Frame". In some examples, operation 2502 may check for a simple case such that determining a compression technique may not be advantageous and the frame may be processed with bitmap coding. If the number of inter blocks in the frame is greater than (or equal to) the threshold, process 2500 may continue at operations 2503 and 2504.

At operation 2503 "Create 1D Tile-Based of CNC Data", a 1-dimensional tile-based scan of the coded/not-coded data may be generated. At operation 2504 "Create 1D Raster Scan of CNC Data", a 1-dimensional raster scan of the coded/not-coded data may be generated. For example, the 1-dimensional raster scan may include a normal raster scan of blocks (e.g., frame-wise) and the 1-dimensional tile-based scan may include a scan of blocks in raster order within the tile areas while processing tiles in raster order).

Process 2500 may continue at operations 2505 "Invert Bits" and 2506 "Invert Bits", where the respective scans may be bit inverted. For example, at operation 2505, the 1-dimensional tile-based scan may be bit inverted to generate an inverted bits 1-dimensional tile-based scan. At operation 2506, the 1-dimensional raster scan may be bit inverted to generate an inverted bits 1-dimensional raster scan. Process 2500 may continue at operations 2507 "Difference Bits" and 2508 "Difference Bits", where the respective scans may be bit differenced. For example, at operation 2507, the inverted bits 1-dimensional tile-based scan may be bit differenced to generate an inverted differential bits 1-dimensional tile-based scan. For example, at operation 2508, the inverted bits 1-dimensional raster scan may be bit differenced to generate an inverted differential bits 1-dimensional raster scan. As discussed herein, operations 2503-2508 may generated processed bitstreams.

Process 2500 may continue at operations set 2509, which may include operations "Estimate Cost of Proxy VLC Coding (Tables V3,V8,V5,V10)" (first instance), "Estimate Cost of Symbol-Run Coding (Tables S0 & S2)", "Estimate Cost of Proxy VLC Coding (Tables V3 & V5)", "Estimate Cost of Symbol-Run Coding (Table S2)", "Estimate Cost of Proxy VLC Coding (Table V8)" (first instance), "Estimate Cost of Proxy VLC Coding (Tables V3,V8,V5,V10)" (second instance), "Estimate Cost of Proxy VLC Coding (Tables V0 & V3)", "Estimate Cost of Proxy VLC Coding (Table V8)" (second instance), where the bit costs of the illustrated processed bitstream and entropy coding technique combinations may be estimated. As discussed, in some examples, the bit costs estimations may be determined based on a table look up or the like (e.g., and not based on an actual encoding and bit counting of the processed bitstreams).

For example, at the operation labeled "Estimate Cost of Proxy VLC Coding (Tables V3,V8,V5,V10)" (first instance), a first, a second, a third, and a fourth bit cost associated with multiple proxy variable length codings (e.g., one each using Tables V3, V8, V5, and V10) of the inverted bits 1-dimensional tile-based scan may be estimated. For example, at the operation labeled "Estimate Cost of Symbol-Run Coding (Tables S0 & S2)", a fifth and a sixth bit cost associated with multiple symbol-run codings (e.g., one each using Tables S0 and VS2) of the 1-dimensional tile-based scan may be estimated. For example, at the operation labeled "Estimate Cost of Proxy VLC Coding (Tables V3 & V5)", a seventh and an eighth bit cost associated with multiple proxy variable length codings (e.g., one each using Tables V3 and V5) of the 1-dimensional tile-based scan may be estimated. For example, at the operation labeled "Estimate Cost of Symbol-Run Coding (Table S2)", a ninth bit cost associated with a symbol-run coding (e.g., using Table S2) of the inverted differential bits 1-dimensional tile-based scan may be estimated. For example, at the operation labeled "Estimate Cost of Proxy VLC Coding (Table V8)" (first instance), a tenth bit cost associated with a proxy variable length coding (e.g., using Table V8) of the inverted differential bits 1-dimensional tile-based scan may be estimated. For example, at the operation labeled "Estimate Cost of Proxy VLC Coding (Tables V3,V8,V5,V10)" (second instance), an eleventh, a twelfth, a thirteenth, and a fourteenth bit cost associated with multiple proxy variable length codings (e.g., one each using Tables V3, V8, V5, and V10) of the inverted bits 1-dimensional raster scan may be estimated. For example, at the operation labeled "Estimate Cost of Proxy VLC Coding (Tables V0 & V3)", a fifteenth and a sixteenth bit cost associated with multiple proxy variable length codings (e.g., one each using Tables V0 and V3) of the 1-dimensional raster scan may be estimated. For example, at the operation labeled "Estimate Cost of Proxy VLC Coding (Table V8)" (second instance), a seventeenth bit cost associated with a proxy variable length coding (e.g., using Table V8) of the inverted differential bits 1-dimensional tile-based scan may be estimated.

Operations set 2509 may provide advantageous coding technique (including coding table) and processed bitstream combinations for F-pictures. In some examples, some of the provided combinations may be eliminated. In some examples, other available combinations may be added.

Process 2500 may continue at operation 2510 "Select Method with the Smallest Cost", where a minimum (e.g., smallest) bit cost based on the first through seventeenth bit costs may be determined. For example, the estimated bits for all methods may be compared to determine the one with the smallest cost. Process 2500 may continue at operation 2511 "Code the Selected Method Index (See Table 2)", where a header code associated with the selected entropy coding technique (and table if applicable) may be encoded. For example, Table 2 as follows illustrated example header codes:

TABLE 2

Symbol-run/Proxy VLC methods in F-frames

| # | Method | Header Code | Code length |
|---|--------|-------------|-------------|
| 0 | Proxy VLC coder on inverted bits with table V3 on default-scan ordered blocks | 0000 | 4 |
| 1 | Proxy VLC coder on inverted bits with table V8 on default-scan ordered blocks | 0001 | 4 |
| 2 | Proxy VLC coder on inverted bits with table V5 on default-scan ordered blocks | 0010 | 4 |
| 3 | Symbol-run on inverted bits with table S0 on default-scan ordered blocks | 0011 | 4 |
| 4 | Symbol-run on inverted bits with table S2 on default-scan ordered blocks | 0100 | 4 |
| 5 | Proxy VLC coder on inverted bits with table V3 on default-scan ordered blocks | 0101 | 4 |
| 6 | Proxy VLC coder on inverted bits with table V5 on default-scan ordered blocks | 0110 | 4 |
| 7 | Symbol-run on inverted differential bits with table S2 on default-scan ordered blocks | 0111 | 4 |
| 8 | Proxy VLC coder on inverted differential bits with table V8 on default-scan ordered blocks | 1000 | 4 |
| 9 | Proxy VLC coder on inverted bits with table V3 on raster-scan ordered blocks | 1001 | 4 |
| 10 | Proxy VLC coder on inverted bits with table V8 on raster-scan ordered blocks | 1010 | 4 |
| 11 | Proxy VLC coder on inverted bits with table V5 on raster-scan ordered blocks | 1011 | 4 |
| 12 | Proxy VLC coder on inverted bits with table V3 on raster-scan ordered blocks | 1100 | 4 |
| 13 | Proxy VLC coder on inverted bits with table V0 on raster-scan ordered blocks | 1101 | 4 |
| 14 | Proxy VLC coder on inverted differential bits with table V8 on raster-scan ordered blocks | 1110 | 4 |
| 15 | Proxy VLC coder on inverted bits with table V10 on default-scan ordered blocks | 11110 | 5 |
| 16 | Proxy VLC coder on inverted bits with table V10 on raster-scan ordered blocks | 11111 | 5 |

Process 2500 may continue at operation 2512 "Code CNC Data with the Selected Method", where the processed bitstream associated with the coded/not-coded video data may be entropy encoded using the selected entropy coding technique to generate encoded coded/not-coded video data. Further, as discussed, the encoded coded/not-coded video data bitstream may be assembled into an output bitstream. For example, the selected method may be applied to the CNC data and the result may be written to bitstream. Process 2500 may terminate at operation 2514 "Finish Processing Current Frame". Process 2500 may be repeated as needed to encode any number of frames such as, for example, P-pictures or P-pictures.

As discussed, the entropy encoding technique(s) may use various tables. The tables as referenced herein are presented as follows and labeled in accordance with the previous discussion and, in particular the discussion presented with respect to FIGS. 24 and 25 and Tables 1 and 2 above.

TABLE 3

Symbol-run VLC table S0

| Code | Address | Code length |
|------|---------|-------------|
| 01 | 1 | 2 |
| 001 | 2 | 3 |
| 111 | 3 | 3 |
| 0001 | 4 | 4 |
| 1001 | 5 | 4 |
| 1100 | 6 | 4 |
| 1101 | 7 | 4 |
| 10101 | 8 | 5 |
| 10111 | 9 | 5 |
| 100000 | 10 | 6 |
| 100011 | 11 | 6 |
| 101101 | 12 | 6 |
| 101001 | 14 | 6 |
| 0000001 | 14 | 7 |
| 1000100 | 15 | 7 |
| 0000011 | 16 | 7 |
| 1000101 | 17 | 7 |
| — | — | — |
| 1011001 | 18 | 7 |
| 00000001 | 19 | 8 |
| 10100001 | 20 | 8 |
| 10100010 | 21 | 8 |
| 00000101 | 22 | 8 |
| 10100011 | 23 | 8 |
| 10110001 | 24 | 8 |
| 101000000 | 25 | 9 |
| 000000000 | 26 | 9 |
| 000001001 | 27 | 9 |
| 101100000 | 28 | 9 |
| 000000001 | 29 | 9 |
| 101000001 | 30 | 9 |
| 101100001 | 31 | 9 |
| 0000010000 | 32 | 10 |
| 0000010001 | 33 | 10 |
| 100001 | ESC | 6 |
| 00001 | EOB | 5 |

TABLE 4

Symbol-run VLC table S2

| Code | Address | Code Length |
|------|---------|-------------|
| 1 | 1 | 1 |
| 01 | 2 | 2 |
| 0001 | 3 | 4 |
| 0011 | 4 | 4 |
| 00001 | 5 | 5 |
| 00101 | 6 | 5 |
| 000001 | 7 | 6 |
| 0000001 | 8 | 7 |
| 0010010 | 9 | 7 |
| 0010011 | 10 | 7 |
| 00100000 | 11 | 8 |
| 00100001 | 12 | 8 |
| 000000001 | 14 | 9 |
| 0000000001 | 14 | 10 |
| 0000000111 | 15 | 10 |
| 0000000100 | 16 | 10 |
| 0000000101 | 17 | 10 |
| — | — | — |
| 00000000001 | 18 | 11 |
| 00000001101 | 19 | 11 |
| 000000000000 | 20 | 12 |
| 000000000001 | 21 | 12 |
| 000000011001 | 22 | 12 |
| 00000001100011 | 23 | 14 |
| 00000001100000 | 24 | 14 |
| 000000011000101 | 25 | 15 |
| 0000000110001001 | 26 | 16 |
| 00000001100010001 | 27 | 17 |

TABLE 4-continued

Symbol-run VLC table S2

| Code | Address | Code Length |
|---|---|---|
| 000000011000100001 | 28 | 18 |
| 0000000110001000001 | 29 | 19 |
| 00000001100010000001 | 30 | 20 |
| 000000011000100000001 | 31 | 21 |
| 0000000110001000000000 | 32 | 22 |
| 0000000110001000000001 | 33 | 22 |
| 00000001100001 | ESC | 14 |
| 0010001 | EOB | 7 |

TABLE 5

Proxy VLC table V0

| Bits Sequence | VLC | Code Length |
|---|---|---|
| 00 | 0 | 1 |
| 01 | 110 | 3 |
| 10 | 111 | 3 |
| 11 | 10 | 2 |

TABLE 6

Proxy VLC table V1

| Bits Sequence | VLC | Code Length |
|---|---|---|
| 0000 | 00 | 2 |
| 0001 | 010 | 3 |
| 1000 | 011 | 3 |
| 0010 | 100 | 3 |
| 0100 | 1010 | 4 |
| 0011 | 10110 | 5 |
| 1100 | 10111 | 5 |
| 0101 | 11000 | 5 |
| 0110 | 11001 | 5 |
| 1001 | 11010 | 5 |
| 1010 | 11011 | 5 |
| 1011 | 11100 | 5 |
| 1101 | 11101 | 5 |
| 1110 | 11110 | 5 |
| 0111 | 111110 | 6 |
| 1111 | 111111 | 6 |

TABLE 7

Proxy VLC table V2

| Bits Sequence | VLC | Code Length |
|---|---|---|
| 000 | 00 | 2 |
| 001 | 010 | 3 |
| 010 | 011 | 3 |
| 011 | 100 | 3 |
| 100 | 101 | 3 |
| 101 | 110 | 3 |
| 110 | 1110 | 4 |
| 111 | 1111 | 4 |

TABLE 8

Proxy VLC table V3

| Bits Sequence | VLC | Code Length |
|---|---|---|
| 000 | 0 | 1 |
| 001 | 100 | 3 |
| 010 | 101 | 3 |
| 011 | 11100 | 5 |
| 100 | 110 | 3 |
| 101 | 11101 | 5 |
| 110 | 11110 | 5 |
| 111 | 11111 | 5 |

TABLE 9

Proxy VLC table V5

| Bits Sequence | VLC | Code Length |
|---|---|---|
| 0000 | 11 | 2 |
| 0001 | 0110 | 4 |
| 1000 | 0010 | 4 |
| 0010 | 0001 | 4 |
| 0100 | 0101 | 4 |
| 0011 | 1000 | 4 |
| 1100 | 01000 | 5 |
| 0101 | 00000 | 5 |
| 0110 | 00001 | 5 |
| 1001 | 1011 | 4 |
| 1010 | 10100 | 5 |
| 1011 | 10101 | 5 |
| 1101 | 01001 | 5 |
| 1110 | 1001 | 4 |
| 0111 | 0111 | 4 |
| 1111 | 0011 | 4 |

TABLE 10

Proxy VLC table V6

| Bits Sequence | VLC | Code Length |
|---|---|---|
| 000 | 00 | 2 |
| 001 | 010 | 3 |
| 010 | 011 | 3 |
| 011 | 1110 | 4 |
| 100 | 101 | 3 |
| 101 | 1111 | 4 |
| 110 | 100 | 3 |
| 111 | 110 | 3 |

TABLE 11

Proxy VLC table V8

| Bits Sequence | VLC | Code Length |
|---|---|---|
| 000 | 00 | 2 |
| 001 | 010 | 3 |
| 010 | 011 | 3 |
| 011 | 100 | 3 |
| 100 | 101 | 3 |
| 101 | 1110 | 4 |
| 110 | 110 | 3 |
| 111 | 1111 | 4 |

TABLE 12

Proxy VLC table V10

| Bits Sequence | VLC | Code Length |
|---|---|---|
| 00 | 0 | 1 |
| 01 | 10 | 2 |
| 10 | 110 | 3 |
| 11 | 111 | 3 |

As discussed with respect to FIGS. 24 and 25, techniques discussed herein may include estimating bit cost(s) of proxy variable length coding and symbol-run coding in various scenarios. In some examples, estimating bit cost(s) associated with proxy VLC may include a look up operation. In some examples, estimating bit cost(s) associated with symbol-run coding may implement the process as illustrated in FIG. 26.

Figure 26:
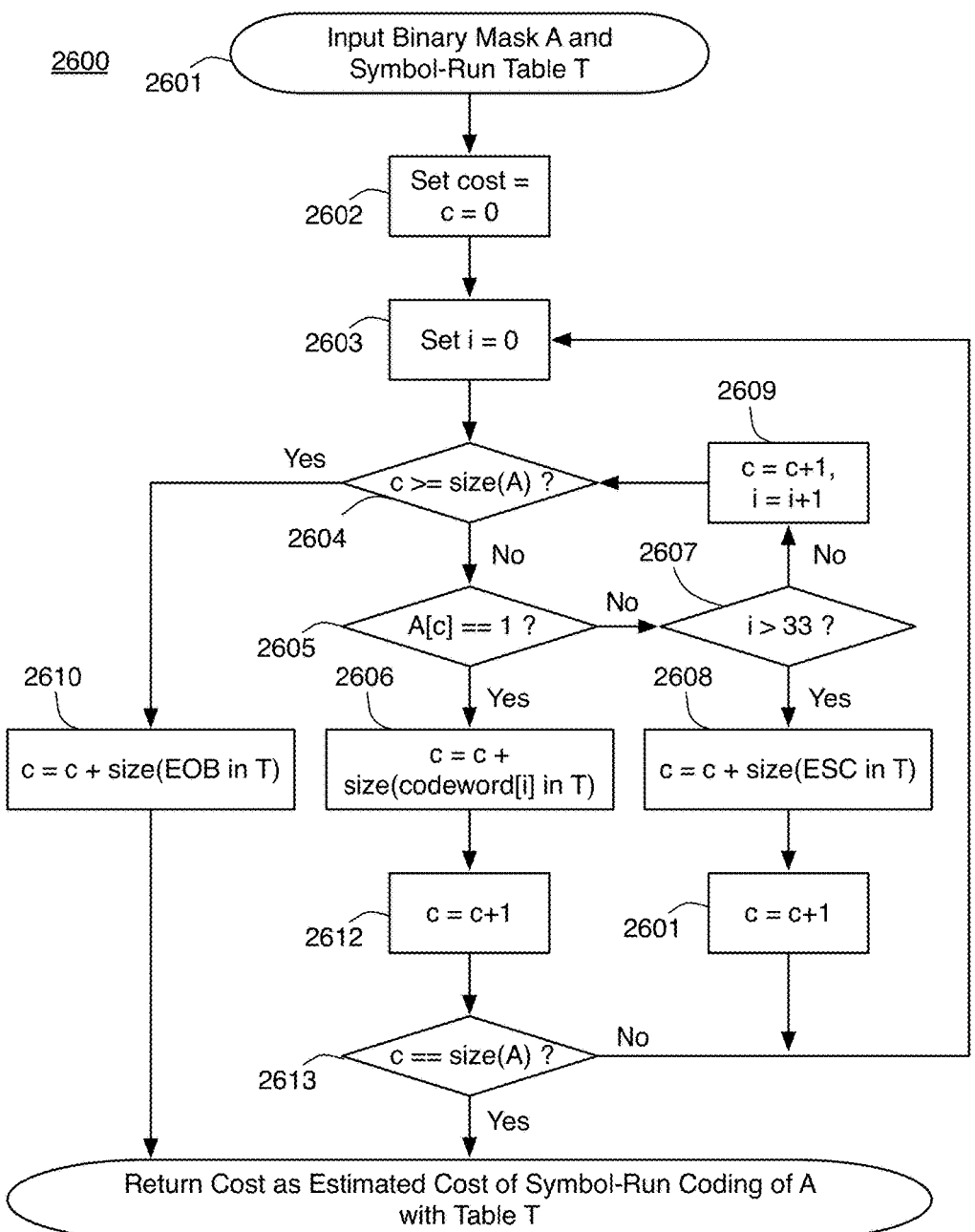
FIG. 26 is a flow diagram illustrating an example process, all arranged in accordance with at least some implementations of the present disclosure.

FIG. 26 is a flow diagram illustrating an example process 2600, arranged in accordance with at least some implementations of the present disclosure. Process 2600 may include one or more operations, functions or actions as illustrated by one or more of operations 2302, 2304, 2306, and/or 230. Process 2600 may form at least part of a next generation video coding process. By way of non-limiting example, process 2600 may form at least part of a next generation video encoding process as undertaken by encoder system 100 of FIG. 1 and/or entropy decoder module 110 as discussed herein.

Process 2600 may begin at operation 2601 "Input Binary Mask A and Symbol-Run Table T", where a binary mask (e.g., any processed bitstream as discussed herein) and a symbol-run table (e.g., a symbol-run table as illustrated herein or the like) may be input. Process 2600 may continue at operation 2602 "set cost=c=0", where a running cost (e.g., bit cost), labeled c, may be set to zero. Process 2600 may continue at operation 2603 "Set i=0", where a counter variable i may be set to zero. Process 2600 may continue at decision operation 2604 "c>=size(A)", where it may be determined whether running cost c is greater than or equal to the size of binary mask A.

If running cost c is not greater than or equal to the size of binary mask A, process 2600 may continue at decision operation 2605 "A[c]==1?", where it may be determined whether binary mask A is 1 at the position of running cost c. If such evaluation is true, process 2600 may continue at operation 2606 "c=c+size(codeword[i] in T), running cost c may be increased by the size of a codeword associated with i in table T. Process 2600 may continue at operation 2612 "c=c+1", where running cost c may be increased by one. Process 2600 may continue at operation 2613 "c==size(A)", where it may be determined whether running cost c is the same as the size of binary mask A. If so, process 2600 may continue at operation 2611 "Return Cost as Estimated Cost of Symbol-Run Coding of A with Table T", where the cost as estimated with respect to symbol-run coding of binary mask A with Table may be returned as running cost c. If not, process 2600 may continue at operation 2603, as discussed above.

If operation 2605 was determined to be not true, process 2600 may continue at decision operation 2607 "i>33 ?" where it may be determined whether counter i is greater than 33. If so, process 2600 may continue at operation 2608 "c=c+size (ESC in T)" where running cost c may be increased by the size of ESC (e.g., "escape", an indicator that a run as gone beyond an upper limit) in table T, process 2600 may continue at operation 2614 "c=c+1", where running cost may be increased by 1, and process 2600 may continue at operation 2603 as discussed. If not, process 2600 may continue at operation 2609 "c=c+1, i=i+1", where the running cost and the index value may be increased by one, and process 2600 may continue at decision operation 2604 as discussed above.

If, at decision operation 2604, running cost c is greater than or equal to the size of binary mask A, process 2600 may continue at operation 2610 "c=c+size(EOB in T)", where running cost c may be increased by the size of EOB (e.g., "end of block") in table T. Process 2600 may continue at operation 2611, where the cost as estimated with respect to symbol-run coding of binary mask A with Table may be returned as running cost c as discussed.

As discussed, process 2600 may provide bit cost(s) estimates associated with symbol-run coding techniques as discussed herein.

Both in P-pictures and F-pictures, for coding of coded/not-coded data for each of the combinations of operations or bitstream processing (e.g., none, pass-through, scanning, bit inversion, bit differencing, or the like), coding techniques (e.g., symbol-run or proxy VLC), and options within each technique (e.g., multiple tables as described herein), the best combination (e.g., minimum bit cost) that yields the most compression may be selected as the coding method (e.g., entropy coding technique) for the given video data (e.g., frame, picture, or slice, or the like). Such various techniques, options, and specific tables have been provided herein and may advantageously provide adaptive coding for coded/not-coded data As discussed with respect to FIG. 16, example video coding system 1600 may include imaging device(s) 1601, video encoder 100 and/or a video encoder implemented via logic circuitry 1650 of processing unit(s) 1620, video decoder 200 and/or a video decoder implemented via logic circuitry 1650 of processing unit(s) 1620, an antenna 1602, one or more processor(s) 1603, one or more memory store(s) 2004, and/or a display device 2005.

In some examples, video encoder 100 implemented via logic circuitry 1650 may include an image buffer (e.g., via either processing unit(s) 1620 or memory store(s) 1604)) and a graphics processing unit (e.g., via processing unit(s) 1620). The graphics processing unit may be communicatively coupled to the image buffer. The graphics processing unit may include video encoder 100 as implemented via logic circuitry 1650 to embody the various modules as discussed with respect to FIG. 1 and FIGS. 4, 6 and A16. For example, the graphics processing unit may include entropy encoder logic circuitry, and so on. The logic circuitry may be configured to perform the various operations as discussed herein. For example, the entropy encoder logic circuitry may be configured to determine a selected entropy coding technique for coded/not-coded video data from a plurality of entropy coding techniques such that the plurality of entropy coding techniques may include a proxy variable length coding technique and a symbol-run coding technique, entropy encode a processed bitstream associated with the coded/not-coded video data using the selected entropy coding technique to generate encoded coded/not-coded video data, and assemble the encoded coded/not-coded video data into an output bitstream. Video decoder 200 may be implemented in a similar manner.

In some examples, antenna 1602 of video coding system 1600 may be configured to receive an entropy encoded bitstream of video data. As discussed, the bitstream may include compressed video data of various types. Video coding system 1600 may also include video decoder 200 coupled to antenna 1602 and configured to decode the encoded bitstream. For example, video decoder 200 may be configured to disassemble the entropy encoded bitstream to determine a coded/not-coded video data header and encoded coded/not-coded video data, determine a selected entropy coding technique for the encoded coded/not-coded video data from a plurality of entropy coding techniques based at least in part on the coded/not-coded video data header such that the plurality of entropy coding techniques may include a proxy variable length coding technique and a symbol-run coding technique, entropy decode the encoded coded/not-coded video data using the selected entropy coding technique to determine coded/not-coded video data, and generate a video frame based at least in part on the coded/not-coded video data. The video frame may be configured to be presented to a user via a display device, for example.

As discussed, video data of different types may be entropy coded to generate compressed (e.g., coded) video data. The compressed video data may be assembled to generate an output bitstream. With reference to FIG. 8, example bitstream 800 may include indicator data 801, compressed video data 421, compressed video data 422, compressed video data 423, compressed video data 424, compressed video data 425, compressed video data 426, and/or compressed video data 427. For example, compressed video data 424 may include coded coded/not-coded video data, or the like. Further, indicator data 801 and/or compressed video data 424 may include a coded/not-coded video data header associated with the selected entropy coding technique or the processed bitstream (e.g. the coded/not-coded video data header may indicate a selected entropy coding technique or a processed bitstream type—a pass-through of the coded/not-coded video data, a reverse of the coded/not-coded video data, a bit inversion of the coded/not-coded video data, a bit difference of the coded/not-coded video data, a 1-dimensional raster scan based on the coded/not-coded video data, a 1-dimensional block-based scan based on the coded/not-coded video data, or a 1-dimensional tile-based scan based on the coded/not-coded video data, or the like).

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one example, a computer-implemented method for video coding may include determining a selected entropy coding technique for coded/not-coded video data from a plurality of entropy coding techniques such that the plurality of entropy coding techniques may include a proxy variable length coding technique and a symbol-run coding technique, entropy encoding a processed bitstream associated with the coded/not-coded video data using the selected entropy coding technique to generate encoded coded/not-coded video data, assembling the encoded coded/not-coded video data into an output bitstream.

In another example, a computer-implemented method for video coding may further include reading a block structure associated with a frame of video data, associating the block structure and the coded/not-coded video data, encoding a coded/not-coded video data header associated with at least one of the selected entropy coding technique or the processed bitstream, transmitting the output bitstream, receiving the output bitstream, disassembling the output bitstream to determine the coded/not-coded video data header and the encoded coded/not-coded video data, determining the selected entropy coding technique based at least in part on the coded/not-coded video data header, entropy decoding the encoded coded/not-coded video data bitstream using the selected entropy coding technique to determine the coded/not-coded video data, and generating a video frame based at least in part on the coded/not-coded video data. The coded/not-coded video data may include a plurality of bits such that each bit may indicate whether an associated block of the block structure associated with the frame of video data is coded or not-coded, such that a bit of 1 may indicate the associated block is coded and a bit of 0 indicates the associated block is not-coded, such that the coded/not-coded video data ma include symbol bits, and such that a mode associated with the frame of video data may be an inter mode. The processed bitstream associated with the coded/not-coded video data may include at least one of a pass-through of the coded/not-coded video data, a reverse of the coded/not-coded video data, a bit inversion of the coded/not-coded video data, a bit difference of the coded/not-coded video data, a 1-dimensional raster scan based on the coded/not-coded video data, a 1-dimensional block-based scan based on the coded/not-coded video data, or a 1-dimensional tile-based scan based on the coded/not-coded video data. Assembling the encoded coded/not-coded video into the output bitstream may include assembling the coded/not-coded video data header into the output bitstream. The frame of video data may be a P-picture and determining the selected entropy coding technique may include determining a number of inter-blocks in the frame of video data is greater than a threshold such that the threshold may be 25, generating a 1-dimensional raster scan based on the coded/not-coded video data, generating a 1-dimensional block-based scan based on the coded/not-coded video data such that the 1-dimensional block-based scan may include a 2×4 scale scan, bit inverting the 1-dimensional raster scan to generate an inverted bits 1-dimensional raster scan, bit inverting the 1-dimensional block-based scan to generate an inverted bits 1-dimensional block-based scan, estimating a first bit cost associated with the symbol run coding technique based on the inverted bits 1-dimensional raster scan, estimating a second bit cost associated with the proxy variable length coding technique based on the inverted bits 1-dimensional raster scan, estimating a third bit cost associated with a second proxy variable length coding technique based on the inverted bits 1-dimensional raster scan, estimating a fourth bit cost associated with a third proxy variable length coding technique based on the 1-dimensional raster scan, estimating a fifth bit cost associated with a fourth proxy variable length coding technique based on the 1-dimensional raster scan, estimating a sixth bit cost associated with a second symbol run coding technique based on the inverted bits 1-dimensional block-based scan, determining a minimum bit cost based on the first, second, third, fourth, fifth, and sixth bit costs, and determining the selected entropy coding technique as a coding technique associated with the minimum bit cost such that the processed bitstream may include at least one of the inverted bits 1-dimensional raster scan, the 1-dimensional raster scan, or the inverted bits 1-dimensional block-based scan, such that the symbol run coding technique may be associated with a first symbol-run variable length code table and the second symbol run coding technique may be associated with a second symbol-run variable length code table, and such that the proxy variable length coding technique may be associated with a first proxy variable length code table and the second proxy variable length coding technique may be associated with a second proxy variable length code table. The frame of video data may be an F-picture and determining the selected entropy coding technique may include determining a number of inter-blocks in the frame of video data is greater than a threshold such that the threshold may be 25, generating a 1-dimensional tile-based scan based on the coded/not-coded video data, generating a 1-dimensional raster scan based on the coded/not-coded video data, bit inverting the 1-dimensional tile-based scan to generate an inverted bits 1-dimensional tile-based scan, bit inverting the 1-dimensional raster scan to generate an inverted bits 1-dimensional raster scan, bit differencing the inverted bits 1-dimensional tile-based scan to generate an inverted differential bits 1-dimensional tile-based scan, bit differencing the inverted bits 1-dimensional raster scan to generate an inverted differential bits 1-dimensional raster scan, estimating a first bit cost associated with the proxy variable length coding technique based on the inverted bits 1-dimensional tile-based scan, estimating a second bit cost associated with the symbol-run coding technique based on the 1-dimensional tile-based scan, estimating a third bit cost associated with a second proxy variable length coding technique based on the 1-dimensional tile-based scan, estimating a fourth bit cost associated with a second symbol-run coding technique based on the inverted differential bits 1-dimensional tile-based scan, estimating a fifth bit cost associated with a third proxy variable length coding technique based on the inverted differential bits 1-dimensional tile-based scan, estimating a sixth bit cost associated with a fourth proxy variable length coding technique based on the inverted bits 1-dimensional raster scan, estimating a seventh bit cost associated with a fifth proxy variable length coding technique based on the 1-dimensional raster scan, estimating an eighth bit cost associated with a sixth proxy variable length coding technique based on the inverted differential bits 1-dimensional raster scan, determining a minimum bit cost based on the first, second, third, fourth, fifth, sixth, seventh, and eighth bit costs, and determining the selected entropy coding technique as a coding technique associated with the minimum bit cost such that the processed bitstream may include at least one of the 1-dimensional tile-based scan, the 1-dimensional raster scan, the inverted bits 1-dimensional tile-based scan, the inverted bits 1-dimensional raster scan, the inverted differential bits 1-dimensional tile-based scan, or the inverted differential bits 1-dimensional raster scan, such that the first symbol run coding technique may be associated with a first symbol-run variable length code table and the second symbol run coding technique may be associated with a second symbol-run variable length code table, and such that the first proxy variable length coding technique may be associated with a first proxy variable length code table and the second proxy variable length coding technique may be associated with a second proxy variable length code table.

In other examples, a video encoder may include an image buffer and a graphics processing unit having entropy encoder logic circuitry. The graphics processing unit may be communicatively coupled to the image buffer and the entropy encoder logic circuitry may be configured to determine a selected entropy coding technique for coded/not-coded video data from a plurality of entropy coding techniques such that the plurality of entropy coding techniques may include a proxy variable length coding technique and a symbol-run coding technique, entropy encode a processed bitstream associated with the coded/not-coded video data using the selected entropy coding technique to generate encoded coded/not-coded video data, and assemble the encoded coded/not-coded video data into an output bitstream.

In a further example video encoder, the entropy encoder logic circuitry may be further configured to read a block structure associated with a frame of video data, associate the block structure and the coded/not-coded video data, and encode a coded/not-coded video data header associated with at least one of the selected entropy coding technique or the processed bitstream. The coded/not-coded video data may include a plurality of bits such that each bit may indicate whether an associated block of the block structure associated with the frame of video data is coded or not-coded, such that a bit of 1 may indicate the associated block is coded and a bit of 0 indicates the associated block is not-coded, such that the coded/not-coded video data ma include symbol bits, and such that a mode associated with the frame of video data may be an inter mode. The processed bitstream associated with the coded/not-coded video data may include at least one of a pass-through of the coded/not-coded video data, a reverse of the coded/not-coded video data, a bit inversion of the coded/not-coded video data, a bit difference of the coded/not-coded video data, a 1-dimensional raster scan based on the coded/not-coded video data, a 1-dimensional block-based scan based on the coded/not-coded video data, or a 1-dimensional tile-based scan based on the coded/not-coded video data. To assemble the encoded coded/not-coded video into the output bitstream may include the entropy encoder logic circuitry being configured to assemble the coded/not-coded video data header into the output bitstream. The frame of video data may be a P-picture and to determine the selected entropy coding technique may include the entropy encoder logic circuitry being configured to determine a number of inter-blocks in the frame of video data is greater than a threshold such that the threshold may be 25, generate a 1-dimensional raster scan based on the coded/not-coded video data, generate a 1-dimensional block-based scan based on the coded/not-coded video data such that the 1-dimensional block-based scan may include a 2×4 scale scan, bit invert the 1-dimensional raster scan to generate an inverted bits 1-dimensional raster scan, bit invert the 1-dimensional block-based scan to generate an inverted bits 1-dimensional block-based scan, estimate a first bit cost associated with the symbol run coding technique based on the inverted bits 1-dimensional raster scan, estimate a second bit cost associated with the proxy variable length coding technique based on the inverted bits 1-dimensional raster scan, estimate a third bit cost associated with a second proxy variable length coding technique based on the inverted bits 1-dimensional raster scan, estimate a fourth bit cost associated with a third proxy variable length coding technique based on the 1-dimensional raster scan, estimate a fifth bit cost associated with a fourth proxy variable length coding technique based on the 1-dimensional raster scan, estimate a sixth bit cost associated with a second symbol run coding technique based on the inverted bits 1-dimensional block-based scan, determine a minimum bit cost based on the first, second, third, fourth, fifth, and sixth bit costs, and determine the selected entropy coding technique as a coding technique associated with the minimum bit cost such that the processed bitstream may include at least one of the inverted bits 1-dimensional raster scan, the 1-dimensional raster scan, or the inverted bits 1-dimensional block-based scan, such that the symbol run coding technique may be associated with a first symbol-run variable length code table and the second symbol run coding technique may be associated with a second symbol-run variable length code table, and such that the proxy variable length coding technique may be associated with a first proxy variable length code table and the second proxy variable length coding technique may be associated with a second proxy variable length code table. The frame of video data may be an F-picture and to determine the selected entropy coding technique may include the entropy encoder logic circuitry being configured to determine a number of inter-blocks in the frame of video data is greater than a threshold such that the threshold may be 25, generate a 1-dimensional tile-based scan based on the coded/not-coded video data, generate a 1-dimensional raster scan based on the coded/not-coded video data, bit invert the 1-dimensional tile-based scan to generate an inverted bits 1-dimensional tile-based scan, bit invert the 1-dimensional raster scan to generate an inverted bits 1-dimensional raster scan, bit difference the inverted bits 1-dimensional tile-based scan to generate an inverted differential bits 1-dimensional tile-based scan, bit difference the inverted bits 1-dimensional raster scan to generate an inverted differential bits 1-dimensional raster scan, estimate a first bit cost associated with the proxy variable length coding technique based on the inverted bits 1-dimensional tile-based scan, estimate a second bit cost associated with the symbol-run coding technique based on the 1-dimensional tile-based scan, estimate a third bit cost associated with a second proxy variable length coding technique based on the 1-dimensional tile-based scan, estimate a fourth bit cost associated with a second symbol-run coding technique based on the inverted differential bits 1-dimensional tile-based scan, estimate a fifth bit cost associated with a third proxy variable length coding technique based on the inverted differential bits 1-dimensional tile-based scan, estimate a sixth bit cost associated with a fourth proxy variable length coding technique based on the inverted bits 1-dimensional raster scan, estimate a seventh bit cost associated with a fifth proxy variable length coding technique based on the 1-dimensional raster scan, estimate an eighth bit cost associated with a sixth proxy variable length coding technique based on the inverted differential bits 1-dimensional raster scan, determine a minimum bit cost based on the first, second, third, fourth, fifth, sixth, seventh, and eighth bit costs, and determine the selected entropy coding technique as a coding technique associated with the minimum bit cost such that the processed bitstream may include at least one of the 1-dimensional tile-based scan, the 1-dimensional raster scan, the inverted bits 1-dimensional tile-based scan, the inverted bits 1-dimensional raster scan, the inverted differential bits 1-dimensional tile-based scan, or the inverted differential bits 1-dimensional raster scan, such that the first symbol run coding technique may be associated with a first symbol-run variable length code table and the second symbol run coding technique may be associated with a second symbol-run variable length code table, and such that the first proxy variable length coding technique may be associated with a first proxy variable length code table and the second proxy variable length coding technique may be associated with a second proxy variable length code table.

In yet another example, a system may include an antenna configured to receive an entropy encoded bitstream of video data and a video decoder communicatively coupled to the antenna and configured to decode the encoded bitstream. The video decoder may be configured to disassemble the entropy encoded bitstream to determine a coded/not-coded video data header and encoded coded/not-coded video data, determine a selected entropy coding technique for the encoded coded/not-coded video data from a plurality of entropy coding techniques based at least in part on the coded/not-coded video data header such that the plurality of entropy coding techniques may include a proxy variable length coding technique and a symbol-run coding technique, entropy decode the encoded coded/not-coded video data using the selected entropy coding technique to determine coded/not-coded video data, and generate a video frame based at least in part on the coded/not-coded video data.

In a further example system, the system may also include a display device configured to present video frames. The coded/not-coded video data may include a plurality of bits such that each bit may indicate whether an associated block of the block structure associated with a frame of video data is coded or not-coded and such that a bit of 1 may indicate the associated block is coded and a bit of 0 may indicate the associated block is not-coded. To entropy decode the encoded coded/not-coded video data using the selected entropy coding technique to determine coded/not-coded video data may include the video decoder being configured to decompress the encoded coded/not-coded video data to generate a processed bitstream and decode the processed bitstream to generate the coded/not-coded video data such that the processed bitstream associated with the coded/not-coded video data may include at least one of a pass-through of the coded/not-coded video data, a reverse of the coded/not-coded video data, a bit inversion of the coded/not-coded video data, a bit difference of the coded/not-coded video data, a 1-dimensional raster scan based on the coded/not-coded video data, a 1-dimensional block-based scan based on the coded/not-coded video data, or a 1-dimensional tile-based scan based on the coded/not-coded video data.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed:

1. A computer-implemented method for video coding, comprising:
    determining a selected entropy coding technique for coded/not-coded video data from a plurality of entropy coding techniques, wherein the plurality of entropy coding techniques comprise a proxy variable length coding technique and a symbol-run coding technique, and wherein the coded/not-coded video data comprises a plurality of bits, wherein each bit indicates whether an associated block of a block structure associated with a frame of video data is coded or not-coded;
    entropy encoding a processed bitstream associated with the coded/not-coded video data using the selected entropy coding technique to generate encoded coded/not-coded video data;

encoding a coded/not-coded video data header associated with at least one of the selected entropy coding technique or the processed bitstream; and assembling the encoded coded/not-coded video data and the coded/not-coded video data header into an output bitstream.

2. The method of claim 1, wherein the processed bitstream associated with the coded/not-coded video data comprises at least one of a pass-through of the coded/not-coded video data, a reverse of the coded/not-coded video data, a bit inversion of the coded/not-coded video data, or a bit difference of the coded/not-coded video data.

3. The method of claim 1, wherein the processed bitstream associated with the coded/not-coded video data comprises at least one of a 1-dimensional raster scan based on the coded/not-coded video data, a 1-dimensional block-based scan based on the coded/not-coded video data, or a 1-dimensional tile-based scan based on the coded/not-coded video data.

4. The method of claim 1, wherein the proxy variable length coding technique is based on a first proxy variable length coding table and wherein the plurality of entropy coding techniques comprises a second proxy variable length coding technique based on a second proxy variable length coding table.

5. The method of claim 1, wherein the coded/not-coded data is associated with a P-picture of video data, and wherein determining the selected entropy coding technique comprises:

generating a 1-dimensional raster scan based on the coded/not-coded video data;

generating a 1-dimensional block-based scan based on the coded/not-coded video data;

bit inverting the 1-dimensional block-based scan to generate an inverted bits 1-dimensional block-based scan;

estimating a first bit cost associated with the proxy variable length coding technique based on the 1-dimensional raster scan;

estimating a second bit cost associated with the symbol run coding technique based on the inverted bits 1-dimensional block-based scan;

determining a minimum bit cost based on the first and second bit costs; and determining the selected entropy coding technique as a coding technique associated with the minimum bit cost, wherein the processed bitstream comprises at least one of the 1-dimensional raster scan or the inverted bits 1-dimensional block-based scan.

6. The method of claim 1, wherein the coded/not-coded data is associated with a P-picture of video data, and wherein determining the selected entropy coding technique comprises:

generating a 1-dimensional raster scan based on the coded/not-coded video data;

generating a 1-dimensional block-based scan based on the coded/not-coded video data;

bit inverting the 1-dimensional raster scan to generate an inverted bits 1-dimensional raster scan;

bit inverting the 1-dimensional block-based scan to generate an inverted bits 1-dimensional block-based scan;

estimating a first bit cost associated with the proxy variable length coding technique based on the inverted bits 1-dimensional raster scan;

estimating a second bit cost associated with the symbol run coding technique based on the inverted bits 1-dimensional block-based scan;

determining a minimum bit cost based on the first and second bit costs; and determining the selected entropy coding technique as a coding technique associated with the minimum bit cost, wherein the processed bitstream comprises at least one of the inverted bits 1-dimensional raster scan or the inverted bits 1-dimensional block-based scan.

7. The method of claim 1, wherein the coded/not-coded data is associated with a P-picture of video data, and wherein determining the selected entropy coding technique comprises:

generating a 1-dimensional raster scan based on the coded/not-coded video data;

generating a 1-dimensional block-based scan based on the coded/not-coded video data;

bit inverting the 1-dimensional raster scan to generate an inverted bits 1-dimensional raster scan;

bit inverting the 1-dimensional block-based scan to generate an inverted bits 1-dimensional block-based scan;

estimating a first bit cost associated with the symbol run coding technique based on the inverted bits 1-dimensional raster scan;

estimating a second bit cost associated with the proxy variable length coding technique based on the inverted bits 1-dimensional raster scan;

estimating a third bit cost associated with a second symbol run coding technique based on the inverted bits 1-dimensional block-based scan;

determining a minimum bit cost based on the first, second, and third bit costs; and determining the selected entropy coding technique as a coding technique associated with the minimum bit cost, wherein the processed bitstream comprises at least one of the inverted bits 1-dimensional raster scan or the inverted bits 1-dimensional block-based scan.

8. The method of claim 1, wherein the coded/not-coded data is associated with a P-picture of video data, and wherein determining the selected entropy coding technique comprises:

generating a 1-dimensional raster scan based on the coded/not-coded video data;

generating a 1-dimensional block-based scan based on the coded/not-coded video data;

bit inverting the 1-dimensional raster scan to generate an inverted bits 1-dimensional raster scan;

bit inverting the 1-dimensional block-based scan to generate an inverted bits 1-dimensional block-based scan;

estimating a first bit cost associated with the symbol run coding technique based on the inverted bits 1-dimensional raster scan;

estimating a second bit cost associated with the proxy variable length coding technique based on the 1-dimensional raster scan;

estimating a third bit cost associated with a second symbol run coding technique based on the inverted bits 1-dimensional block-based scan;

determining a minimum bit cost based on the first, second, and third bit costs; and determining the selected entropy coding technique as a coding technique associated with the minimum bit cost, wherein the processed bitstream comprises at least one of the 1-dimensional raster scan, the inverted bits 1-dimensional raster scan, or the inverted bits 1-dimensional block-based scan.

9. The method of claim 1, wherein the coded/not-coded data is associated with an F-picture of video data, and wherein determining the selected entropy coding technique comprises:
- generating a 1-dimensional tile-based scan based on the coded/not-coded video data;
- generating a 1-dimensional raster scan based on the coded/not-coded video data;
- estimating a first bit cost associated with the symbol-run coding technique based on the 1-dimensional tile-based scan;
- estimating a second bit cost associated with the proxy variable length coding technique based on the 1-dimensional raster scan;
- determining a minimum bit cost based on the first and second bit costs; and
- determining the selected entropy coding technique as a coding technique associated with the minimum bit cost, wherein the processed bitstream comprises at least one of the 1-dimensional tile-based scan or the 1-dimensional raster scan.

10. The method of claim 1, wherein the coded/not-coded data is associated with an F-picture of video data, and wherein determining the selected entropy coding technique comprises:
- generating a 1-dimensional tile-based scan based on the coded/not-coded video data;
- generating a 1-dimensional raster scan based on the coded/not-coded video data;
- bit inverting the 1-dimensional raster scan to generate an inverted bits 1-dimensional raster scan;
- estimating a first bit cost associated with the symbol-run coding technique based on the 1-dimensional tile-based scan;
- estimating a second bit cost associated with the proxy variable length coding technique based on the inverted bits 1-dimensional raster scan;
- determining a minimum bit cost based on the first and second bit costs; and
- determining the selected entropy coding technique as a coding technique associated with the minimum bit cost, wherein the processed bitstream comprises at least one of the 1-dimensional tile-based scan or the inverted bits 1-dimensional raster scan.

11. The method of claim 1, wherein the coded/not-coded data is associated with an F-picture of video data, and wherein determining the selected entropy coding technique comprises:
- generating a 1-dimensional tile-based scan based on the coded/not-coded video data;
- generating a 1-dimensional raster scan based on the coded/not-coded video data;
- bit inverting the 1-dimensional tile-based scan to generate an inverted bits 1-dimensional tile-based scan;
- bit inverting the 1-dimensional raster scan to generate an inverted bits 1-dimensional raster scan;
- bit differencing the inverted bits 1-dimensional tile-based scan to generate an inverted differential bits 1-dimensional tile-based scan;
- bit differencing the inverted bits 1-dimensional raster scan to generate an inverted differential bits 1-dimensional raster scan;
- estimating a first bit cost associated with the symbol-run coding technique based on the inverted differential bits 1-dimensional tile-based scan;
- estimating a second bit cost associated with the proxy variable length coding technique based on the inverted differential bits 1-dimensional raster scan;
- estimating a third bit cost associated with a second proxy variable length coding technique based on the inverted bits 1-dimensional tile-based scan;
- determining a minimum bit cost based on the first, second, and third bit costs; and
- determining the selected entropy coding technique as a coding technique associated with the minimum bit cost, wherein the processed bitstream comprises at least one of the inverted differential bits 1-dimensional tile-based scan, the inverted differential bits 1-dimensional raster scan, or the inverted bits 1-dimensional tile-based scan.

12. The method of claim 1, wherein the coded/not-coded data is associated with an F-picture of video data, and wherein determining the selected entropy coding technique comprises:
- generating a 1-dimensional tile-based scan based on the coded/not-coded video data;
- generating a 1-dimensional raster scan based on the coded/not-coded video data;
- bit inverting the 1-dimensional tile-based scan to generate an inverted bits 1-dimensional tile-based scan;
- bit inverting the 1-dimensional raster scan to generate an inverted bits 1-dimensional raster scan;
- bit differencing the inverted bits 1-dimensional tile-based scan to generate an inverted differential bits 1-dimensional tile-based scan;
- bit differencing the inverted bits 1-dimensional raster scan to generate an inverted differential bits 1-dimensional raster scan;
- estimating a first bit cost associated with the symbol-run coding technique based on the inverted differential bits 1-dimensional tile-based scan;
- estimating a second bit cost associated with the proxy variable length coding technique based on the inverted differential bits 1-dimensional raster scan;
- estimating a third bit cost associated with a second proxy variable length coding technique based on the inverted differential bits 1-dimensional tile-based scan;
- determining a minimum bit cost based on the first, second, and third bit costs; and
- determining the selected entropy coding technique as a coding technique associated with the minimum bit cost, wherein the processed bitstream comprises at least one of the inverted differential bits 1-dimensional tile-based scan or the inverted differential bits 1-dimensional raster scan.

13. A video encoder comprising:
an image buffer;
a graphics processor communicatively coupled to the image buffer and configured to:
- determine a selected entropy coding technique for coded/not-coded video data from a plurality of entropy coding techniques, wherein the plurality of entropy coding techniques comprise a proxy variable length coding technique and a symbol-run coding technique, and wherein the coded/not-coded video data comprises a plurality of bits, wherein each bit indicates whether an associated block of a block structure associated with a frame of video data is coded or not-coded;
- entropy encode a processed bitstream associated with the coded/not-coded video data using the selected entropy coding technique to generate encoded coded/not-coded video data;

encode a coded/not-coded video data header associated with at least one of the selected entropy coding technique or the processed bitstream; and assemble the encoded coded/not-coded video data and the coded/not-coded video data header into an output bitstream.

14. The video encoder of claim 13, wherein the plurality of entropy coding techniques comprise a second proxy variable length coding technique, wherein the proxy variable length coding technique is associated with a first proxy variable length code table and the second proxy variable length coding technique is associated with a second proxy variable length code table.

15. The video encoder of claim 13, wherein the plurality of entropy coding techniques comprise a second symbol-run coding technique, wherein the symbol run coding technique is associated with a first symbol-run variable length code table and the second symbol run coding technique is associated with a second symbol-run variable length code table.

16. The video encoder of claim 13, wherein the processed bitstream associated with the coded/not-coded video data comprises at least one of a pass-through of the coded/not-coded video data, a reverse of the coded/not-coded video data, a bit inversion of the coded/not-coded video data, a bit difference of the coded/not-coded video data, a 1-dimensional raster scan based on the coded/not-coded video data, a 1-dimensional block-based scan based on the coded/not-coded video data, or a 1-dimensional tile-based scan based on the coded/not-coded video data.

17. At least one non-transitory machine readable medium comprising a plurality of instructions that in response to being executed on a computing device, cause the computing device to provide video coding by:

determining a selected entropy coding technique for coded/not-coded video data from a plurality of entropy coding techniques, wherein the plurality of entropy coding techniques comprise a proxy variable length coding technique and a symbol-run coding technique, and wherein the coded/not-coded video data comprises a plurality of bits, wherein each bit indicates whether an associated block of a block structure associated with a frame of video data is coded or not-coded;

entropy encoding a processed bitstream associated with the coded/not-coded video data using the selected entropy coding technique to generate encoded coded/not-coded video data;

encoding a coded/not-coded video data header associated with at least one of the selected entropy coding technique or the processed bitstream; and assembling the encoded coded/not-coded video data and the coded/not-coded video data header into an output bitstream.

18. The machine readable medium of claim 17, wherein the processed bitstream associated with the coded/not-coded video data comprises at least one of a pass-through of the coded/not-coded video data, a reverse of the coded/not-coded video data, a bit inversion of the coded/not-coded video data, or a bit difference of the coded/not-coded video data.

19. The machine readable medium of claim 17, wherein the processed bitstream associated with the coded/not-coded video data comprises at least one of a 1-dimensional raster scan based on the coded/not-coded video data, a 1-dimensional block-based scan based on the coded/not-coded video data, or a 1-dimensional tile-based scan based on the coded/not-coded video data.

20. The machine readable medium of claim 17, wherein the coded/not-coded data is associated with a P-picture of video data, and further comprising instructions that in response to being executed on a computing device, cause the computing device to provide video coding by:

generating a 1-dimensional raster scan based on the coded/not-coded video data;

generating a 1-dimensional block-based scan based on the coded/not-coded video data;

bit inverting the 1-dimensional block-based scan to generate an inverted bits 1-dimensional block-based scan;

estimating a first bit cost associated with the proxy variable length coding technique based on the 1-dimensional raster scan;

estimating a second bit cost associated with the symbol run coding technique based on the inverted bits 1-dimensional block-based scan;

determining a minimum bit cost based on the first and second bit costs; and determining the selected entropy coding technique as a coding technique associated with the minimum bit cost, wherein the processed bitstream comprises at least one of the 1-dimensional raster scan or the inverted bits 1-dimensional block-based scan.

21. The machine readable medium of claim 17, wherein the coded/not-coded data is associated with an F-picture of video data, and further comprising instructions that in response to being executed on a computing device, cause the computing device to provide video coding by:

generating a 1-dimensional tile-based scan based on the coded/not-coded video data;

generating a 1-dimensional raster scan based on the coded/not-coded video data;

estimating a first bit cost associated with the symbol-run coding technique based on the 1-dimensional tile-based scan;

estimating a second bit cost associated with the proxy variable length coding technique based on the 1-dimensional raster scan;

determining a minimum bit cost based on the first and second bit costs; and determining the selected entropy coding technique as a coding technique associated with the minimum bit cost, wherein the processed bitstream comprises at least one of the 1-dimensional tile-based scan or the 1-dimensional raster scan.

* * * * *